United States Patent
Sato et al.

(10) Patent No.: US 6,810,207 B2
(45) Date of Patent: Oct. 26, 2004

(54) CAMERA

(75) Inventors: Tatsuya Sato, Iruma (JP); Koichi Nakata, Kokubunji (JP); Osamu Nonaka, Sagamihara (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 10/435,938

(22) Filed: May 12, 2003

(65) Prior Publication Data

US 2004/0081441 A1 Apr. 29, 2004

(30) Foreign Application Priority Data

| May 21, 2002 | (JP) | 2002-146671 |
| May 13, 2002 | (JP) | 2002-137102 |
| May 29, 2002 | (JP) | 2002-156090 |
| Jun. 4, 2002 | (JP) | 2002-163461 |
| Jun. 7, 2002 | (JP) | 2002-167386 |
| Jun. 21, 2002 | (JP) | 2002-181753 |

(51) Int. Cl.$^7$ ............................................. G03B 17/00
(52) U.S. Cl. ................................. 396/54; 396/100
(58) Field of Search ............................ 396/52–55, 100, 396/153; 348/208.1, 208.15

(56) References Cited

U.S. PATENT DOCUMENTS 5,262,820 A * 11/1993 Tamai et al. ................. 396/54

FOREIGN PATENT DOCUMENTS

| JP | 55-106444 | 8/1980 |
| JP | 03-092830 | 4/1991 |
| JP | 2001-033870 | 2/2001 |
| JP | 2001-165622 | 6/2001 |

* cited by examiner

*Primary Examiner*—W. B. Perkey
(74) *Attorney, Agent, or Firm*—Straub & Pokotylo; John C. Pokotylo

(57) ABSTRACT

A camera according to the present invention comprises a sensor array wherein multiple pixels are arrayed in the base-length direction, a focusing unit for performing focusing of the camera based on the image output from the sensor array, a first detection unit for detecting the movement of the image signals in the base-length direction, a second detection unit for detecting the change in a predetermined pixel signal of the image signals over time, and a movement detection unit for performing movement detection based on the output from the first and second detection units.

16 Claims, 45 Drawing Sheets a-0　　　a-1　　　a-2　　　a-3 b-0　　b-1

FIG.4A
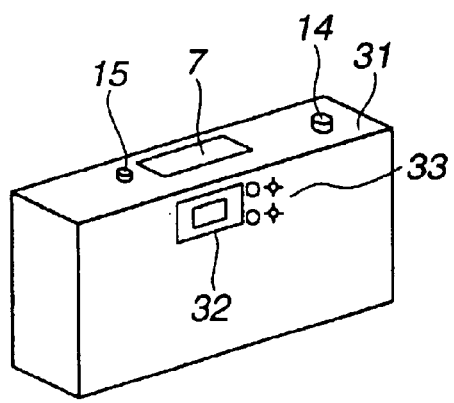
FIG.4B
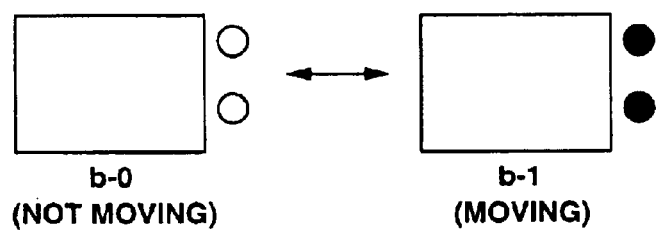
FIG.4C
| | |
|---|---|
| b-0 (NOT MOVING) | b-1 (MOVING) |

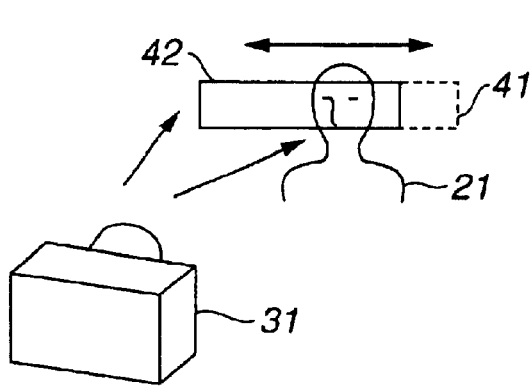
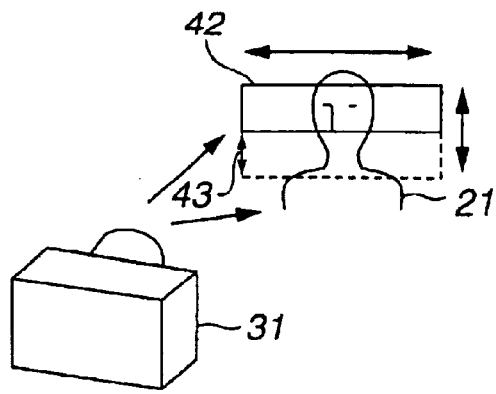
FIG.8A  FIG.8B
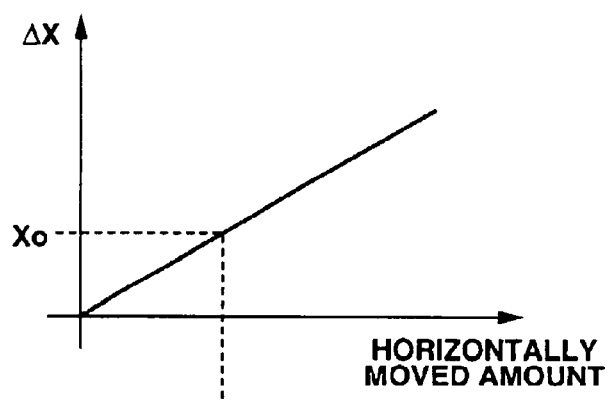
FIG.9A
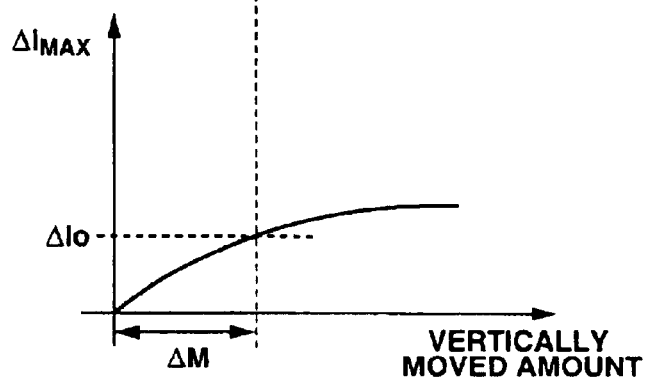
FIG.9B

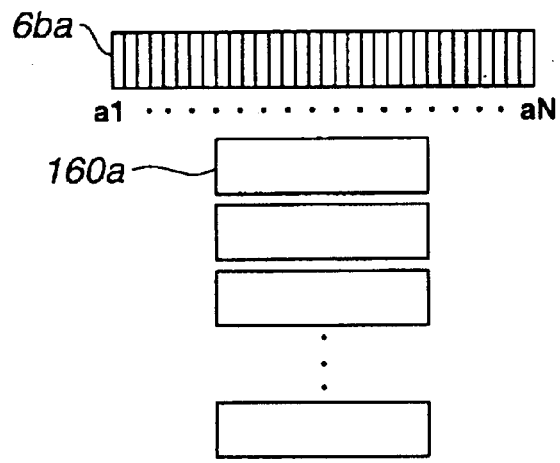
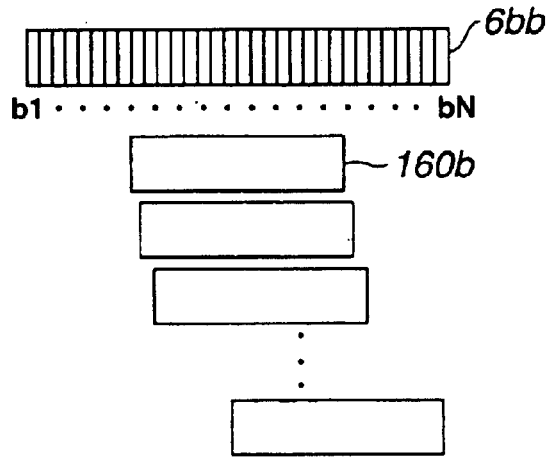
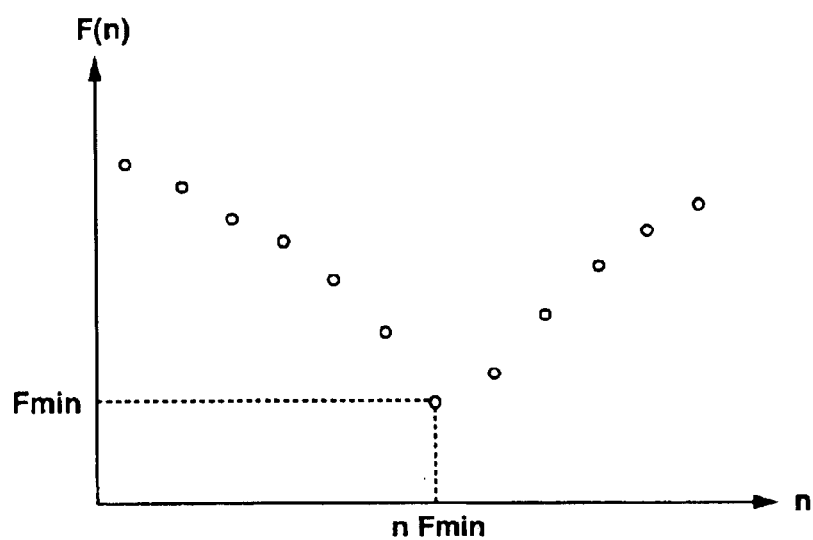

211  212
         200

| | BLURRING NOTIFYING MODE F_BRDSP | TIMING CONTROL MODE F_BRTIM | IMAGE OFFSET AMOUNT [μM] | | | | |
|---|---|---|---|---|---|---|---|
| | | | 0~25 | 26~50 | 51~100 | 101~150 | 151~ |
| 1 | 0 | 0 | NONE | NONE | NONE | NONE | NONE |
| 2 | 0 | 1 | NONE | NONE | NONE | NONE | NONE |
| 3 | 1 | 0 | ○○○ | ●○○ | ●●○ | ●●● | ●●● |
| 4 | 1 | 1 | ○○○ | ○○○ | ●○○ | ●●○ | ●●● |

MODE SELECTED IN THE EVENT OF "1"
MODE CANCELED IN THE EVENT OF "0"

●: TURNING ON
○: TURNING OFF

FIG.44

- TURNING-ON PATTERN A  ○ ○ ○
- TURNING-ON PATTERN B  ● ○ ○
- TURNING-ON PATTERN C  ● ● ○
- TURNING-ON PATTERN D  ● ● ●

Δt: TIME PERMITTED FOR EXPOSURE START DETERMINATION
T: TIMING AT WHICH FLAG F_GOFLAG IS SET TO "1"

CAMERA

CROSS-REFERENCE TO RELATED APPLICATION

This application claims benefits of Japanese Patent Applications No. 2002-137102 filed on May 13, 2002, in Japan, No. 2002-146671 filed on May 21, 2002, in Japan, No. 2002-156090 filed on May 29, 2002, in Japan, No. 2002-163461 filed on Jun. 4, 2002, in Japan, No. 2002-167386 filed on Jun. 7, 2002, in Japan, No. 2002-181753 filed on Jun. 21, 2002, in Japan, the entire contents of which are hereby incorporated by reference.

BACKGROUND OF THE INVENTION

1. Field of the Invention

The present invention relates to a camera.

2. Description of the Related Art

In general, in the event that the user takes a picture with a camera held with the hands of the user, the camera may be moved during exposure, leading to failure in photography, i.e., occurrence of blurring due to movement of hands. In order to prevent the blurring due to movement of hands, various prevention-of-vibration methods have been studied. The prevention-of-vibration methods include two phase, i.e., detection of vibration and countermeasures for the detected vibration.

Furthermore, the measures for prevention of blurring due to movement of hands can be classified into warning methods for giving the user warning of the movement, and methods for preventing deterioration of an image by blurring due to the movement of hands by controlling and driving photography lenses. As a warning method of the above-described methods, a camera which suppresses failure by blurring due to movement of hands by providing suitable display means has been proposed in Japanese Unexamined Patent Application Publication No. 2001-33870 by the present assignee, for example.

In general, these warnings are given to the user by lighting or blinking a display unit provided on the camera so as to let the user recognize blurring due to the movement of hands.

Furthermore, with the methods for vibration detection, examples employing a distance-measuring sensor are disclosed in Japanese Unexamined Patent Application Publication No. 2001-165622, and previously, in Japanese Examined Patent Application Publication No. 62-27686. For example, with the method disclosed in Japanese Unexamined Patent Application Publication No. 2001-165622, on the basis of output from two distance-measuring sensors with different sampling timing output signals, correlation computation is performed using the data near the point where the change of the output signals is great, and the offset of the image is obtained from the data offset amount wherein the correlation is the greatest, whereby detection of the vibration is performed.

Furthermore, methods, wherein the blurring state of the camera is detected and the exposure action is started at a timing where the blurring is small, are disclosed in Japanese Unexamined Patent Application Publication No. 3-92830 and Japanese Patent No. 2603871. The control for starting exposure at a timing where the blurring is small as described above, will be referred to as "timing control", or "release timing control" hereafter.

BRIEF SUMMARY OF THE INVENTION

The camera according to the present invention comprises a sensor array wherein multiple pixels are arrayed in the base-length direction, a focusing unit for performing focusing of the camera based on the image output from the sensor array, a first detection unit for detecting the movement of the image signals in the base-length direction, a second detection unit for detecting the change in a predetermined pixel signal of the image signals over time, and a vibration detection unit for performing vibration detection based on the output from the first and second detection units.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWINGS

FIG. 4A is a perspective view of the camera according to the first embodiment as viewed from the back in an oblique direction.

FIG. 4B is a diagram which illustrates the relation between the greatness of the movement of the camera according to the first embodiment and the blinking period of LEDs.

FIG. 4C is a diagram which illustrates a display example in the event that notice of the movement of the camera is given according to the camera of the first embodiment.

FIG. 8A is a diagram which illustrates an example of the change in the monitoring range of the AF sensor of the camera according to the first embodiment.

FIG. 8B is a diagram which illustrates another example of the change in the monitoring range of the AF sensor of the camera according to the first embodiment.

FIG. 9A is a diagram which illustrates the offset amount of the image signals in the horizontal direction as to the moved amount in the horizontal direction according to the camera of the first embodiment.

FIG. 9B is a diagram which illustrates the offset amount of the image signals in the vertical direction as to the moved amount in the vertical direction according to the camera of the first embodiment.

FIG. 24A is a diagram for describing a window-shift method for the correlation computation according to the camera of the second embodiment.

FIG. 24B is a diagram for describing a window-shift method for the correlation computation according to the camera of the second embodiment.

FIG. 25 is a diagram which illustrates a correlation data chart for indicating a correlation value as to each shift according to the camera of the second embodiment.

FIG. 44 is a diagram which illustrates a display example of the blurring notifying unit of the camera according to the sixth embodiment.

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Description will be made below in detail regarding embodiments according to the present invention with reference to the drawings.

Figure 1:
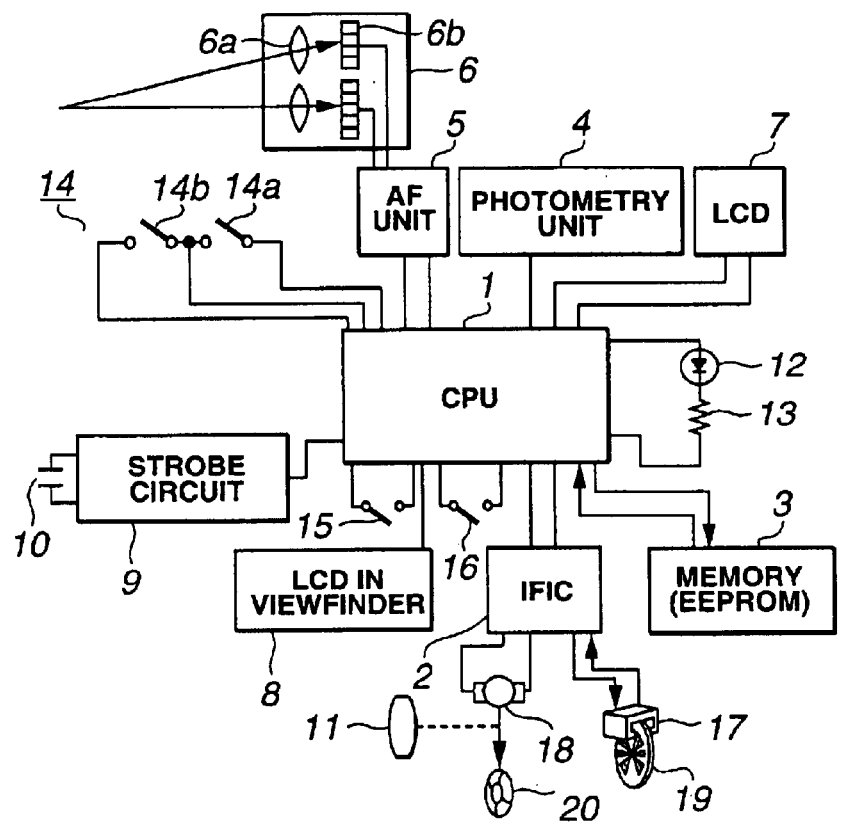
FIG. 1 is a block diagram which illustrates a block configuration of a camera according to a first embodiment of the present invention.

Description will be made with reference to FIG. 1 illustrating a block configuration of a camera according to a first embodiment of the present invention.

With the configuration, the camera comprises a CPU 1 for controlling the entire camera, an IFIC 2, memory (EEPROM) 3 for storing the data for adjusting, a photometry unit 4, an autofocus (AF) unit 5, an autofocus (AF) sensor 6, a liquid crystal display device (LCD) 7 for displaying the setting state of the camera and the information with regard to photography, LCD8 in viewfinder which is provided within a finder and displays the information with regard to photography, a strobe circuit 9 including a light-emission tube for emitting auxiliary light or the like, a main capacitor 10 for holding charges for energizing the light-emission tube, an photography lens 11 having a zoom function, a warning display unit 12 including LEDs, a resistance 13 serially connected to the warning display unit 12, switches (release switches) 14a and 14b for starting a photography sequence of the camera, a mode switching switch 15 for setting the blurring-due-to-movement-of-hands detection mode, a flash mode switch 16 for changing the stroboscopic emission mode of the camera, a motor 18 for driving drive-mechanisms for the photography lens, shutter, feeding of films, and the like, a rotational blade 19 which rotates in interlocking to the motor 18, and a photo-interrupter 17 for optically detecting apertures of the rotational blade 19 which rotates to drive and control the motor 18.

Note that an arrangement may be made wherein a switching mechanism switches the drive mechanism to be driven such that one motor 18 can drive each of the driving mechanisms such as a shutter 20, a zoom lens frame, and the like, or an arrangement may be made wherein each mechanism has an individual motor.

With the configuration, the CPU 1 performs the photography sequence according to the operated state of the release switches 14a and 14b. That is to say, the CPU 1 gives a warning display by LCD8 in the viewfinder which gives a warning of blurring due to movement of hands according to the output from the AF sensor 6, and also the CPU 1 drives the AF unit 5 and the photometry unit 4 which measures luminance of the subject for controlling exposure at the time of taking a picture, and receives necessary signals so as to control the motor 18 through the aforementioned IFIC 2. In this time,,the rotation of the motor 18 is transmitted to the rotational blade 19. Multiple apertures are formed on the rotational blade 19 and the photo-interrupter 17 outputs the signals corresponding to the presence or absence of the apertures, and the IFIC 2 adjusts the waveform of the output signals and outputs to the CPU 1. The CPU 1 monitors the rotational state of the motor 18 based on the signals output from the IFIC 2. Furthermore, the CPU 1 performs emission of the auxiliary light with the strobe circuit 9 as necessary.

Figure 2:
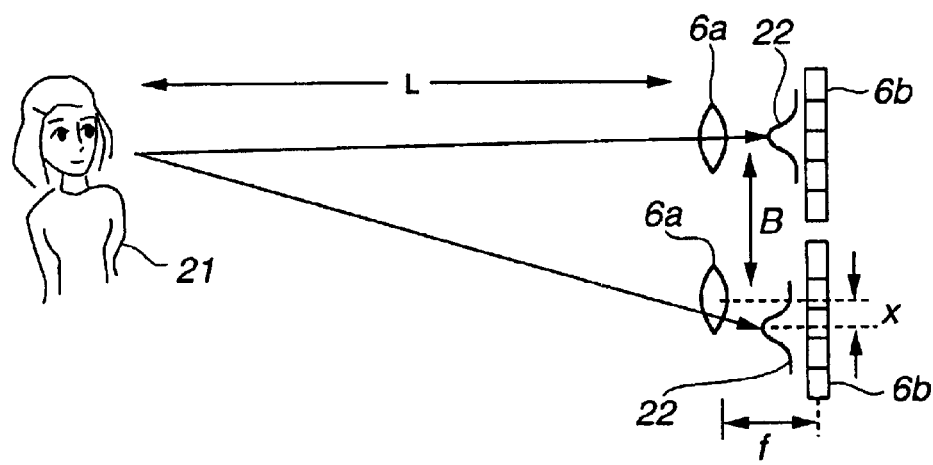
FIG. 2 is an explanatory diagram which illustrates the principle of distance measuring by an AF sensor of the camera according to the first embodiment.

FIG. 2 is an explanatory diagram for describing the principle of distance measuring by the AF sensor 6. Note that the AF sensor 6 comprises a pair of photo-receiving lenses 6a and a pair of sensor arrays 6b.

The one pair of photo-receiving lenses 6a are disposed at positions separated by a distance B which constitutes the length between principal points (base length) one from another so as to form images of a subject 21 on the one pair of the sensor arrays 6b. The sensor array 6b comprises multiple pixels (photo-receiving elements) arrayed in the direction of the base length of the one pair of the photo-receiving lenses 6a. The sensor array 6b outputs the electric signals according to the luminance of the image of the subject 21 formed on the sensor array 6b by the photo-receiving lens 6a, whereby the image signals are formed.

In this case, the image signals, e.g., image signals 22 are formed at different positions on the one pair of the sensor arrays 6b depending on the parallax of the photo-receiving lenses 6a. Thus, the relative position difference x between the two image signals 22 is detected, thereby obtaining the distance to the subject L with the following principle equation of the trigonometric measuring $$L=Bf/x.$$

Here, f indicates the focal distance of the photo-receiving lens 6a.

Note that the image signals output from the sensor arrays 6b are used for calculation of the distance to the subject, and also are used for judgment as to the movement of the camera. The judgment as to the movement will be described later.

FIGS. 3A, 3B, 3C, and 3D illustrate examples of warning patterns as display examples for being displayed on the LCD8 in the viewfinder. An LCD in viewfinder for displaying a picture for the panorama mode, black out display indicating a shutter shut-off, and the like, also serves as the LCD8 in the viewfinder.

Figure 3A:
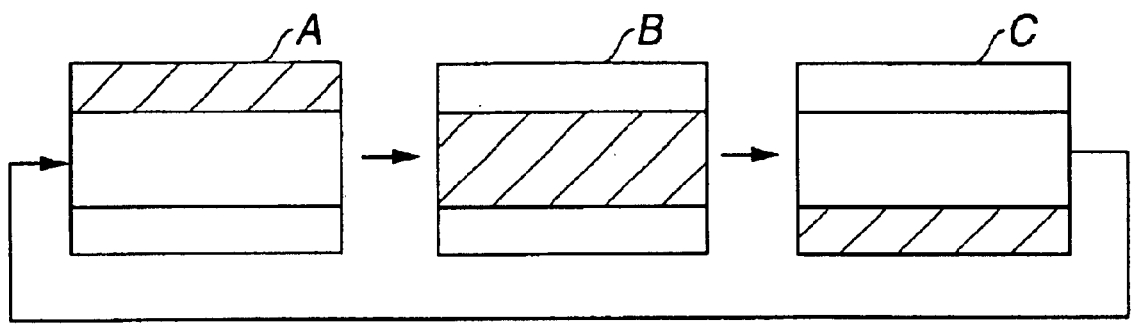
FIG. 3A is a diagram which illustrates a warning pattern example displayed on an LCD in viewfinder of the camera according to the first embodiment.

FIG. 3A is a diagram which illustrates a first display example of a notice of movement. The shielding pattern formed of the picture A and picture C shown in FIG. 3A is a shielding pattern which is displayed when setting the camera for panorama photography, and is used for notifying of movement. That is to say, a sequence wherein first of all, as shown in the picture A, shielding is performed on only the upper region, next, as shown in the picture B, shielding is performed at only the middle region which is an photography region for the panorama photography, and finally, as shown in the picture C, shielding is performed on only the lower region of the panorama shielding portion, is repeatedly performed. The display sequence is repeatedly performed, and thus the user who looks through the viewfinder can recognize blurring is occurring due to movement of hands. Note that shielding with the patterns A, B, and C, at the same time, forms a blackout display.

With the above-described display, the viewfinder screen movement can be represented, and in the event that the user steadies the camera and the blurring due to movement of hands stops, a display is made for the normal mode or the panorama mode, and the monitoring of the subject can be made.

Figure 3B:
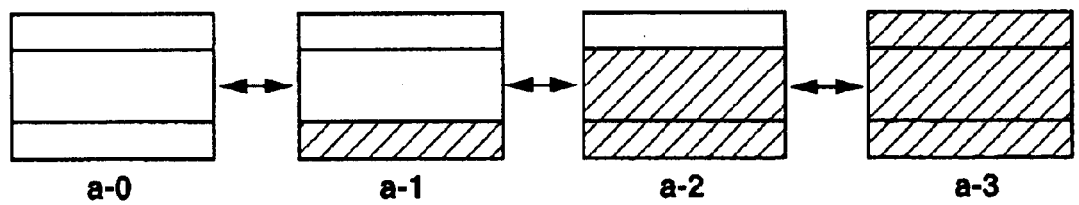
FIG. 3B is a diagram which illustrates another warning pattern example displayed on an LCD in viewfinder of the camera according to the first embodiment.

Subsequently, description will be made regarding a second example of a notice of the movement with reference to FIG. 3B. FIG. 3B illustrates an example of notice of movement, by stages according to the magnitude of the movement. Now, let us say that notice is given in four stages, and in the event that the movement is the least, no picture is displayed on the LCD8 in the viewfinder as shown in a-0. Next, in the event the movement is greater by one stage, shielding is performed on only the lower region of the LCD as shown in a-1. Furthermore, in the event that the movement is greater by further one stage, shielding is performed on the lower region and the middle region of the LCD, as shown in a-2. Moreover, in the event that the movement is greater by further one stage, shielding is performed on all the region of the LCD, as shown in a-3. That is to say, display shown in a-0 through a-3 is performed according to the magnitude of the movement occurring at that time, thereby giving notices in stages according to the magnitude of the movement.

Figure 3C:
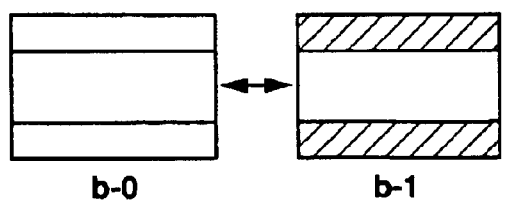
FIG. 3C is a diagram which illustrates another warning pattern example displayed on an LCD in viewfinder of the camera according to the first embodiment.

Next, description will be made regarding a third example of a notice of the movement with reference to FIG. 3C. FIG. 3C illustrates an example wherein notice of the movement is given in an on/off manner. That is to say, in this case, notice of the movement is given as to presence/absence of the movement. In the event of absence of the movement (the magnitude of the movement is equal to or less than a predetermined value), no display is performed on the LCD8 in the viewfinder. Conversely, in the event that the movement is great (the movement is greater than the predetermined value), shielding is performed on the upper region and the lower region of the LCD8 in the viewfinder as shown b-1. Thus, notice of the movement is performed in an on/off manner according to the presence or absence of the movement by displaying two kinds of pictures as shown in b-0 and b-1.

Figure 3D:
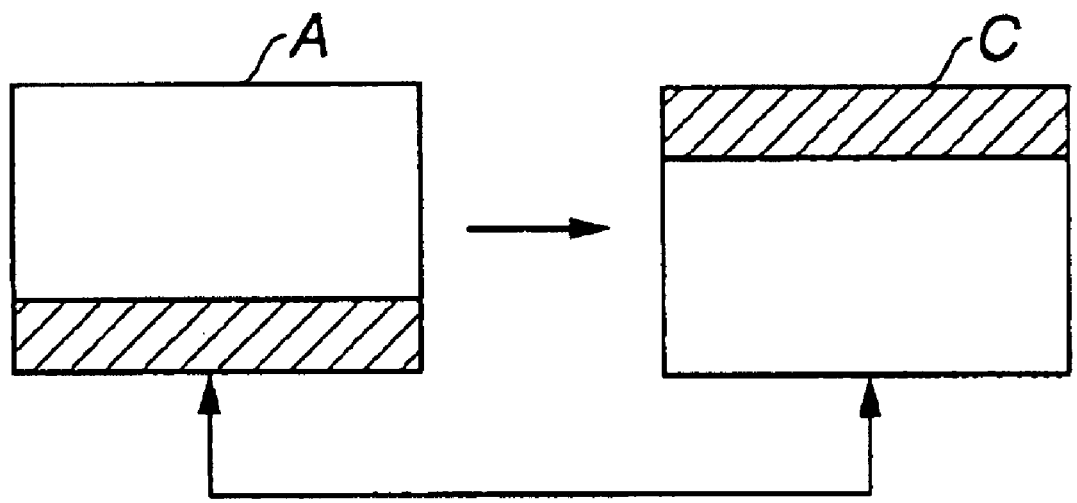
FIG. 3D is a diagram which illustrates another warning pattern example displayed on an LCD in viewfinder of the camera according to the first embodiment.

FIG. 3D illustrates a fourth example of notice of the movement which is displayed on the LCD 8 in the viewfinder.

As shown in FIG. 3D, with the display example, the shielding regions displayed at the setting time for panorama photography are used in the same way as the patterns described with reference to FIG. 3A. That is to say, the upper and lower shielding regions are alternately displayed as the picture A and picture C. With the pattern, the user can observe the image of the subject at the middle region of the screen all the time, unlike the warning pattern shown in FIG. 3A, so when in the panorama photography mode, the user can recognize the expressions of the subject or the like.

Furthermore, the pattern is blinked, so, unlike the normal display, the warning display gives a warning in a sure manner, thereby preventing the user from misunderstanding.

Figure 5:
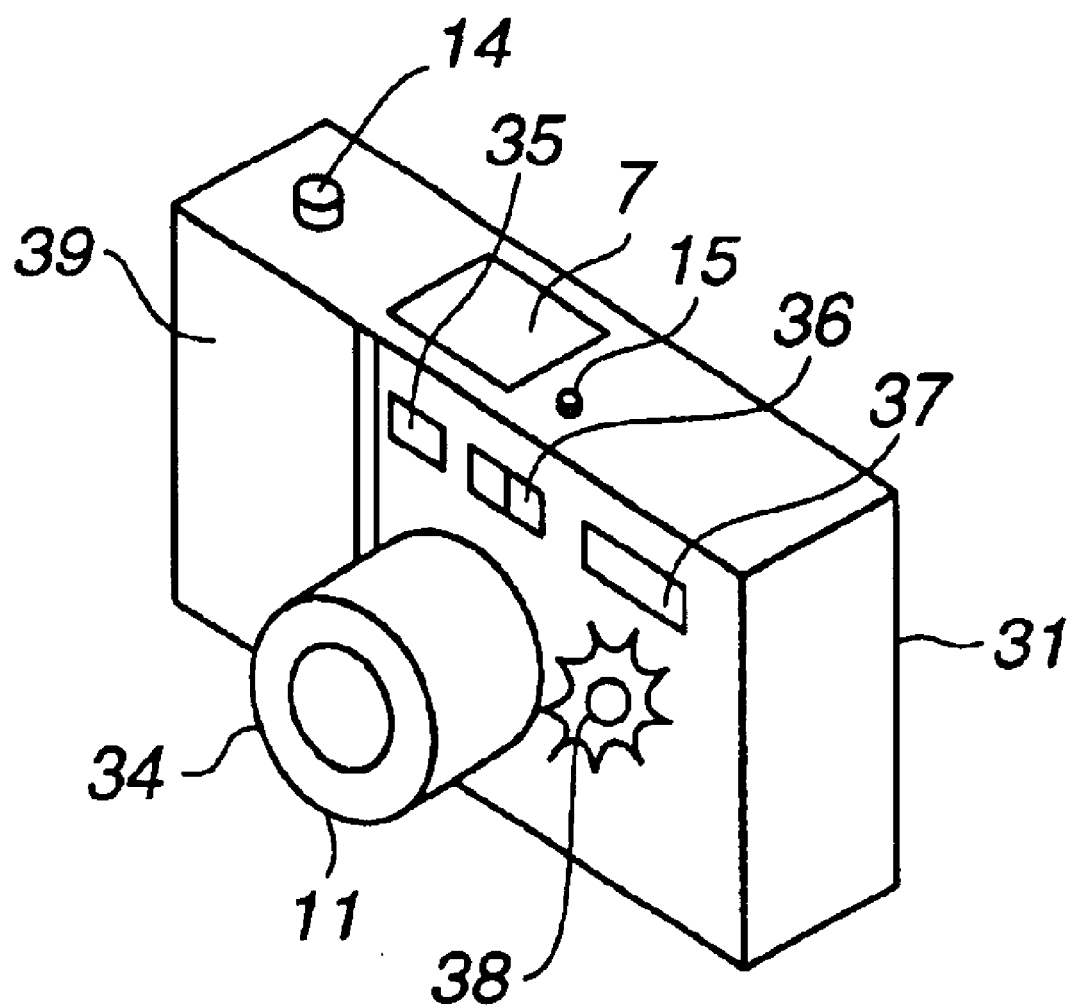
FIG. 5 is a perspective view of the camera according to the first embodiment as viewed in a diagonal direction from the front.

FIGS. 4A and 5 illustrate external views of a configuration example of the camera having such a blurring-due-to-movement-of-hands detection mode. Here, FIG. 4A illustrates a configuration as viewed from the back side of the camera, and FIG. 5 illustrates a configuration as viewed diagonally from the front side. Description will be made regarding the operations for notifying of occurrence of blurring due to the movement of hands by using holding checking and with reference to these drawings. Also, description will be made regarding a fifth example of notifying display of the movement wherein notifying is performed not using the aforementioned LCD8 in the viewfinder.

As shown in FIG. 4A, a finder eyepiece unit 32 is provided on the back face of the camera 31, and light-emitting diodes (LED) 33 are provided on the side thereof. In the event of occurrence of blurring due to the movement of hands, these two LEDs 33 are blinked at the same time or in an alternate manner. Thus, the user can recognize the notice even in the event that the user has the camera ready to shoot.

In a case of performing notifying of the movement in multiple stages using these two LEDs 33 as described above, the blinking cycle of the LEDs is changed, for example. FIG. 4B indicates the relation between the magnitude of the movement and the blinking period of the LEDs. In the event that the movement is the least, the blinking period of the LEDs 33 is made the longest as shown in a-0. The blinking period may be made around 0.5 sec, for example. Subsequently, the greater the movement is, the shorter the blinking period is gradually made, and furthermore, in the event that the movement is greater than a predetermined value, the blinking period is made the shortest as shown in a-3. At this time, the blinking cycle may be around 0.1 sec, for example. That is to say, the blinking cycle of the LEDs 33 is changed according to the magnitude of the movement, thereby giving a notice of the movement with a stage.

Furthermore, FIG. 4C illustrates an example of giving a notice of the movement in an on/off manner described above. That is to say, in the event of absence of the movement, both LEDs 33 are not turned on as shown in b-0. On the other hand, in the event of the presence of the movement, both LEDs 33 are turned on as shown in b-1. Thus, notifying of the movement in an on/off manner is performed with the two kinds of LED display.

As described above, in the event that the user recognizes the notice displayed on the LCD8 in the viewfinder, or the notice given by the LEDs 33, the user can prevent the movement of the camera by holding the camera tightly with both hands, instead of one hand (e.g., right hand), by also using the left hand, or the like.

Furthermore, as shown in FIG. 4A, a mode displaying LCD7, a mode setting switch 15, and a release button 14, and the like, are provided on the top face of the camera 31.

Furthermore, as shown in FIG. 5, an photography lens barrel 34 is provided on the front face of the camera 31, and a viewfinder objective-lens unit 35, a photo-receiving window 36 within which the aforementioned AF sensor 6 and the photo-receiving lenses of the photometry unit 4 are provided, a strobe emission unit 37, and a self-timer LED 38, are provided on the upper side thereof. In the event of occurrence of blurring due to the movement of hands, the LED 38 is blinked along with the LED 33, so even in the event that the user is in front of the camera as a subject, making a request to another person for taking a picture of the user, the user can recognize occurrence of the blurring due to movement of hands, and thus the user can let the person know the fact. At this time, in the event of giving a notice of the blurring due to movement of hands with a stage using the LED 38, the blinking period of the LED 38 is changed in stages according to the magnitude of the movement, as described above. On the other hand, in a case of giving a notice of the movement in an on/off manner, in the event that the magnitude of the movement is equal to or less than a predetermined value, the LED 38 is turned off, and conversely, in the event that the magnitude of the movement is greater than the predetermined value, the LED 38 is turned on.

Furthermore, as shown in FIG. 5, a barrier 39 is slidably provided on the front face of the camera 31 for covering the photography lens barrel 34, the viewfinder objective-lens unit 35, and the like. Note that an arrangement may be made wherein the barrier 39 serves as a power supply switch of the camera, as well, i.e., in the event that the barrier 39 is opened, the power supply is turned on, and the collapsed photography lens barrel 34 is extended up to a predetermined position, and enables a picture to be taken, and in the event of starting to close the barrier 39, the photography lens barrel 34 is collapsed within the camera 31, and the power supply is turned off.

Furthermore, an arrangement may be made wherein the aforementioned LEDs 33 provided near the viewfinder eyepiece unit 32 on the back side of the camera 31 serve as an LED for performing a display when charging the strobe, and when AF focusing, which are conventional functions.

Furthermore, an arrangement may be made wherein, following the blurring-due-to-movement-of-hands detection mode being set, in the event that the movement occurs due to unstable holding by the user having the camera, the LCD8 in viewfinder is blinked as described above, or the LEDs 33 near the viewfinder eyepiece unit 32 of the camera are blinked as shown in FIG. 4A, thereby giving a notice of the movement.

Next, description will be made regarding a blurring-due-to-movement-of-hands judgment method by outputting image from the AF sensor 6 for the camera having the above-described configuration.

Figure 6A:
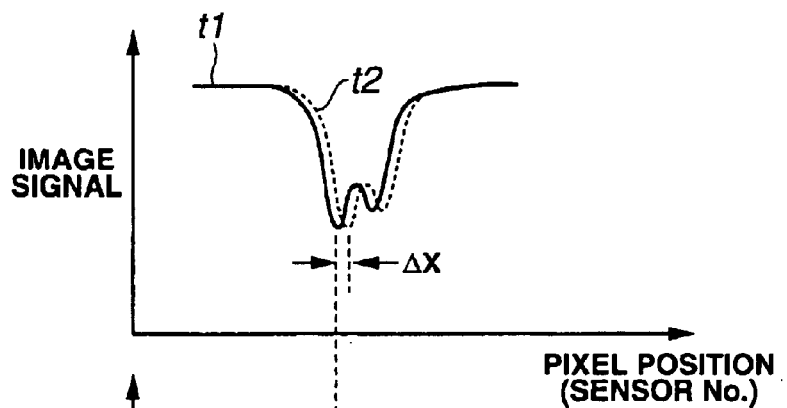
FIG. 6A is a diagram which illustrates the relation between image signal and the pixel position with regard to the horizontal shift according to the camera of the first embodiment.
Figure 6B:
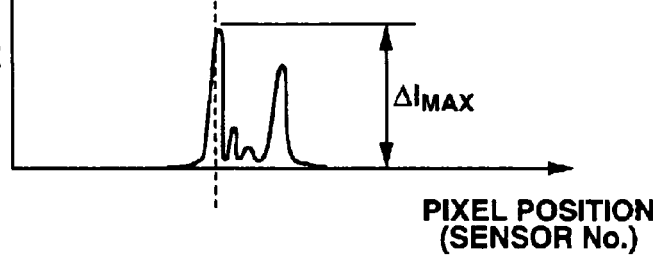
FIG. 6B is a diagram which illustrates the relation between the absolute value of the difference of image signals and the pixel position with regard to the horizontal shift according to the camera of the first embodiment.
Figure 7A:
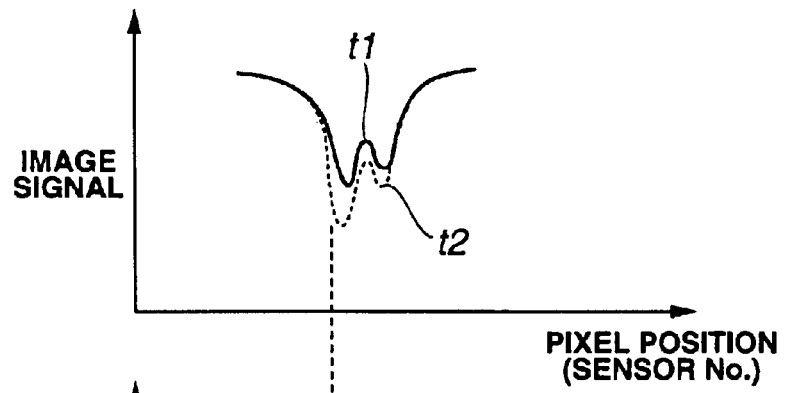
FIG. 7A is a diagram which illustrates the relation between image signal and the pixel position with regard to the vertical shift according to the camera of the first embodiment.

FIG. 6A illustrates the relation-between the image signals and the pixel position for the horizontal shift, and FIG. 6B illustrates the relation between the absolute value of the difference and the pixel position for the horizontal shift. FIG. 7A illustrates the relation between the image signals and the pixel position for the vertical shift, and FIG. 7B illustrates the relation between the absolute value of the difference and the pixel position for the vertical shift.

As shown in FIG. 5, the photo-receiving lens 6a is arranged in the horizontal direction on the front of the camera 31. That is to say, in a case that the base length direction is taken in the horizontal direction of the camera, in the event that the camera 31 is moved in the horizontal direction as shown in FIG. 8A, the monitor range 42 of the AF sensor 6 is changed into the monitor range 41. At this time, the image signals of the person 21 as a subject is changed in the horizontal direction, i.e., in the arrangement direction of the AF sensor 6, between the timing $t_1$ prior to the camera being moved and the timing $t_2$ following the camera being moved, as shown in FIG. 6A. Accordingly, the offset amount $\Delta X$ between the image signals is detected, thereby determining generally quantitative magnitude of the movement.

On the other hand, in the event that the camera 31 is moved in the vertical direction as shown in FIG. 8B, the monitor range 42 of the AF sensor 6 is changed into the monitor range 43. At this time, the monitored position itself is changed, that is to say, prior to the movement, monitoring is performed around the eyes of the person 21 in the monitor range 42, for example, but following the movement, monitoring is performed around the mouth of the person 21 in the monitor range 43, for example, so a great change is caused in the image signals such that the shape of the image signals itself is changed, between the timing $t_1$ prior to the camera being vibrated and the timing $t_2$ following the camera being vibrated, as shown in FIG. 7A.

Figure 7B:
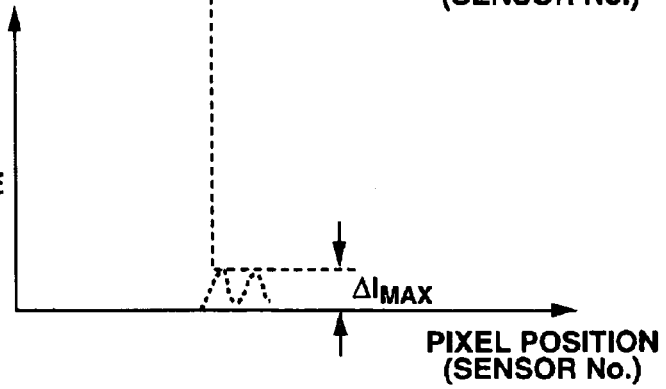
FIG. 7B is a diagram which illustrates the relation between the absolute value of the difference of image signals and the pixel position with regard to the vertical shift according to the camera of the first embodiment.

Accordingly, as shown in FIG. 7B, by differentiating between the image signals for each pixel at the timing prior to the change in the image signals and the timing following the change in the image signals, judgment can be made whether or not the change occurs in the image signals. That is to say, using the maximal change value $\Delta I_{MAX}$ in the image signals, the maximal change value $\Delta I_{MAX}$ is compared with a predetermined value $\Delta I_0$ which has been set beforehand, thereby making judgment whether or not the camera has moved, i.e., making judgment as to the presence or absence of the movement. Note that, in this case, the user can obtain only information with regard to the presence or absence of the movement, but cannot obtain information with regard to the magnitude of the movement.

Furthermore, in the event that the movement component is great in the horizontal direction of the camera, $\Delta I_{MAX}$ cannot be used for judgment of the movement. That is to say, in a case that the movement component is great in the horizontal direction, even in the event that the actual movement is small in the vertical direction, the output image signal from the same pixel is greatly changed as shown in FIG. 6B, so $\Delta I_{MAX}$ is obtained as a great value. Accordingly, with the method wherein judgment is made as to $\Delta I_{MAX}$, in a case of the movement component being great in the horizontal direction of the camera, even in the event that the actual movement is small in the vertical direction, judgment is made that the movement has occurred in the vertical direction.

Accordingly, with the first embodiment, in the event that movement which is not negligible as compared with the vertical movement is detected in the horizontal direction, judgment is not made as to the movement based on $\Delta I_{MAX}$, and judgment as to the movement is made by obtaining the suitable relation between the change in the image signals and the moved amount. Thus, judgment as to the movement with high reliability can be made.

FIGS. 9A and 9B illustrate the relations between the offset amount of the image signal and the moved amount. FIG. 9A illustrates the offset amount of the image signals in the horizontal direction as to the moved amount in the horizontal direction, and FIG. 9B illustrates the offset amount of the image signals in the vertical direction as to the moved amount in the vertical direction. That is to say, in the event that the movement occurs in the horizontal direction, the offset amount $\Delta X$ between the image signals at this time is generally proportional to the moved amount in the horizontal direction. On the other hand, in the event that the movement occurs in the vertical direction, $\Delta I_{MAX}$ exhibits saturation in the region exceeding a predetermined value $\Delta M$.

Note that the offset amount $\Delta X$ between the image signals is a value which indicates how many pixels the image signal is offset on the sensor array 6b. It is needless to say that an arrangement may be made wherein the offset length on the subject corresponding to the offset amount $\Delta X$ is obtained from the offset amount $\Delta X$ and the distance to the subject. Description will be made below, with the offset amount $\Delta X$ as the number of the pixels by which the image signals are offset.

Figure 10:
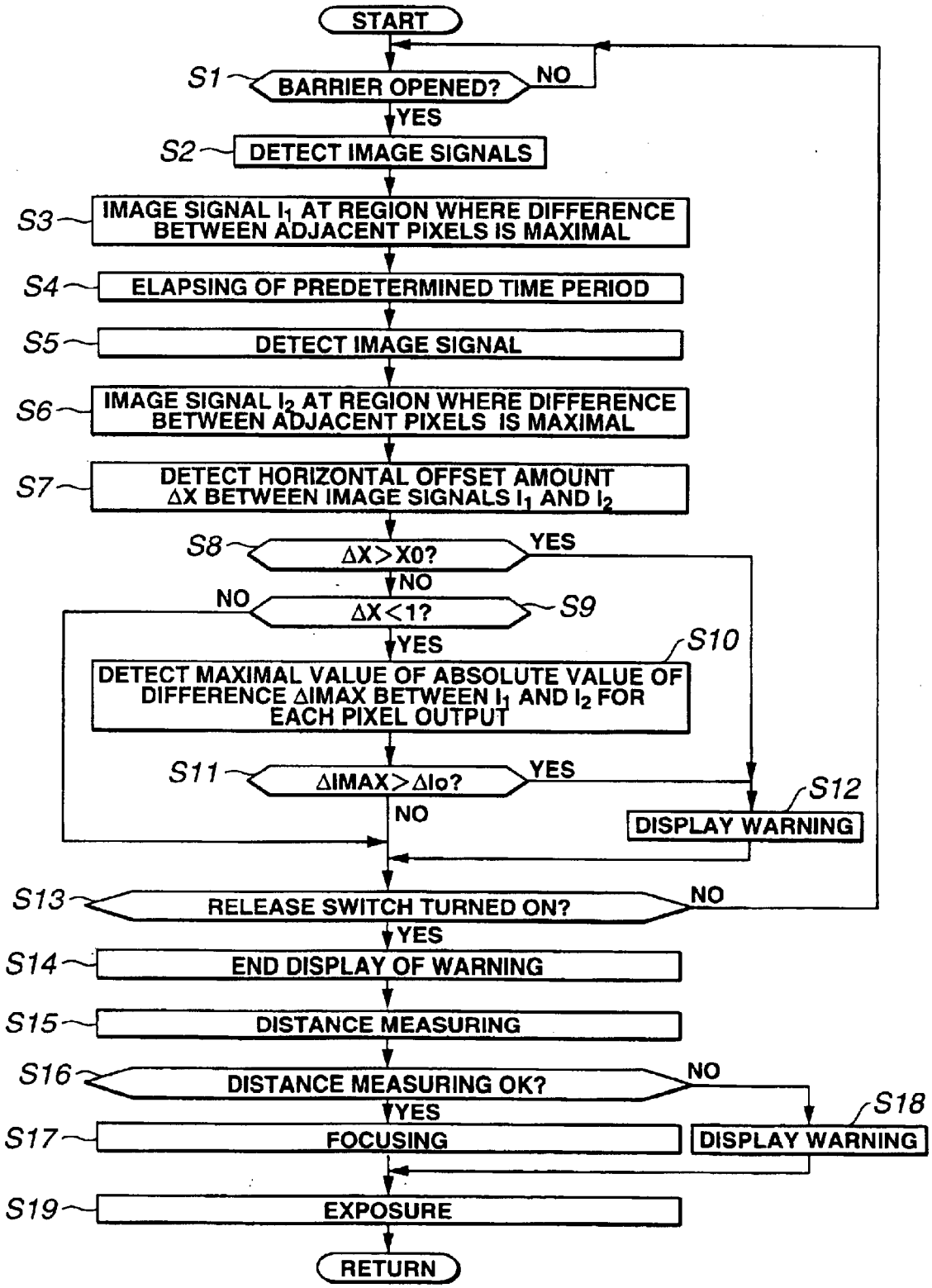
FIG. 10 is a flowchart which indicates judgment control for blurring due to the movement of hands in the camera according to the first embodiment.

Description will be made regarding judgment control of the camera with the blurring-due-to-movement-of-hands judgment method according to the present embodiment with reference to a flowchart shown in FIG. 10.

First of all, upon the user opening the barrier 39 of the camera shown in FIG. 5 (Step S1), an unshown power supply switch is turned on interlocking to the action of the barrier 39, and the photography lens barrel 34 of the camera is extended up to a predetermined position, and initialization is made such that the configuration can take a picture. Accompanying the initialization, the flow proceeds to a sequence for detecting the movement of the camera due to the movement of hands or the like, and giving a warning display for blurring due to the movement of hands. First of all, image signals output from the pixels are detected, as described above (Step S2). Subsequently, the image signal I1 at the region where the difference between the image signals output from adjacent pixels exhibits the maximal value, i.e., the greatest change of the image signals (great contrast) is obtained (Step S3).

Next, following elapsing of a predetermined time period, as described above (Step S4), image signals are detected again (Step S5). In the same way as in Step S3, the image signal I2 at the region where the difference between the image signals output from adjacent pixels exhibits the maximal value, i.e., the greatest change of the image signals is obtained (Step S6). Using the obtained image signals I1 and I2, the horizontally moved amount $\Delta X$ (see FIG. 6A) is detected (Step S7).

Next, the horizontally moved amount $\Delta X$ is compared with a predetermined value $X_0$ (Step S8), and in the event that the horizontally moved amount $\Delta X$ is equal to or greater than the predetermined value $X_0$ (YES), a warning display of the horizontal movement being great is given (Step S12). The predetermined value $X_0$ has been determined as a standard wherein the movement does not influence the photography. Note that description has been made regarding the warning display methods with reference to FIG. 3A through FIG. 5, or the like, so further description will be omitted. On the other hand, in the event that the horizontally moved amount is small, or is not detected (NO), judgment is made whether or not the horizontally moved amount $\Delta X$ is less than 1 (Step S9), and in the event that the horizontally moved amount $\Delta X$ is less than 1 (YES), the maximal difference value $\Delta I_{MAX}$ between the image signals I1 and I2 is detected for each pixel (Step S10). Conversely, in the event that the horizontally moved amount $\Delta X$ is equal to or greater than 1 (NO), the flow proceeds to a sequence for releasing in Step S13 as described later.

That is to say, in this flow, in the event that the horizontally moved amount $\Delta X$ is equal to or greater than a value corresponding to one pixel of the sensor array 6b, margin of error from the vertical movement could be great, so that judgment is not made as to the vertical movement. Thus, speedup of the processing can be realized. Note that an arrangement may be made wherein judgment in Step S9 is made as necessary.

Next, the detected maximal difference value $\Delta I_{max}$ is compared with the predetermined value $\Delta I_0$ (Step S11), and in the event that the maximal difference value $\Delta I_{max}$ is greater than the predetermined value $\Delta I_0$ (YES), a warning display is given (Step S12). Conversely, in the event that the maximal difference value $\Delta I_{max}$ is equal to or less than the predetermined value $\Delta I_0$ (NO), the flow proceeds to the release sequence, and judgment is made whether or not the release switch 14 is pressed (Step S13), and in the event that judgment is made that the release switch 14 is pressed (YES), a warning display ends (Step S14)

Subsequently, upon the release switch 14 being pressed, distance measuring is made (Step S15), and judgment is made whether or not the results of the distance measuring is suitable for focusing (Step S16), and in the event of OK (YES), focusing is performed (Step S17), and the flow proceeds to an exposure sequence (Step S19). Conversely, in the event that the result of distance measuring is not suitable for focusing (NO), a warning display is given (Step S18). Note that an arrangement may be made wherein in the event that the suitable results of distance measuring is not obtained, the flow may not proceed to the exposure sequence immediately, but following distance measuring being performed again, or the photography lens being set up at a predetermined focal position, the flow may proceed to the exposure sequence.

The user tightly holds the camera such that warning of blurring due to the movement of hands is not given, and takes a picture while observing these warning displays, thereby taking a picture without blurring due to the movement of hands. On the other hand, in the event that the release switch 14 is not pressed in the above-described Step S13 (NO), the flow returns to Step S1, and judgment as to the blurring due to the movement of hands is repeatedly performed.

As described above, with the first embodiment, using the sensor which can detect the change in the image position only in the horizontal direction, the relation among small and large sizes of the change in the vertical direction is accurately detected, whereby judgment with high reliability with regard to the blurring due to the movement of hands can be performed.

Figure 11:
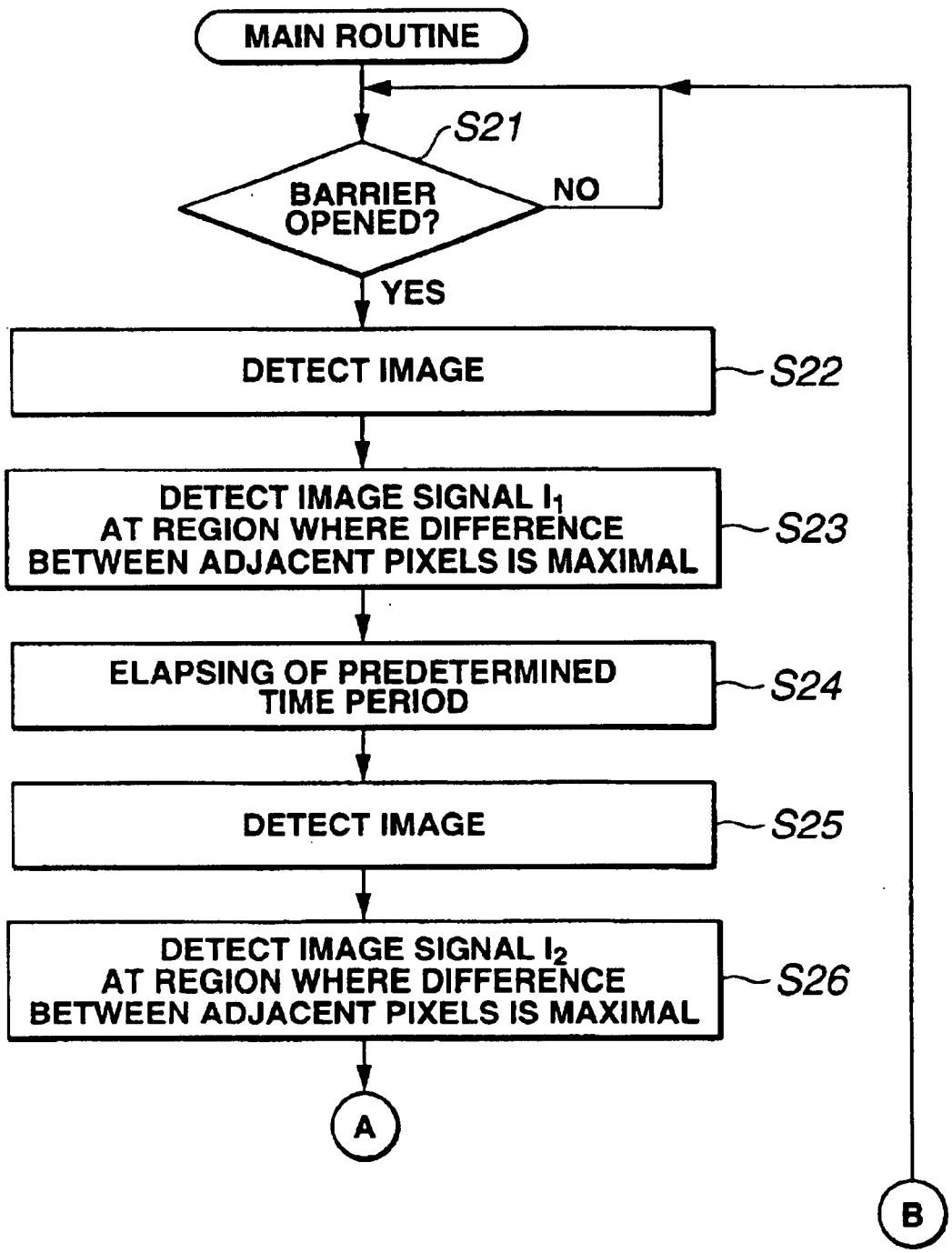
FIG. 11 is a flowchart which indicates judgment control procedure for blurring due to the movement of hands in a CPU of the camera of the first embodiment.
Figure 12:
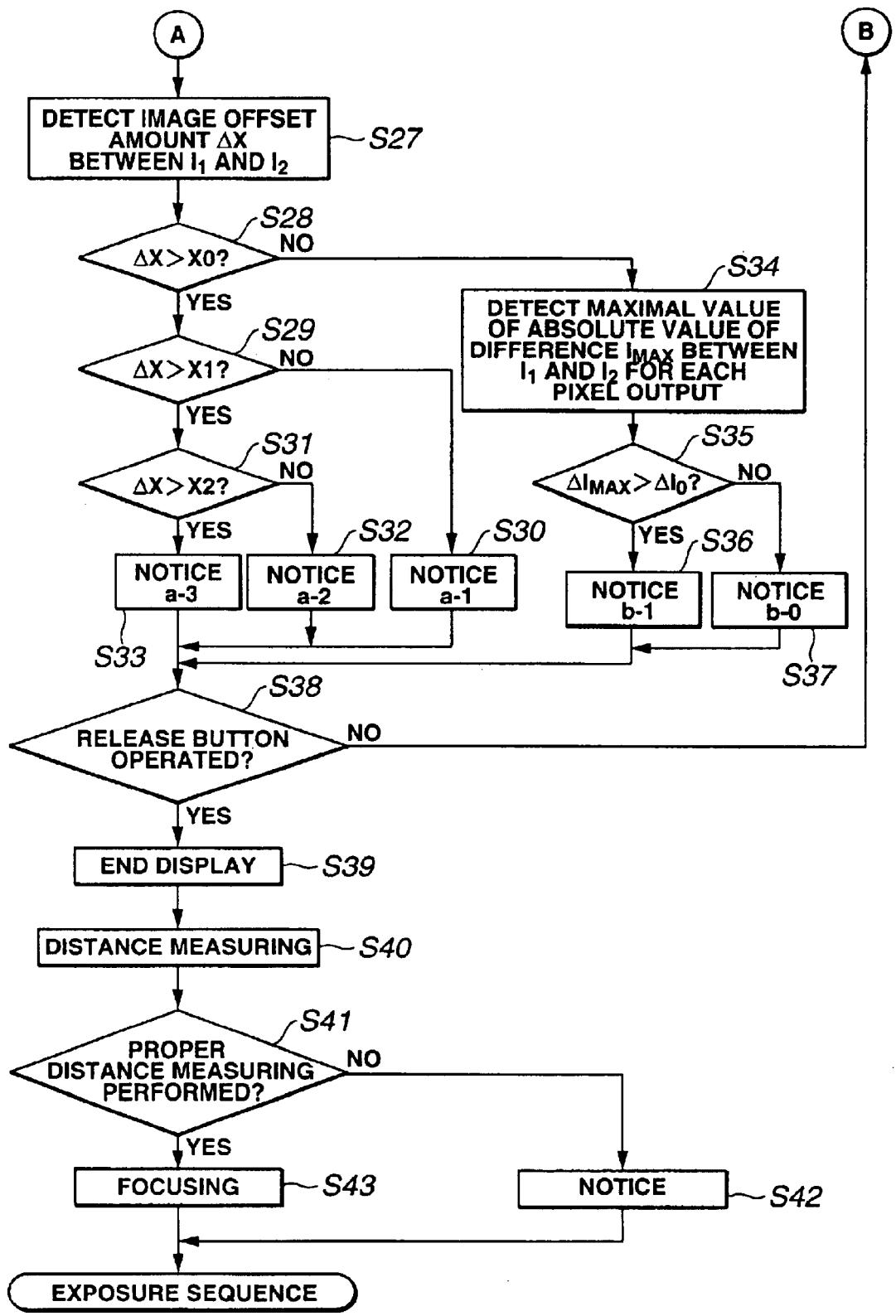
FIG. 12 is a flowchart which indicates judgment control procedure for blurring due to the movement of hands in the CPU of the camera of the first embodiment.

Subsequently, description will be made regarding a case wherein a notice is given according to the moved amount as described in FIGS. 4B and 4C, with reference to flowcharts shown in FIGS. 11 and 12. FIGS. 11 and 12 show flowcharts which describe the procedure wherein the CPU within the camera judges and controls for performing such judgment with regard to blurring due to the movement of hands. Note that, while in this case, description will be made regarding an example that a notice is given using the LCD8 in viewfinder, an arrangement may be made in the same way, except only the notice method, wherein a notice is given using the LED 33.

First of all, the CPU 1 judges whether or not the barrier 39 of the camera is opened (Step S21). In the event that judgment is made that the barrier 39 is not opened, the flow stands by until the barrier 39 is opened.

On the other hand, in the event that judgment is made that the barrier 39 is opened, the image of the subject 21 formed by the photo-receiving lens 6*a* is detected (Step S22). Subsequently, region-of-maximal-adjacent-signal-difference judgment, wherein the region where the difference between the image signals output from the adjacent pixels exhibits the maximal value, i.e., the contrast exhibits the maximal value, is judged, is performed, and the image signal $I_1$ in the region is detected (Step S23). Note that the timing for detecting the image signal $I_1$ is the above-described timing $t_1$ in the region. Note that the image signal is detected in the region which exhibits the greatest contrast so that the following judgment is readily made.

Next, after waiting for a predetermined time period so as to make a timing $t_2$ for the second image signal detection (Step S24), the image of the subject 21 is detected again (Step S25). Next, region-of-maximal-adjacent-signal-difference judgment, wherein the region where the contrast is the greatest between the adjacent pixels is judged, is performed, and the image signal $I_2$ is detected at the region (Step S26).

Following detection of the image signals $I_1$ and $I_2$, the detected signals $I_1$ and $I_2$ are compared with each other. First of all, the image offset amount $\Delta X$ is detected for judgment with regard to the movement of the camera in the horizontal direction (Step S27). Subsequently, judgment is made whether or not the detected $\Delta X$ is greater than the predetermined value X0 (Step S28).

In the event that judgment is made that $\Delta X$ is greater than the predetermined value X0, a notice is given with regard to the movement of the camera in the horizontal direction. Note that, in this case, a notice is given, graded according to the movement, as described above. Accordingly, first of all, judgment is made whether or not the detected $\Delta X$ is greater than a predetermined value X1 (Step S29). In the event that judgment is made that $\Delta X$ is equal to or less than the predetermined value X1, a notice as described with reference to a-1 is given, i.e., display wherein shielding is performed on the lower region of the LCD8 in viewfinder is made (Step S30), and subsequently, the flow proceeds to Step S38.

Conversely, in the event that judgment is made that $\Delta X$ is greater than the predetermined value X1 in judgment in the above-described Step S29, judgment is made whether or not $\Delta X$ is greater than a predetermined value X2 (Step S31). In the event that judgment is made that $\Delta X$ is equal to or less than the predetermined value X2, the notice as described in a-2 is given, i.e., display wherein shielding is performed on the lower region and at the middle region of the LCD8 in viewfinder is made (Step S32), and subsequently, the flow proceeds to Step S38.

On the other hand, in the event that judgment is made that $\Delta X$ is greater than the predetermined value X2 in judgment in the above-described Step S31, the notice as described in a-3 is given, i.e., display wherein shielding is performed on all the region of the LCD8 in viewfinder (Step S33), and subsequently, the flow proceeds to Step S38.

On the other hand, in the event that judgment is made that $\Delta X$ is equal to or less than the predetermined value X0 in judgment in the above-described Step S28, a notice is given with regard to the movement of the camera in the vertical direction. Note that, in this case, only the information with regard to the presence or absence of the movement can be obtained, so a notice of the movement in the vertical direction is given in an on/off manner, as described above. Accordingly, first of all, the maximal absolute value of the difference $\Delta I_{MAX}$ between the image signals $I_1$ and $I_2$ for each pixel (Step S34). Subsequently, judgment is made whether or not the detected $\Delta I_{MAX}$ is greater than the predetermined value $\Delta I_0$ (Step S35). In the event that judgment is made that $\Delta I_{MAX}$ is greater than the predetermined value $\Delta I_0$, judgment is made that the movement is "presence", and the notice as described with reference to b-1 is given, i.e., display wherein shielding is performed on the upper region and the lower region of the LCD8 in viewfinder is made (Step S36), and subsequently, the flow proceeds to Step S38.

On the other hand, in the event that judgment is made that $\Delta I_{MAX}$ is equal to or less than the predetermined value $\Delta I_0$ in judgment in the above-described Step 35, it is judged that any movement does not exist and does not perform displaying on the LCD8 in viewfinder (Step 37), and subsequently, the flow proceeds to Step S38. Note that the aforementioned Step S37 corresponds to the notice a-0 or the notice b-0, described above.

Following giving either notice, judgment is made whether or not the release button 14 is pressed (Step S38). In the event that judgment is made that the release button 14 is not pressed, the flow returns to the above-described Step S21, and operation control for notifying of movement is repeatedly performed until the release button 14 is pressed.

Conversely, in the event that judgment is made that the release button 14 is pressed in judgment in the above-described Step S38, display of notice of the movement ends (Step S39), and subsequently, a photography sequence is started. First of all, distance measuring wherein the distance to the subject is calculated is performed (Step S40). Subsequently, judgment is made whether or not the accurate results of distance measuring have been obtained (Step S41). In the event that judgment is made that accurate results of distance measuring have not been obtained due to the movement of the camera, a notice is given again as described above (Step S42). The user recognizes the notice, and thus the user can take countermeasures as to the movement, e.g., the user can tightly hold the camera. Following such notice being given, the exposure sequence is started. Note that known methods may be applied to the control for the exposure sequence, so description will be omitted.

On the other hand, in the event that judgment is made that the accurate results of distance measuring have been obtained in judgment in the above-described Step S41, focusing of the photography lens barrel 34 is performed (Step S43), and the subsequent exposure sequence is started.

As described above, with the first embodiment, using the AF sensor which can detect the change in the position of the camera only in the one direction, accurate detection can be made with regard to the change in the position in the direction orthogonal thereto, as well, thereby enabling judgment with high reliability as to the movement to be made.

As described above, description has been made based on the first embodiment, the present invention is not restricted to the first embodiment, but rather, it is needless to say that various modifications and applications can be made without departing from the spirit and scope of the invention.

As described above in detail, the present first embodiment provides a camera with low costs wherein using a sensor array positioned in the base-length direction, accurate detection is made with regard to the movement in the direction orthogonal thereto, as well, thereby giving a warning of blurring due to the movement of hands according to judgment with high reliability with regard to blurring due to the movement of hands.

Note that, as described above, in the event that judgment is made as to blurring due to the movement of hands based on the image offset amount from the subject image data obtained from a linear line sensor, detection of the blurring due to the movement of hands can be easily made with a simple configuration. However, since there is no relation between the amount of blurring due to the movement of hands in the vertical direction and the image offset amount, the present first embodiment has an aspect that the detection of blurring due to the movement of hands in the direction orthogonal to the array direction of the linear sensor is difficult.

Accordingly, description will be made below regarding an arrangement wherein detection of the blurring due to the movement of hands can be made with higher precision (second embodiment) with reference to the drawings.

Description of Second Embodiment

A camera having a function of detection of blurring due to the movement of hands according to a present second embodiment comprises liquid crystal display means for displaying the photography range (field of viewfinder) in the photography mode, provided in the viewfinder of the camera, with the change in the transmissivity of light, and movement detection means for detecting the vibration of the camera and giving information with regard to occurrence of blurring due to the movement of hands, including the aforementioned distance-measuring sensor, and also a monolithic accelerometer. Techniques are employed in the present embodiment, wherein in the event that the blurring due to the movement of hands occurs, transmissivity of light on the display region of the liquid crystal display means is changed so as to form patterned display, thereby facilitating the user easily recognizing the occurrence of the blurring due to the movement of hands.

The aforementioned monolithic accelerometer is formed as an IC chip, and is a device wherein the acceleration is measured using the change in the capacitance generated between the movable pattern and the unmovable pattern, and with the second embodiment of the present invention, an arrangement disclosed in Japanese Unexamined Patent Application Publication No. 8-178954, or the like, may be employed, for example. With the configuration, both the patterns are formed of polysilicon on a silicon substrates, wherein one electrode is movably formed corresponding to acceleration, and another electrode is formed in a fixed manner against acceleration, so as to form a pair of capacitors. In the event that such silicon substrate is accelerated, the capacitance of one capacitor is increased, and the capacitance of another capacitor is decreased. A signal processing circuit is necessary for converting the difference of the capacitance into a voltage signal, and accordingly, these movable electrodes, a pair of capacitors, and the signal processing circuit are formed in the same substrate in a monolithic manner.

Furthermore, description is made in Japanese Unexamined Patent Application Publication No. 8-178954 regarding application techniques for operating safety devices such as control systems for automobiles, air bag, or the like, and description is further made regarding the fact that formation of the accelerometer in a monolithic manner improves the performance thereof, from the point of the size, cost, power requirement, reliability, and the like. The present embodiment provides a camera for preventing blurring due to the movement of hands with high precision and high efficiency while maintaining the aforementioned performance, by efficiently disposing and controlling such devices, taking the characteristic situation of cameras into consideration. An arrangement may be made wherein this part is configured with a shock sensor or the like, for detecting shock.

FIGS. 13A, 13B, 14A, and 14B illustrate configuration examples of a camera having a function of detection of blurring due to the movement of hands according to the present second embodiment. Note that the same components are denoted by the same reference characters as with the above-described embodiment, and description will be omitted.

Figure 13A:
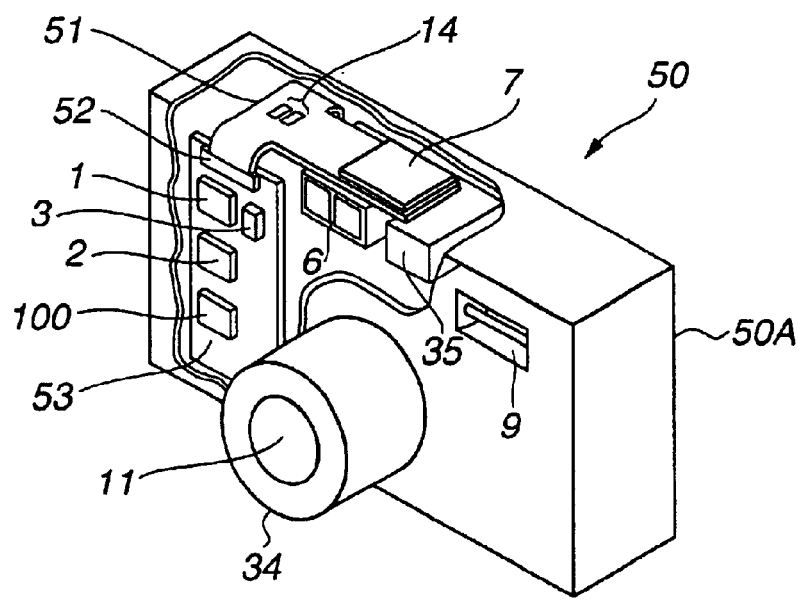
FIG. 13A is a perspective view which illustrates an external configuration of a camera according to a second embodiment of the present invention.
Figure 13B:
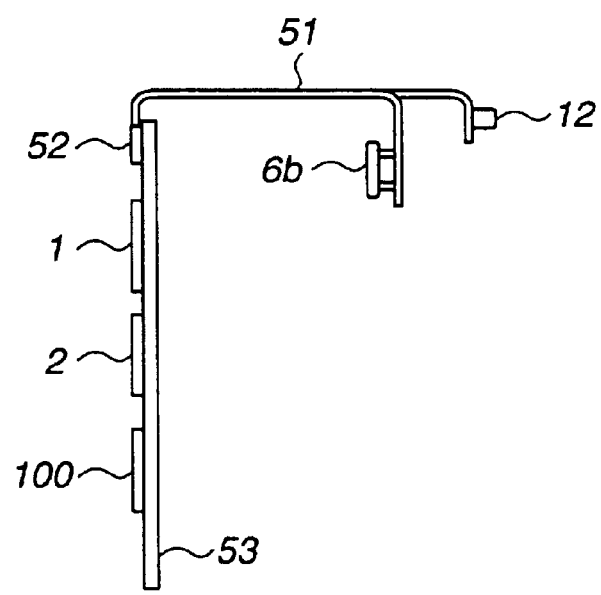
FIG. 13B is a configuration diagram which illustrates the disposition relation between a rigid printed board and a flexible printed board, employed in the camera of the second embodiment.

FIG. 13A illustrates an external-view configuration of the camera having a function of detection of blurring due to the movement of hands according to the present second embodiment, and is a configuration perspective view, partially broken away so as to illustrate the internal configuration, and FIG. 13B is a configuration diagram which illustrates the disposition relation between the rigid printed board and the flexible printed board, employed in the camera of the present second embodiment. Note that the principle of distance measuring employed in the present second embodiment is the same as shown in FIG. 2.

As shown in FIG. 13A, a camera 50 of the present embodiment mainly comprises a camera main unit 50A wherein in addition to the photography lens 11, strobe 9, the viewfinder objective-lens unit 35 and photo-receiving lenses of the distance measuring unit for AF and the like, are disposed on the front face of the camera main unit 50A. The camera main unit 50A includes an electronic circuit group therein for fully automatically operating the camera 50. The electronic circuit group includes the aforementioned monolithic accelerometer (accelerometer IC) 100 mounted on the rigid printed board 53. FIG. 13A is partially broken away so as to illustrate the partial internal configuration, in order to show the positional relation.

Furthermore, a one-chip microcomputer (CPU) 1 serving as controller for controlling the operations with regard to photography of the entire camera, and the interface IC (IFIC) 2 for operating an actuator such as a motor or the like, so as to drive the mechanical mechanism, are mounted on the rigid printed board 53, besides the acceleration IC 100. Furthermore, memory 3, e.g., EEPROM, is provided near the CPU 1, for storing the data in order to adjust the uneven components in the camera manufacturing process.

FIG. 13B is a configuration diagram which illustrates the relation between the rigid printed board 53 and the flexible printed board 51 as viewed from the side of the camera. As shown in FIG. 13B, the rigid printed board 53 cannot be bent along the curved surface inside the camera, so the flexible printed board 51 is used, and the rigid printed board 53 and the flexible printed board 51 are connected with a connector 52.

The display device (LCD) 7 (see FIG. 13A) is mounted on the flexible printed board 51, and furthermore, a communication line for the autofocus (AF) sensor 6 and a switching pattern 14 are formed on the flexible printed board 51. The flexible printed board 51 is bent along the curved surface inside the camera main unit 50A up to the rear thereof, and notifying devices of the warning display unit 12, such as an audio emitting device PCV, or an LED, LCD, or the like, are mounted thereon as shown in FIG. 13B. The signals output from the CPU 1 are transmitted to the warning display unit 12, and also the CPU 1 transmits and receives the signals to and from the AF sensor 6b.

The AF sensor 6 obtains the distance to the subject 21 using the principle of the trigonometric measuring, that is to say, the image signals 22 from the subject 21 are detected using the two photo-receiving lenses 6a and sensor arrays 6b, and the distance to the subject can be detected from the relative position difference X, as shown in FIG. 2.

In this case, in general, the subject has shade in the vertical direction, and accordingly, these two photo-receiving lenses 6a are disposed in the horizontal direction (X direction) as shown in FIG. 13A, and the sensor array 6b is divided into pixels in the horizontal direction, as well. With such disposition configuration, in the event that the blurring occurs in the horizontal direction due to the movement of hands, the image offset is detected in the X direction.

Figure 14A:
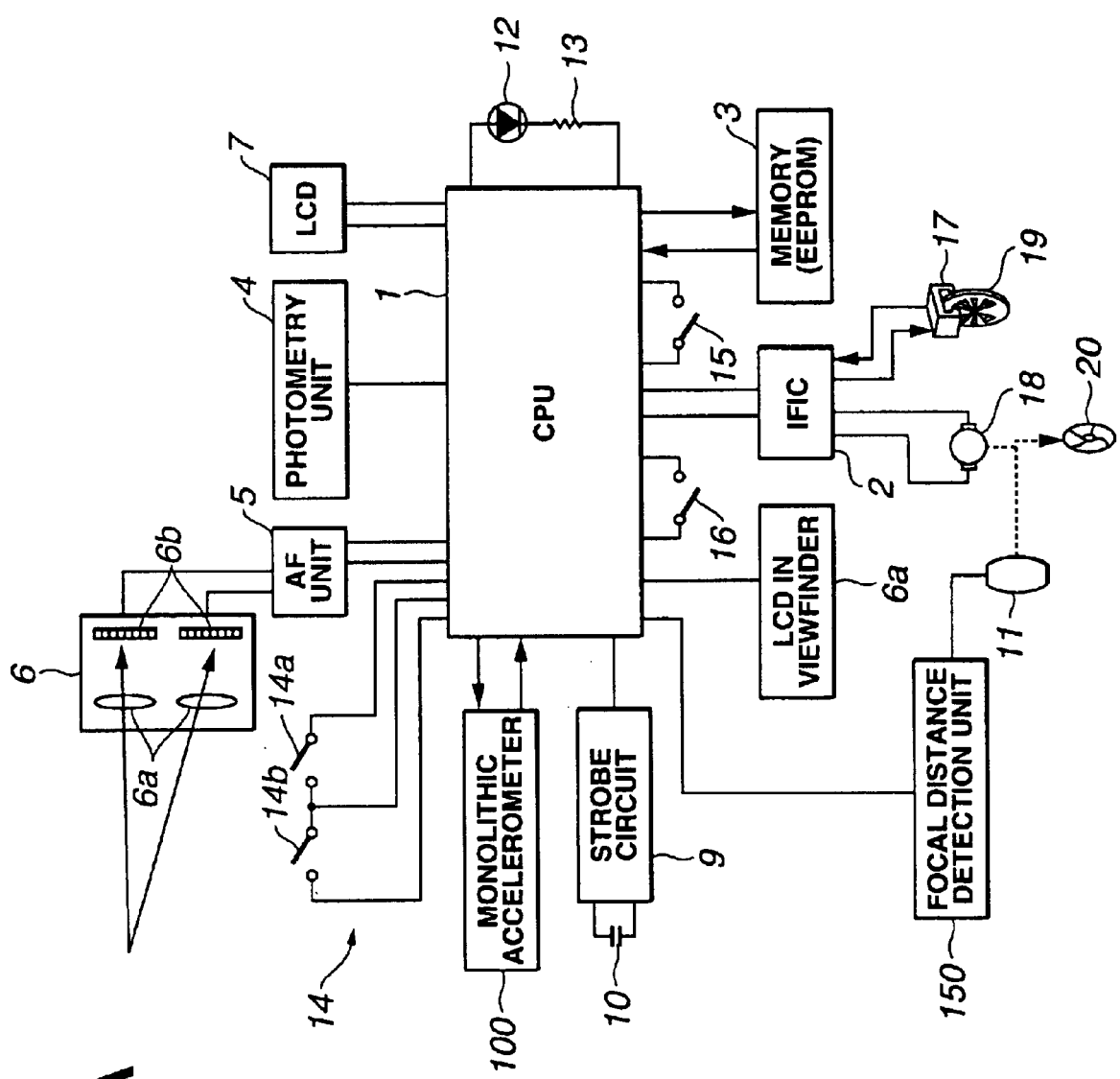
FIG. 14A is a block circuit diagram of the camera according to the second embodiment.
Figure 14B:
FIG. 14B is a diagram which illustrates the disposition direction of an acceleration IC of the camera according to the second embodiment.

Accordingly, the accelerometer IC 100 is disposed so as to detect the movement in the Y direction rather than the X direction, as shown in FIG. 14B, whereby the movements in the X direction and the Y direction can be detected by the different kinds of sensors, i.e., the AF sensor and the accelerometer.

Now, description will be made in detail regarding a further specific configuration of the accelerometer IC 100 with reference to FIGS. 15A through 15E, and FIGS. 16A through 16C.

FIGS. 15A through 15E show explanatory diagrams which illustrate an example of the manufacturing process for the aforementioned accelerometer IC 100, and FIGS. 15A through 15E correspond to the manufacturing process order (first through fifth process).

Figure 16A:
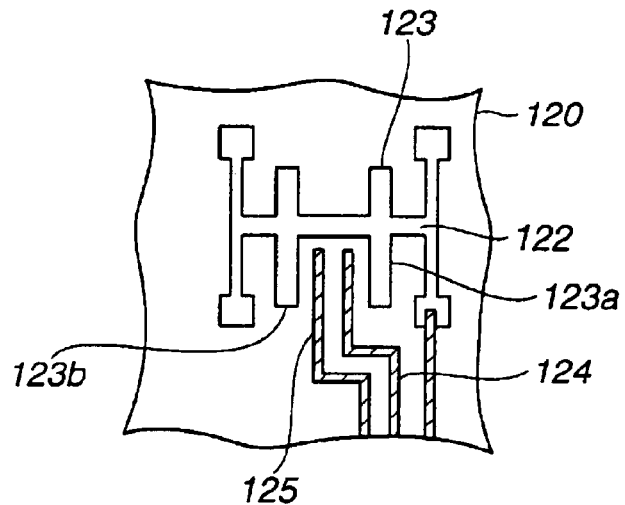
FIG. 16A is a diagram which illustrates a specific configuration of the acceleration IC of the camera according to the second embodiment, and is a configuration diagram on a silicon substrate.
Figure 16B:
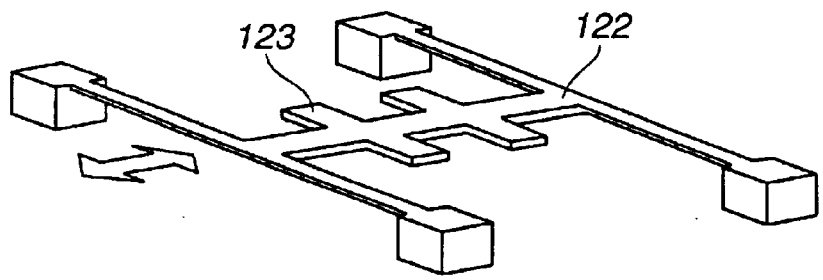
FIG. 16B is a diagram which illustrates a specific configuration of the acceleration IC of the camera according to the second embodiment, and is a configuration perspective view of the silicon substrate including movable electrodes and arm units.
Figure 16C:
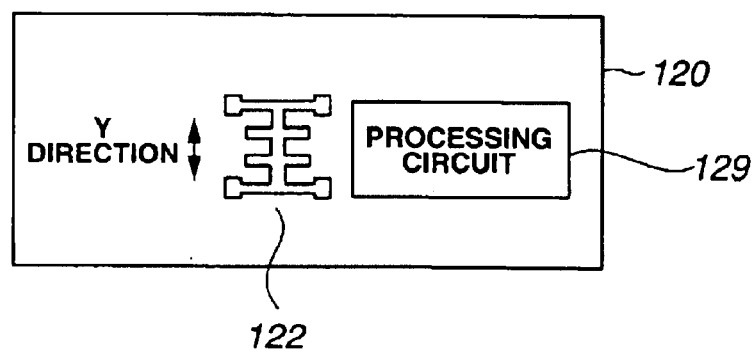
FIG. 16C is a diagram which illustrates a specific configuration of the acceleration IC of the camera according to the second embodiment, and is a configuration diagram which illustrates an IC configuration including a processing circuit formed on the silicon substrate.

FIGS. 16A through 16C illustrate a specific configuration of the aforementioned accelerometer IC 100, wherein FIG. 16A is a configuration diagram which illustrates a configuration on a silicon substrate, FIG. 16B illustrates a configuration perspective view which illustrates the silicon substrate containing a movable electrode and arm units, and FIG. 16C is a configuration diagram which illustrates an IC configuration formed on the silicon substrate including a processing circuit.

Figure 15A:
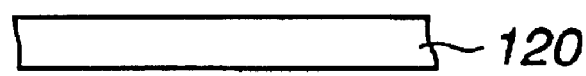
FIG. 15A is an explanatory diagram which illustrates a manufacturing process example for the acceleration IC of the camera according to the second embodiment, and is a diagram which illustrates a first process.
Figure 15B:
FIG. 15B is an explanatory diagram which illustrates a manufacturing process example for the acceleration IC of the camera according to the second embodiment, and is a diagram which illustrates a second process.
Figure 15C:
FIG. 15C is an explanatory diagram which illustrates a manufacturing process example for the acceleration IC of the camera according to the second embodiment, and is a diagram which illustrates a third process.
Figure 15D:
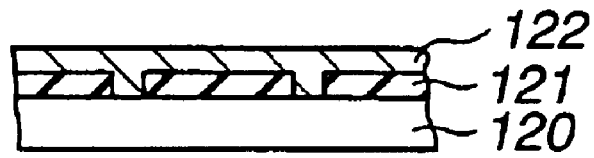
FIG. 15D is an explanatory diagram which illustrates a manufacturing process example for the acceleration IC of the camera according to the second embodiment, and is a diagram which illustrates a fourth process.

First of all, an oxide layer 121 is formed on a silicon substrate (IC chip) 120 (see FIGS. 15A and 15B), a patterned photo-resist mask is formed on the oxide layer 121 so as to remove the exposed part of the oxide layer 121 by etching, and subsequently, the resist mask is removed, whereby aperture portions can be formed at arbitrary regions (see FIG. 15C).

Figure 15E:
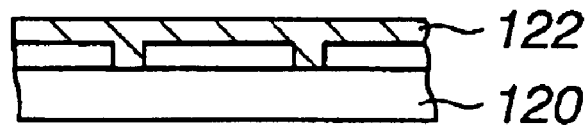
FIG. 15E is an explanatory diagram which illustrates a manufacturing process example for the acceleration IC of the camera according to the second embodiment, and is a diagram which illustrates a fifth process.

Subsequently, following a polysilicon layer 122 being deposited on the surface thereof (see FIG. 15D), the oxide layer 121 is selectively removed using wet etching, whereby the polysilicon layer 122 having a bridge-shaped structure is formed on the silicon substrate 120 (see FIG. 15E). The polysilicon layer is subjected to impurity diffusion of phosphor or the like so as to give conductivity. With the bridge-shaped structure, a movable electrode 122 having supports at four corners thereof is formed on the silicon substrate 120, as shown in FIG. 16B.

Furthermore, other electrodes 124 and 125 are formed on the silicon substrate 120 as shown in FIG. 16A, and are disposed at positions adjacent to the arm units 123a and 123b of the aforementioned movable electrode 122, whereby minute capacitance is formed between the arm unit 123a and the electrode 124, and between the arm unit 123b and the electrode 125. Furthermore, by disposing an IC chip having the movable electrode configuration on the silicon substrate 120 as shown in FIG. 16C, an IC with a processing circuit which can make judgment with regard to the acceleration in a predetermined direction can be formed in a monolithic manner.

That is to say, the processing circuit 129 is formed on the chip in an on-chip manner together with the aforementioned movable electrode capacitor formed in a monolithic manner, as shown in FIG. 16C. The IC detects the change in capacitance due to the movement of the movable electrode 122, and outputs the signals corresponding to the acceleration. Due to the movement of the bridge-shaped movable electrode 122, the capacitance formed with one electrode of the aforementioned two electrodes is increased, and the capacitance formed with another electrode is decreased, and accordingly, the acceleration can be detected in the arrow direction shown in FIG. 16B.

Accordingly, when the IC chip having such configuration is mounted on the camera, the acceleration can be detected in the Y direction shown in FIG. 14B.

Figure 17A:
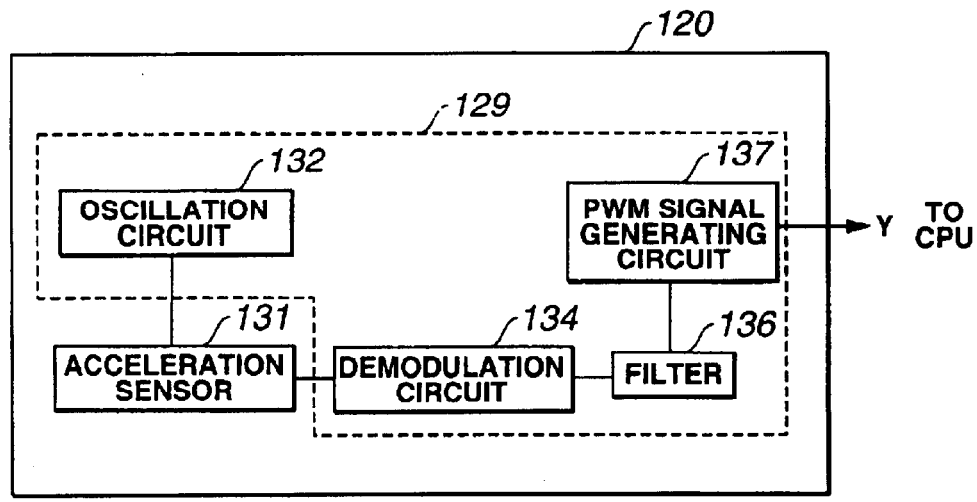
FIG. 17A is a block diagram which illustrates an acceleration judgment processing circuit of the camera according to the second embodiment.

FIG. 17A is a block diagram which illustrates a configuration example of the aforementioned processing circuit 129.

As described above, the capacitance components are formed between the arm unit 123a and the electrode 124, and between the arm unit 123b and the electrode 125, wherein the arm units 123a, 123b and electrodes 124, 125 are included in a Y-direction acceleration sensor 131 for detecting the movement in the Y direction. These capacitance components changes due to the movement of the arm units 123a and 123b. The change in the capacitance is converted into electric signals by the processing circuit 129.

As shown in FIG. 17A, the processing circuit 129 comprises a carrier-wave generating device (oscillation circuit) 132 for generating pulse-shaped carrier waves, a demodulator circuit 134 for demodulating the oscillation waves which have been changed due to the change in the capacitance of the Y-direction acceleration sensor 131 with fullwave switching rectification, a filter circuit 136 for outputting analog signals corresponding to the acceleration, and a PWM signal generating circuit 137 for performing analog-PWM conversion.

Figure 17B:
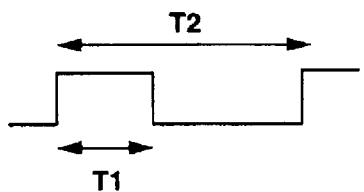
FIG. 17B is a diagram which illustrates an output waveform from the acceleration judgment processing circuit of the camera according to the second embodiment.

FIG. 17B illustrates an output wave from the aforementioned processing circuit 129. As shown in the drawing, with the output from the processing circuit 129, the duty ratio (ratio of T1 to T2) of the pulse is changed corresponding to the acceleration.

Thus, the accelerometer IC 100 outputs the voltage signals proportional to acceleration, or the pulse-width modulation (PWM) signals proportional to acceleration. The CPU 1, which can handle only the digital signals, can detect the acceleration by demodulating the PWM signals using an internal counter. With regard to the voltage signals proportional to the acceleration, an adjusting device or the like having an A/D converter may be employed. Note that, in the event of using the PWM signals, there is no need to mount an A/D converter on the CPU 1.

FIG. 14A is a block circuit diagram of the camera on which such accelerometer IC 100 is mounted, and description will be made regarding the configuration of main components with reference to this drawing.

FIG. 14A illustrates an electric circuit configuration of the camera 50 of the present second embodiment.

The camera 50 of the present second embodiment comprises the CPU 1 for controlling the entire camera, the IFIC 2, the monolithic accelerometer (accelerometer IC) 100, the memory (EEPROM) 3 for storing adjusting data, the autofocus (AF) unit 5, the photometry unit 4, the liquid crystal device (LCD) 7 for displaying the setting state of the camera and information with regard to photography, the LCD8 in viewfinder, provided within the viewfinder, for displaying information with regard to photography, the strobe unit 9 including an light-emission tube for emitting auxiliary light or the like, the main capacitor 10 for holding charges for energizing the light-emission tube, the photography lens 11 having a zoom function, the warning display unit 12 including LEDs, the resistance 13 serially connected to the warning display unit 12, the switches 14a and 14b for starting a photography sequence of the camera, the motor 18 for driving drive mechanisms for the photography lens 11, shutter 20, film feeding, and the like, the rotational blade 19 which rotates in interlocking to the motor 18, and the photo-interrupter 17 for optically detecting apertures of the rotational blade 19, which rotates for driving and controlling the motor 18.

Note that an arrangement may be made wherein an unshown switching mechanism switches the drive mechanism to be driven such that one motor 18 can drives each of driving mechanisms such as the photography lens 11, the shutter 20, or the like, or an arrangement may be made wherein each mechanism has an individual motor.

With the above-described configuration, the CPU 1 performs and controls the photography sequence of the camera according to the actions of the release switches 14a and 14b. That is to say, the CPU 1 gives a warning display on the LCD8 in viewfinder for giving a warning of blurring due to movement of hands according to the output from the monolithic accelerometer 100, and also drives the distance-measuring unit 5 for AF, and the photometry unit 4 for measuring luminance of the subject for controlling exposure, at the time of taking a picture, and receives necessary signals so as to control the motor 18 through the aforementioned IFIC 2.

At this time, the rotation of the motor 18 is transmitted to the rotational blade 19. The signals output from the photo-interrupter 17 according to the detection of the presence or absence of the aperture of the rotational blade 19, are subjected to adjustment of waveform by the IFIC 2, and are output to the CPU 1. The CPU 1 monitors the rotation of the motor 18 based on the signals output from the IFIC 2. Furthermore, the CPU 1 performs emission of the auxiliary light with the strobe circuit 9 as necessary.

Furthermore, the CPU 1 reads out the focal distance conditions of the photography lens from a focal distance detection unit 150 for AF control and the like.

Note that notifying of movement according to the present second embodiment may be made has shown in FIGS. 3A through 3D, as described above.

Next, description will be made in detail regarding the principle of detection of vibration for the camera with the above-described configuration with reference to FIGS. 18A through 21, and the like.

Figure 18A:
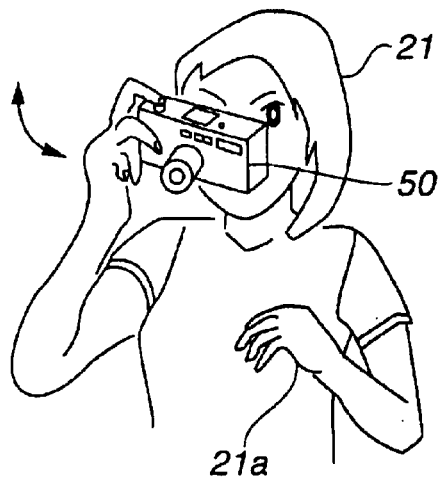
FIG. 18A is a diagram which illustrates the user holding the camera according to the second embodiment.
Figure 18B:
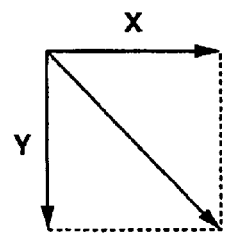
FIG. 18B is a diagram which indicates the vibration detection direction of the camera according to the second embodiment.

FIGS. 18A and 18B are explanatory diagrams for describing the vibration of the camera according to the second embodiment when blurring is occurring due to the movement of hands, wherein FIG. 18A is a diagram which illustrates a scene of the user holding the camera, and FIG. 18B is a diagram which illustrates the direction of the vibration detection for the camera.

Figure 19A:
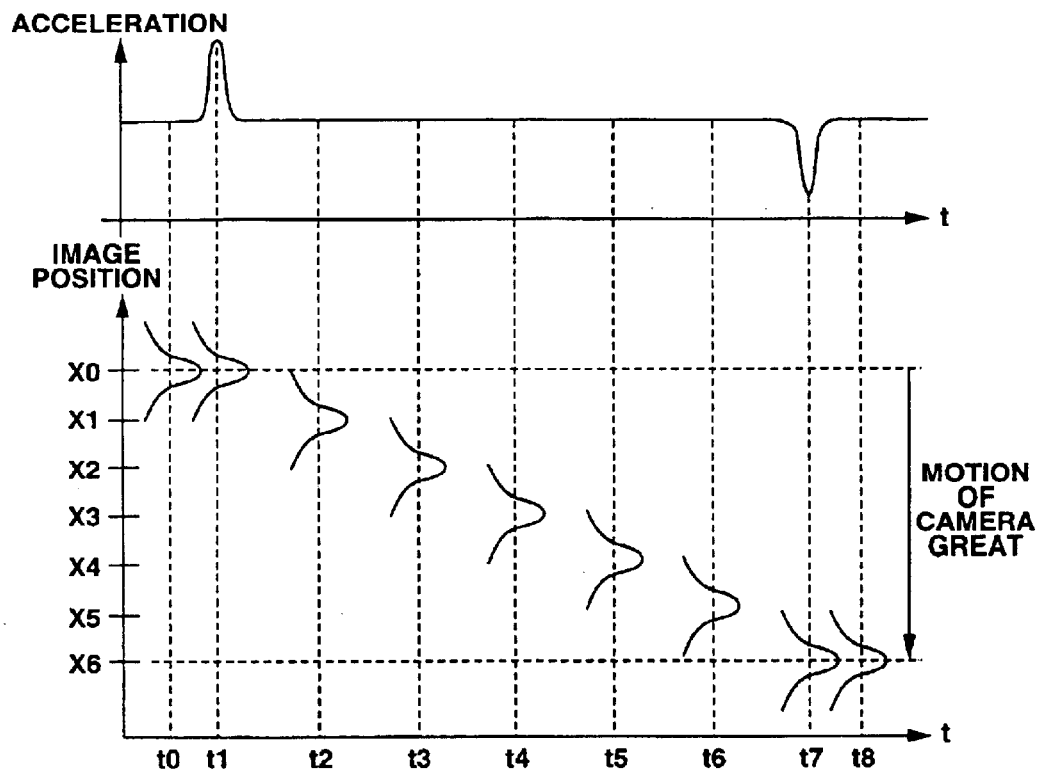
FIG. 19A is a properties diagram which indicates the relation between time and the acceleration property depending on the moved distance of the camera according to the second embodiment.
Figure 19B:
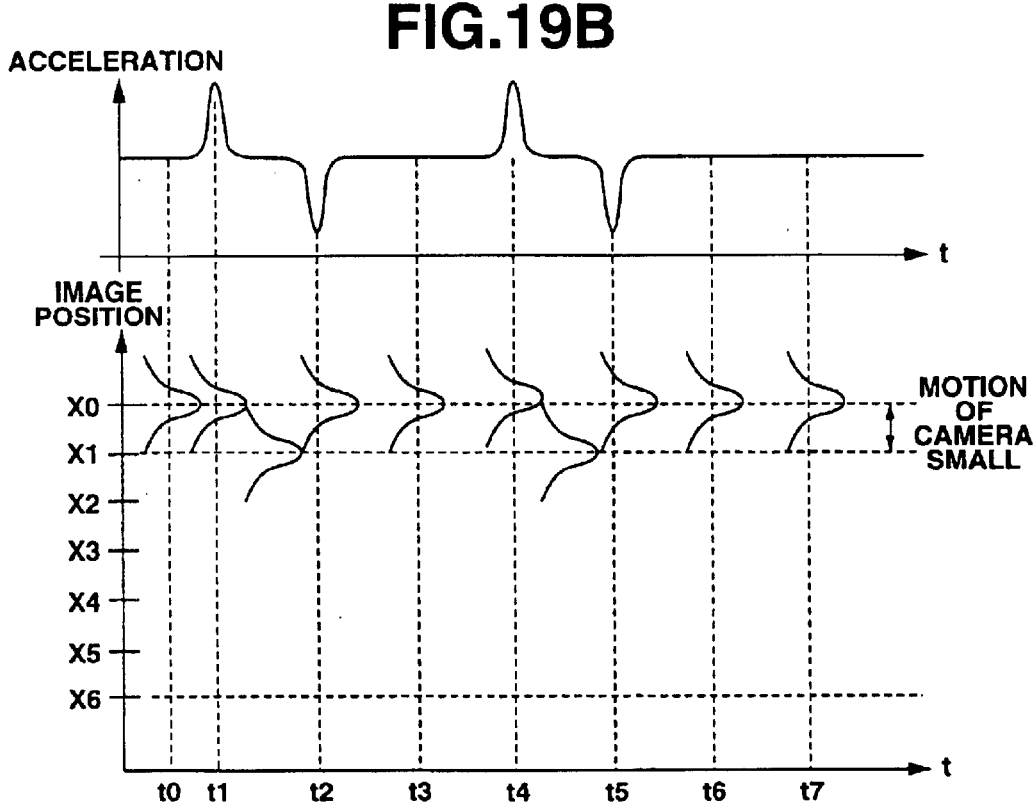
FIG. 19B is another properties diagram which indicates the relation between time and the acceleration property depending on the moved distance of the camera according to the second embodiment.

FIGS. 19A and 19B are property diagrams which illustrate the relation between time and the acceleration, corresponding to the moved distance of the camera, according to the second embodiment, wherein FIG. 19A illustrates a case of the moved amount of the camera being great, and FIG. 19B illustrates a case of the moved amount of the camera being small.

FIGS. 20A through 20D are explanatory diagrams for describing the detection operations for the vibration of the camera according to the second embodiment, and operational procedure examples and display examples are shown in FIGS. 20A through 20D, respectively.

Figure 21:
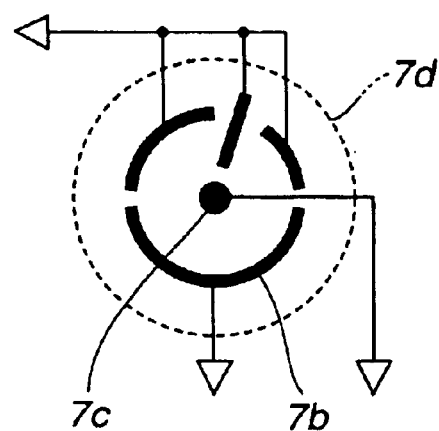
FIG. 21 is a configuration diagram which illustrates a configuration of display segments within an LCD of the camera according to the second embodiment.

FIG. 21 is a configuration diagram which illustrates the configuration of a display segment within the LCD of the camera according to the second embodiment.

Now, let us say that the user takes a picture using the camera. In this case, as shown in FIG. 18A, the user 21 might hold the camera 50 with one hand, and in such a case, the camera 50 is readily moved by a minute distance in an oblique direction. That is to say, the minute vibration of the camera 50 can be broken down into the movements in the X direction and the Y direction, as shown in FIG. 18B.

In general, many users do not take into consideration the fact that the above-described minute vibration causes blurring when photographing. With the camera 50 of the present second embodiment, the camera 50 detects the minute vibration, and gives a display as described in FIGS. 3A through 3D, so the user 21 can perform countermeasures for suppressing the vibration for photography such as holding the camera with the left hand as well, thereby enabling photography without failure by blurring due to the movement of hands.

Figure 20A:
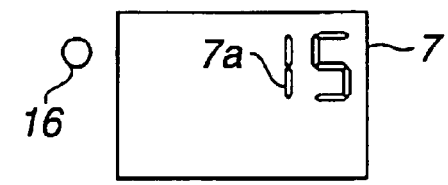
FIG. 20A is a diagram which illustrates the operational procedure for detection of the vibration of the camera and a display example according to the second embodiment.
Figure 20B:
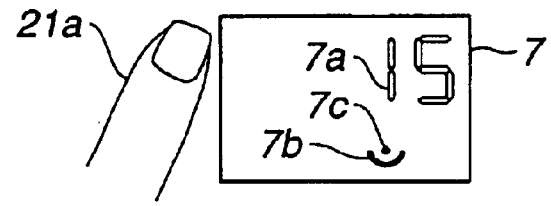
FIG. 20B is a diagram which illustrates the operational procedure for detection of the vibration of the camera and a display example according to the second embodiment.
Figure 20C:
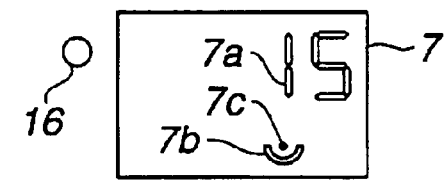
FIG. 20C is a diagram which illustrates the operational procedure for detection of the vibration of the camera and a display example according to the second embodiment.

On the other hand, advanced users who sufficiently take the occurrence of blurring due to movement of hands into consideration may regard the warning function as a nuisance, and rather might desire photography with blurring due to movement of hands as an effect, so accordingly, with the present embodiment, the holding checking function is included in the photography modes for the camera, and only in the event that the user desires the function, the function is set. That is to say, as shown in FIG. 20A, a switch 16 and a liquid crystal display unit 7 are provided for selecting the photography mode, and in the normal state, only the functions such as a film counter 7a and the like are operated. On the other hand, only in the event that the user 21 operates the mode switching switch 16 with the left hand 21a or the like as shown in FIG. 20B, the blurring-due-to-movement-of-hands detection mode is set. In the event that the blurring-due-to-movement-of-hands detection mode is set, the display segments 7b and 7c are displayed as shown in FIGS. 20B and 20C, and furthermore, in the event that the display segment 7b is blinked, the user can recognize that the holding check mode has started.

Figure 20D:
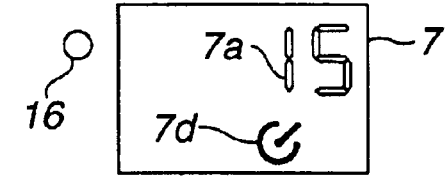
FIG. 20D is a diagram which illustrates the operational procedure for detection of the vibration of the camera and a display example according to the second embodiment.

With the present embodiment, the mode display is performed using part of display for the self-timer mode, as shown in FIG. 20D, and accordingly, the mode display does not require expanding the layout within the liquid crystal display unit (LCD) 7. Note that the display segments 7b and 7c are independently wired within the liquid display unit 7 as shown in FIG. 21, and accordingly, the CPU 1 can independently control the display segments 7b and 7c.

In a case that the blurring-due-to-movement-of-hands detection mode is set, and the user 21 holds the camera 50, in the event that holding is unstable, the LCD8 in viewfinder is blinked so as to give a warning to the user 21 as described above. Also, as shown in FIG. 4A, an arrangement may be made wherein the LEDs around the viewfinder eyepiece unit of the camera are blinked so as to giving a warning, as described above.

Also, an arrangement may be made wherein in the event that the movement of the camera 50 is occurring, the self-timer LED is blinked so as to give a warning, as shown in FIG. 5 as viewed from the front face of the camera 50, and thus, in the event that the user makes a request to another person for taking a picture of the user, the user can check the movement of the camera held by the person.

Next, description will be made in detail regarding the difference between the output from the AF sensor (image signals) and the output from the acceleration sensor, which is a feature of the present embodiment, with reference to FIGS. 19A and 19B.

Now, let us say that the camera 50 is moved due to holding by the user 21, and accordingly, blurring due to the movement of hands occurs both in the X direction and the Y direction as shown in FIGS. 18A and 18B.

In this case, with the camera 50 according to the present second embodiment, the moment the camera 50 vibrates, the acceleration sensor (accelerometer IC) 100 outputs a signal at a timing of t=t1 due to the movement of the camera 50 as shown in FIG. 19A. Subsequently, in the event that the camera 50 moves at a constant velocity, the acceleration of the camera 50 is zero, and accordingly, the acceleration sensor 100 outputs no signals, although blurring due to the movement of the camera occurs. In the event that the camera stops again, the acceleration sensor 100 outputs a signal in the direction wherein the aforementioned uniform motion of the camera is stopped, at a timing of t=t7.

The image sensor (AF sensor) of the camera continuously outputs image signals during the uniform motion of the camera so as to compensate for the acceleration sensor, and accordingly, the CPU 1 of the camera 50 can judge as to the movement of the camera 50 by judging the output from the AF sensor even in the event that the output from the acceleration sensor 100 is zero.

On the other hand, as shown in FIG. 19B, even in the event that image signals hardly change, the acceleration sensor 100 could output signals. In this case, the user 21 attempts to fixedly hold the camera 50, but holds with minute tremor of the hands, and the change in the image is small, unlike the state shown in FIG. 19A. In many cases, the user can take a picture without problems depending on the focal distance even in such a state. That is to say, even in the event that the acceleration sensor 100 outputs great signals, the camera 50 could be moved by a minute length, and conversely, even in the event that the acceleration sensor 100 rarely outputs signals, the position of the camera could be greatly changed.

On the other hand, blurring detection with the AF sensor has several problems. For example, in the event that there is no contrast in the image, or in the event that the image cannot be recognized due to darkness, the change in the image cannot be obtained, and consequently, judgment cannot be made with regard to blurring. Furthermore, with the sensor for detecting only in one direction as in the present embodiment, there are difficulties in accurately detecting the movement of the camera 50 or the change in the image in a direction different from the detection direction of the AF sensor, and furthermore, in the event that the camera 50 is greatly moved, the AF sensor loses the monitored position in the image, and in this case, accurate judgment cannot be made with regard to the blurred amount.

Accordingly, the method for judging blurring using the above-described two sensors, i.e., the AF sensor and the acceleration sensor, for compensating for each other, is necessary. With the camera of the present embodiment, the above-described two kinds of sensors with different detecting methods are mounted, and the camera has a holding check mode function.

Description will be made in detail regarding display control and the like executed by the CPU 1 within the camera having the above-described holding check mode function, following a sequence from a stored program, with reference to flowcharts shown in FIGS. 22A and 22B.

For example, with the present second embodiment, when the barrier 39 for protecting the front lens is opened as shown in FIG. 5, first of all, the user performs framing and does not tightly hold the camera yet, as well, so the camera is greatly vibrated, and accordingly, valid judgment cannot be made by the AF sensor. The AF sensor monitors only the narrow region within the screen, and accordingly, quantitative evaluation cannot be made with regard to the great movement of the camera at all.

Accordingly, first of all, the CPU 1 within the camera 50 judges the output from the acceleration sensor (accelerometer IC) 100 in judgment processing in Step S101, and even in the event that shock is detected due to the barrier being opened, or the user holding the camera, warning display of holding is prohibited for a predetermined time period in the processing in the subsequent Step S102.

Subsequently, image detection is performed using the AF sensor in the processing in Step S103. Thus, judgment is made whether or not image detection can be preferably employed for holding checking. That is to say, in the event that judgment is made that the luminance of the detected image is low in the following Step S104, or judgment is made that the contrast of the detected image is low in the Step S105, the CPU 1 does not employ the image signals, and the flow proceeds to Step S110 so as to make blurring judgment from acceleration detection. With the blurring judgment from acceleration detection, in the event that following a signal being output from the acceleration sensor, no signal corresponding to the acceleration in the opposite direction is output in a predetermined time period (Steps S111 through S112), a warning is given (Step S113). That is to say, judgment is made that the camera is moving at a constant velocity as shown in FIG. 19A, and warning that blurring due to the movement of hands could be caused is given to the user.

In this case, the user may be panning the camera, so the LCD in viewfinder is not blinked, and only the LEDs 33 around the viewfinder eyepiece unit are blinked as shown in FIG. 4A, unlike the case of the AF sensor also being employed (Step S127), for example.

On the other hand, in the event that the image signals can be suitably employed in blurring judgment, the CPU 1 repeatedly performs image detection (Steps S121, S124) at predetermined intervals (Step S122), and detection of blurring due to the movement of hands is performed based on the image offset amount and the sum of absolute values of the differences between image signals (description will be made later in detail regarding the processing in Step S125), in operations following Step S120. Subsequently, judgment is made whether or not a blurring flag (f_bure) exhibiting the result of the detection is set to "1" in judgment processing in the following Step S126. That is to say, the CPU 1 judges whether or not the blurring flag (f_bure) is set to "1" in the judgment processing, and in the event that judgment is made that the blurring flag (f_bure) is set to "1", the flow proceeds to the processing in Step S127 so as to give a warning of the camera being unstably held.

Recognizing such warning, the user can perform countermeasures for preventing the blurring due to the movement of hands, e.g., holding the camera with both hands, placing the camera on an object, or the like.

Furthermore, the CPU 1 judges whether or not a frame change flag (f_change) is set in judgment processing in the following Step S128. That is to say, the CPU 1 judges whether or not the frame change flag (f_change) is "1" in the judgment processing, and in the event that judgment is made that the image offset amount or the sum of the absolute values of the differences between image signals, obtained from the blurring detection in the aforementioned Step S125, is greater than a normal blurring judgment level, and the frame change flag (f_change) is set (1), it is considered that the user holds the camera from a quite different angle, or changes the frame, and accordingly, the flow returns to the processing in the aforementioned Step S101.

Furthermore, in the event that judgment is made that the frame change flag (f_change) is not set up ("0") in the judgment processing in the aforementioned Step S128, the CPU 1 makes the flow return to the processing in the aforementioned Step S122.

On the other hand, in the event that judgment is made that the blurring flag (f_bure) is not set up ("0") in the judgment processing in the aforementioned Step S127, the image signals are stable. Accordingly, in this case, release can be made, and the CPU 1 judges whether or not the release is pressed in the judgment processing in Step S129, and in the event of the release being pressing, an exposure sequence in Steps following Step S130 is performed. On the other hand, in the event that judgment is made that the release is not pressed, the flow returns to the processing in the aforementioned Step S122.

In the event that the release is pressed, first of all, the CPU 1 performs focusing and distance measuring for the focusing in the processing in Steps S130 and S131. In the processing in the following Step S132, an exposure time period is determined based on luminance information obtained from image detection performed in the aforementioned Step S103, simultaneously with which exposure is started.

If the camera is moved during the exposure time period, blurring due to the movement of hands is caused, and accordingly, the CPU 1 performs detection of acceleration in the processing in the following Step S133, whereby the acceleration g due to the shock during pressing of the release button, or the like, is obtained. That is to say, in a case of the acceleration g being great, blurring is caused in the picture even if the exposure time period is short, and conversely, even in a case of the acceleration g being small, blurring is caused in the picture in the event that the exposure time period is long, as well. In order to make judgment whether or not blurring is caused, the CPU 1 measures the exposure time period in the judgment processing in the following step S134, and makes judgment that exposure ends in Step S135. Subsequently, the velocity is obtained from the obtained acceleration g and the exposure time period tEND in the processing in the following Step S136, and the moved amount can be obtained from the fact that the camera is moved by the time of tEND at the velocity. Accordingly, in the event that the moved amount exceeds the blurring allowance amount $\Delta Y$ for the lens, display control is performed so as to give a warning in the processing in the following Step S137. Conversely, in the event that the moved amount does not exceed the blurring allowance amount $\Delta Y$, the processing ends.

While only the change in the velocity can be obtained from the acceleration alone as described above, with the present embodiment, first of all, judgment is made whether or not the camera is kept still at a predetermined position based on the fact that the output (image signals) from the AF sensor is not changed, and accordingly, accurate judgment can be made how much the camera has moved during exposure based on the output from the AF sensor as a reference.

Figure 23:
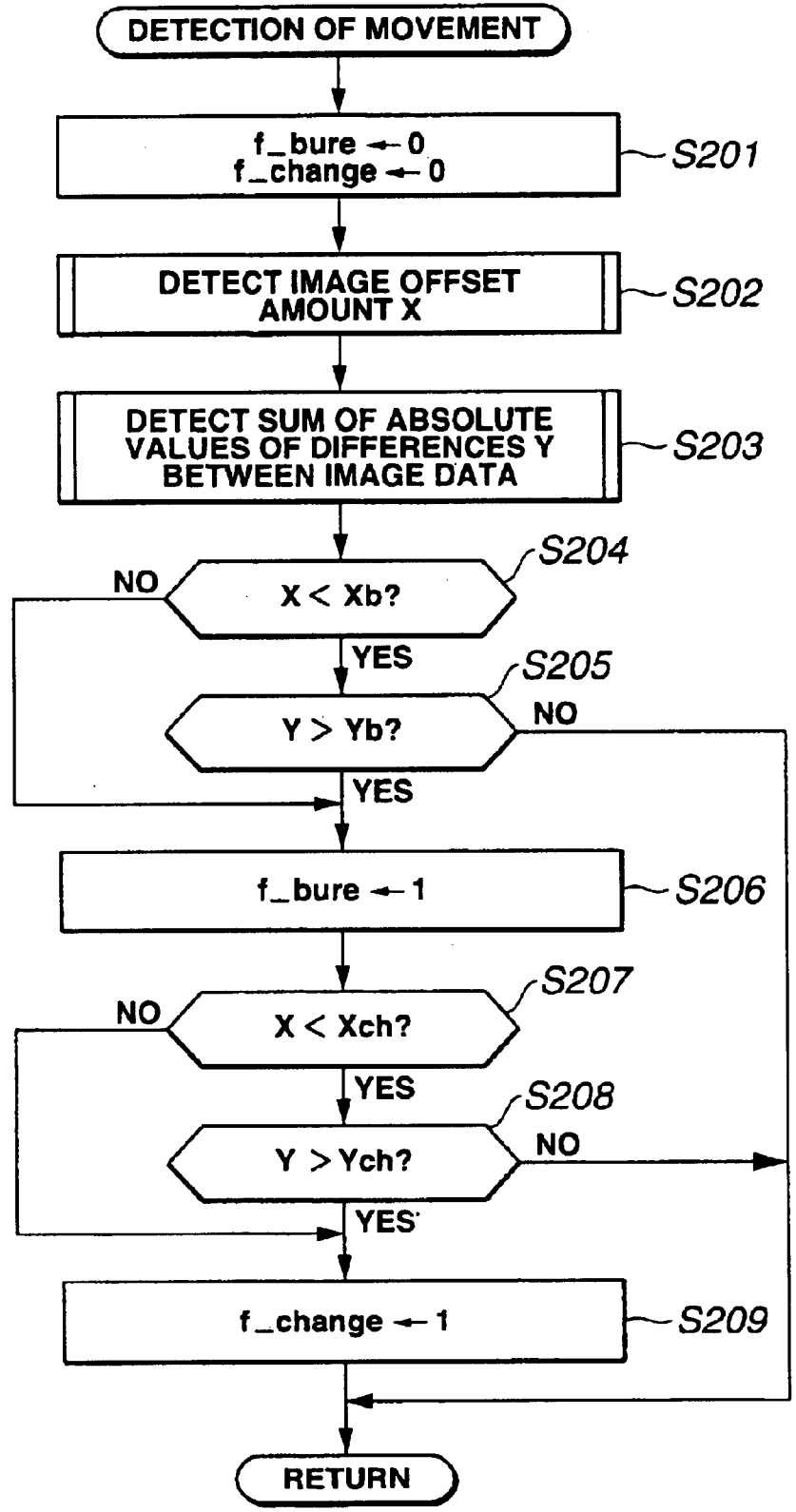
FIG. 23 is a flowchart which indicates a subroutine for movement detection processing according to the camera of the second embodiment.

Next, description will be made in detail regarding the blurring detection processing in the aforementioned Step S125 with reference to a flowchart shown in FIG. 23. FIG. 23 is a flowchart which illustrates a subroutine for performing the blurring detection processing in the aforementioned Step S125.

With the camera 50 according to the present second embodiment, the CPU 1 performs the processing in the aforementioned Step S125, following which the CPU 1 starts the subroutine for detection of blurring due to the movement of hands shown in FIG. 23. That is to say, the CPU 1 performs processing in Step S201, whereby the blurring flag (f_bure) and the frame change flag (f_change) are cleared (are set to "0"), and the flow proceeds to Step S202.

In the processing in Step S202, the CPU 1 detects the image offset amount X between the image data D(n−1) which has been detected in the previous detection and the image data D(n) which is detected in this detection based on correlation computation processing or the like described later, and subsequently, the flow proceeds to Step S203.

In the processing in Step S203, the CPU 1 detects the sum-of-absolute-value-of-difference Y between the image data D(n−1) which has been detected in the previous detection and the image data D(n) which is detected in this detection. In this case, with D(n−1) as a1, a2, . . . , and an, and with D(n) as b1, b2, . . . , and bn, the absolute value of the difference Y is represented by the following expression.

$$Y = \sum_{i=1}^{n} |a_i - b_i| \qquad (1)$$

Here, a1, a2, . . . , an represent output values which form the image data D(n−1) detected from photo-receiving elements making up the sensor array 6b in the previous detection, and b1, b2, . . . , bn are output values which form the image data D(n) detected from photo-receiving elements making up the sensor array 6b in this detection. That is to say, in the above-described Expression (1), the sum of the absolute values of the differences between the output values in the previous detection and the output values in this detection in the same photo-receiving elements is obtained.

The sum-of-absolute-value-of-difference Y between the image data is detected using the above-described Expression (1). Thus, the change between the image data detected in the previous detection and the image data detected in the this detection can be detected. That is to say, in the event that the camera is vibrated in the vertical direction, the monitor range of the AF sensor 6 is changed as shown in FIG. 8B, the image-data shape itself is changed as shown in FIG. 7A. Due to the change in the image-data shape, the above-described sum-of-absolute-value-of-difference Y between the image data exhibits a great value. Thus, in the event that the sum-of-absolute-value-of-difference Y between the image data exhibits a great value, judgment is made that the movement in the vertical direction of the camera has been caused.

Subsequently, the flow proceeds to the judgment processing in Step S204.

Subsequently, the CPU 1 compares the image offset amount X with a blurring judgment amount Xb in the judgment processing in Step S204, and in the event that judgment is made that the image offset amount X is less than the blurring judgment amount Xb, the flow proceeds to Step S205, and conversely, in the event that judgment is made that the image offset amount X is equal to or greater than the blurring judgment amount Xb, the flow proceeds to Step S206.

In the judgment processing in Step S205, the CPU 1 compares the above-described sum-of-absolute-value-of-difference Y between the image data D(n−1) and the image data D(n) with the blurring judgment value Yb, and in the event that judgment is made that the above-described sum-of-absolute-value-of-difference Y is greater than the blurring judgment value Yb, the flow proceeds to Step S206, and conversely, in the event that judgment is made that the above-described sum-of-absolute-value-of-difference Y is equal to or less than the blurring judgment value Yb, the blurring detection processing ends, and the flow returns.

In the processing in Step S206, the CPU 1 sets the blurring flag (f_bure). That is to say, the CPU 1 sets the blurring flag (f_bure) to "1", and subsequently, the flow proceeds to Step S207.

Subsequently, the CPU 1 compares the image offset amount X with a frame change judgment value Xch in the judgment processing in Step S207, and in the event that judgment is made that the image offset amount X is less than the frame change judgment value Xch, the flow proceeds to Step S208, and conversely, in the event that judgment is made that the image offset amount X is equal to or greater than the frame change judgment value Xch, the flow proceeds to Step S209.

In the judgment processing in Step S208, the CPU 1 compares the sum-of-absolute-value-of-difference Y between the image data D(n−1) and the image data D(n) with the frame change judgment value Ych, and in the event that judgment is made that the sum-of-absolute-value-of-difference Y is greater than the frame change judgment value Ych, the flow proceeds to Step S209, and conversely, in the event that judgment is made that the sum-of-absolute-value-of-difference Y is equal to or less than the frame change judgment value Ych, the blurring detection processing ends, and the flow returns.

Subsequently, the CPU 1 sets up the frame change flag (f_change) in the processing in Step S209. That is to say, the CPU 1 sets the frame change flag (f_change) to "1". Subsequently, the blurring detection processing ends, the flow returns, and the flow proceeds to Step S126, as shown in FIG. 22A.

Next, description will be made in detail regarding the correlation computation processing in the aforementioned Step S202 shown in FIG. 23 with reference to FIGS. 24A, 24B, and 25.

FIGS. 24A, 24B, and 25, are explanatory diagrams for describing the above-described computation processing, wherein FIGS. 24A and 24B are diagrams for describing the window shift method for the correlation computation, and FIG. 25 is a diagram which indicates the chart with regard to the correlation data, which indicates the correlation value for each shift value.

Note that, in FIGS. 24A and 24B, reference characters 6b a and 6b b denote line sensors (AF sensor) for performing photoelectric conversion according to the luminance of the image of the subject, formed by the photo-receiving lens, so as to converting into electric signals. Reference characters 160a and 160b denote extraction ranges (also referred to as "windows") for the sensor data for being employed in computation of the correlation amount. Furthermore, in FIG. 25, Fmin denotes the minimal correlation value, and nFmin denotes the shift amount wherein the correlation value is the minimal value.

With the present second embodiment, in the correlation computation processing in the aforementioned Step S202 (see FIG. 23), the sensor arrays 6ba and 6bb are used as shown in FIGS. 24A and 24B.

Here, the sensor array 6ba indicates the sensor array 6b at the timing of the previous detection, and the sensor array 6bb indicates the sensor array 6b at the timing of this detection. While different reference characters are used for the purpose of description, the sensor array 6ba is the same sensor as the sensor array 6bb.

The sensor arrays 6ba and 6bb are formed of multiple photoelectric conversion elements (photo-receiving elements) as shown in the drawings. The output image signals a1, a2, . . . , aN, and b1, b2, . . . , bN, are stored respectively in the two regions in unshown storing means within the CPU 1 (in the event of detection of blurring due to the movement of hands, only the image signals a1, a2, . . . , aN, obtained following a predetermined time period as described above, are stored).

Note that the aforementioned image signals a1, a2, . . . , aN, denote the output signals from photoelectric conversion elements at the timing of the previous detection, and the image signals b1, b2, . . . , bN, denote the output signals from photoelectric conversion elements at the timing of this detection.

The CPU 1 extracts the data from the image signals in the predetermined ranges (which will be referred to as "windows") 160a and 160b. With the extracting method, the simplest method is that while fixing the window 160a, the window 160b is shifted pixel by pixel of the sensor. This extracting method is an example, and the present embodiment is not restricted to the method, the number of data, the shift amount, the shift method, or the like may be changed between the timing of distance measuring and the timing of detection of blurring due to the movement of hands, for example.

Subsequently, the CPU 1 obtains the correlation amount F(n) with the following Expression (2) using the data extracted from the pair of the windows. In this case, in Expression (2), with n as the shift amount, with w as the number of the data within each window, with i as the data number in the window, and with k as the first sensor data number in the computation area, the correlation F(n) is represented by the following expression (2).

$$F_{(n)} = \sum_{i=0}^{w-1} |a_{k+i} - b_{k+i+n}| \qquad (2)$$

In this case, in the event that the correlation F(n) obtained by shifting the window 160b pixel by pixel of the sensor is the minimal value (F(n)=Fmin) as shown in FIG. 25, the best match is obtained between the data in the one pair of windows 160a and 160b, and the shift amount n=nFmin is determined as the relative image offset amount X(n) for the image of the subject.

That is to say, with the above-described computation, the moved amount of the image data is obtained in the direction of the photoelectric conversion element array making up the sensor array 6b based on the timings of the previous detection and this detection. That is to say, the movement of the camera into the direction of the photoelectric conversion element array of the camera (the horizontal direction of the camera) can be detected based on the moved amount.

Thus, subsequently, control is performed so as to obtain image shift amount X(n), and perform comparison judgment using the predetermined levels Xb and Xch, as described above.

Accordingly, as described above, with the present second embodiment, the AF sensor is efficiently used, so the AF sensor is not only used for distance measuring, but also used for holding checking, thereby providing an added value to the camera.

Furthermore, the signals from the acceleration sensor are used, as well, and accordingly, the camera can detect movement in the X direction and the Y direction, handle a dark scenes and low-contrast scenes, and also can perform accurate calculation of the moved amount of the camera based on the output signals from the acceleration sensor using the acceleration sensor as a stillness detecting sensor.

Furthermore, in the blurring detection using the AF sensor, blurring judgment is made not only based on the offset amount of the subject, but also based on the sum of the absolute values of the differences between image signals, and accordingly, blurring due to the movement of hands can be detected in the X direction (the horizontal direction of the camera) and the Y direction (the vertical direction of the camera) even by the AF sensor alone.

Thus, the camera can perform accurate judgment with regard to blurring due to the movement of hands following taking a picture, corresponding to the focal distance and iris of the photography lens and the shutter speed in taking a picture.

Furthermore, it is needless to say that adjustment of the position of the photography lens based on the calculated moved amount enables an application to cameras having prevention-of-vibration functions.

Next, description will be made regarding a third embodiment of the present invention.

Figure 26:
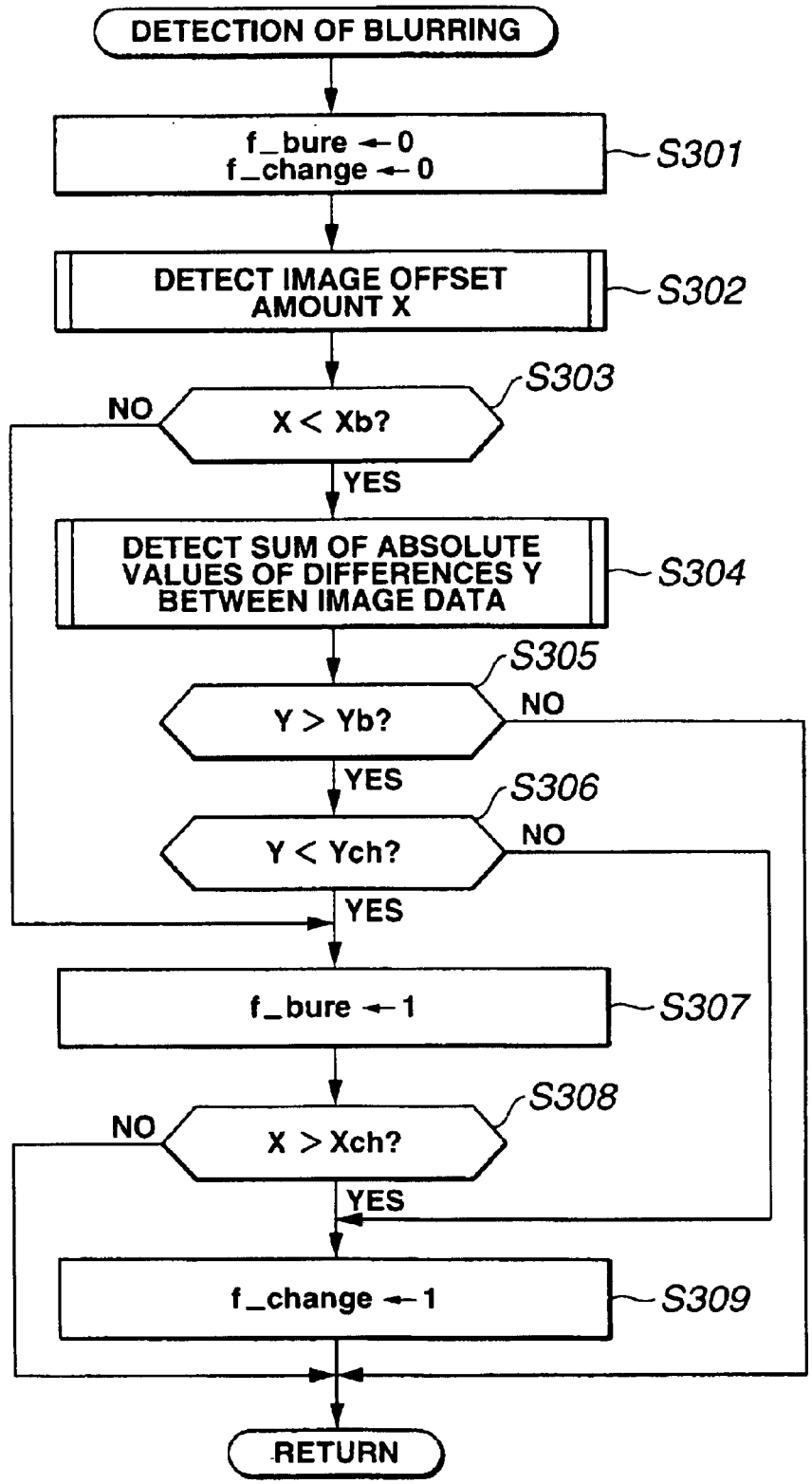
FIG. 26 is a flowchart which indicates a subroutine for movement detection processing according to a camera of a third embodiment of the present invention.

FIG. 26 is a flowchart which indicates an example of the blurring detection control, which is the third embodiment of the present invention, performed by the CPU of the camera having a detection-of-blurring function according to the third embodiment of the present invention.

While with the above-described second embodiment, movement detection is performed using the image offset amount and the sum of the absolute values of the differences between the image signals, with the third embodiment, in the event that the image offset amount is less than the blurring judgment value, control processing is performed so as to perform blurring detection using the sum of the absolute values of the differences between image signals, which is a feature of the present third embodiment. Other components are the same as with the above-described second embodiment.

Figure 22A:
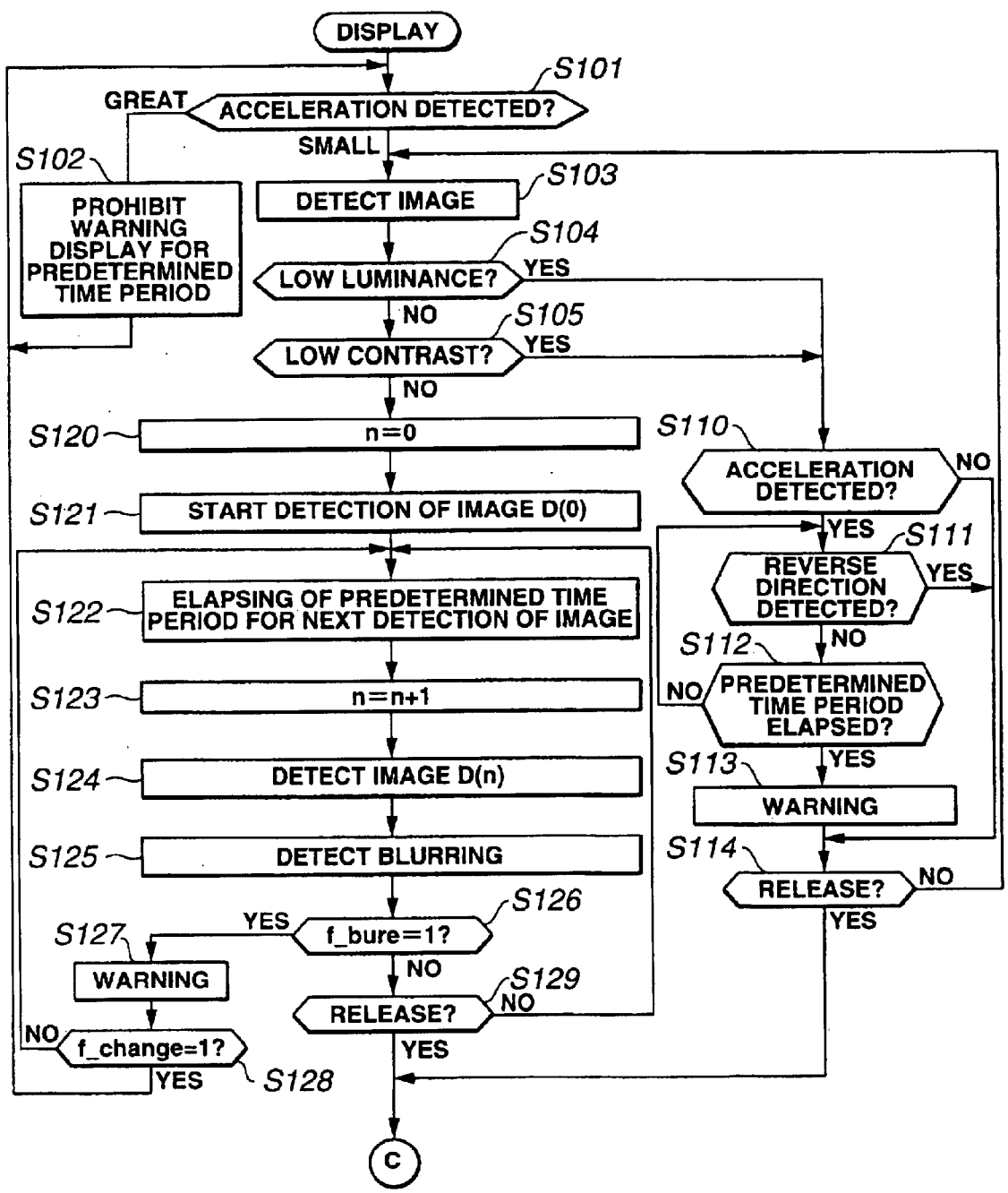
FIG. 22A is a flowchart for describing display control with regard to the holding check mode function of the camera according to the second embodiment.
Figure 22B:
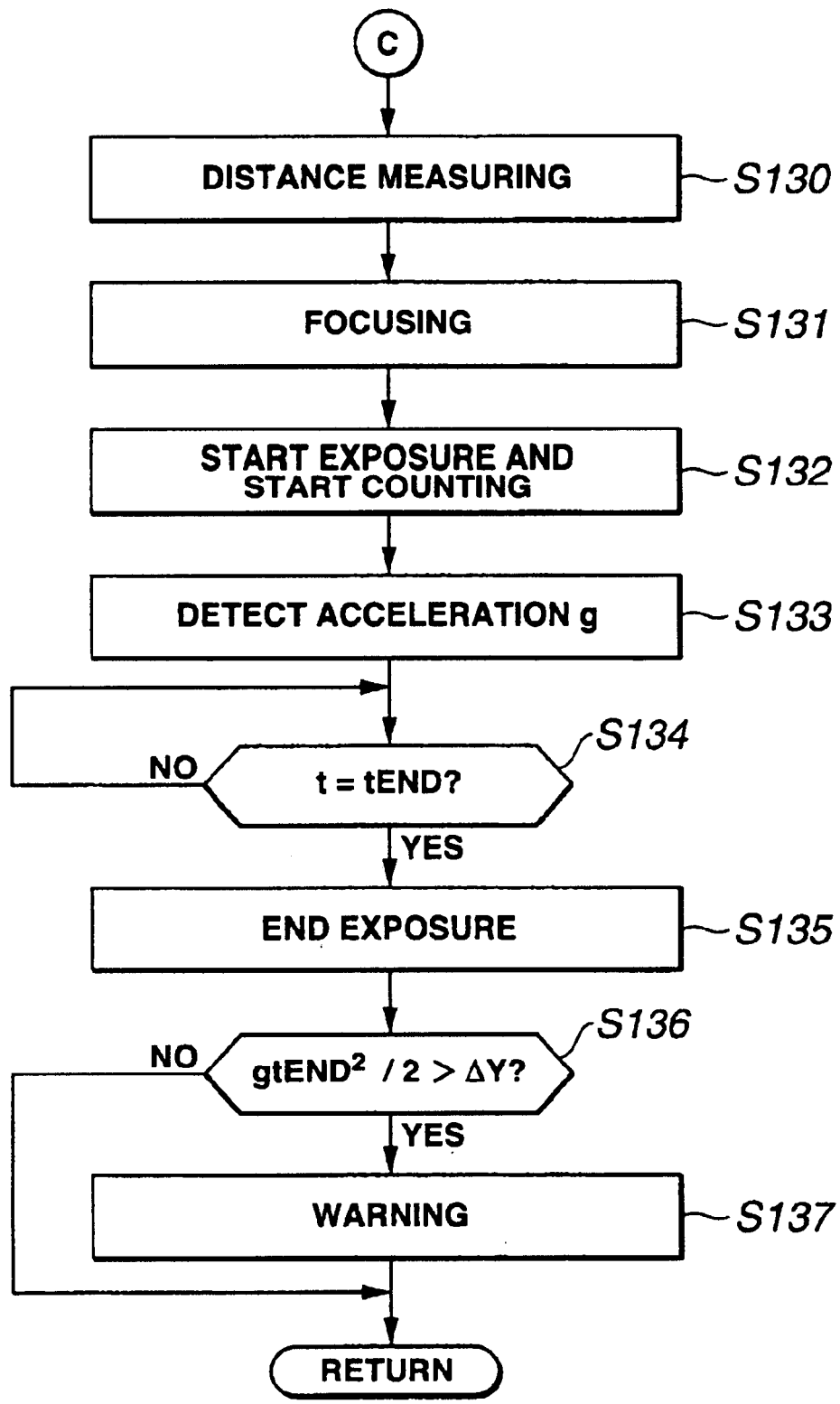
FIG. 22B is a flowchart for describing display control with regard to the holding check mode function of the camera according to the second embodiment.

With the camera 50 of the present third embodiment, upon the CPU 1 performing blurring detection processing in the aforementioned Step S125 shown in FIG. 22A, the CPU 1 starts a subroutine for detection of blurring-due-to-movement-of-hands shown in FIG. 26. That is to say, the CPU 1 performs the processing in Step S301, wherein the blurring flag (f_bure) and the frame change flag (f_change) are cleared (set to "0"), and subsequently, the flow proceeds to Step S302.

In the processing in Step S302, the CPU 1 detects the image offset value X between the image data D(n−1) detected in the previous detection and the image data D(n) detected in this detection based on the same correlation computation processing or the like as with the above-described second embodiment, and subsequently, the flow proceeds to Step S303.

In the judgment processing in Step S303, the CPU 1 compares the image offset amount X with the blurring judgment value Xb, and in the event that judgment is made that the image offset amount X is less than the blurring judgment value Xb, the flow proceeds to Step S304, and conversely, in the event that judgment is made that the image offset amount X is equal to or greater than the blurring judgment value Xb, the flow proceeds to Step S307.

In the processing in Step S304, the CPU 1 detects the sum of the absolute values of the differences Y between the image data D(n−1)detected in the previous detection and the image data D(n) detected in this detection, using the above-described Expression (1) in the same way as with the above-described second embodiment, and subsequently, the flow proceeds to the judgment processing in Step S305.

In the judgment processing in Step S305, the CPU 1 compares the sum of the absolute values of the differences Y between the image data D(n−1) and the image data DCn) with the blurring judgment value Yb. In the event that judgment is made that. the sum of the absolute values of the differences Y is greater than the blurring judgment value Yb, the flow proceeds to Step S306, and conversely, in the event that judgment is made that the sum of the absolute values of the differences Y is equal to or less than the blurring judgment value Yb, the blurring detection ends, and the flow returns.

In the judgment processing in Step S306, the CPU 1 compares the sum of the absolute values of the differences Y between the image data D(n−1) and the image data D(n) with the frame change judgment value Ych. In the event that judgment is made that the sum of the absolute values Y is less than the frame change judgment value Ych, the flow proceeds to Step S307, and conversely, in the event that judgment is made that the sum of the absolute values Y is equal to or greater than the frame change judgment value Ych, the flow proceeds to Step S309.

In the processing in Step S307, the CPU 1 sets up the blurring flag (f_bure). That is to say, the CPU 1 sets the blurring flag (f_bure) to "1", and subsequently, the flow proceeds to Step S308.

Subsequently, the CPU 1 compares the image offset amount X with the frame change judgment value Xch in the judgment processing in Step S308, and in the event that judgment is made that the image offset amount X is greater than the frame change judgment value Xch, the flow proceeds to Step S309, and conversely, in the event that judgment is made that the image offset amount X is equal to or less than the frame change judgment value Xch, the blurring detection ends, and the flow returns.

Subsequently, the CPU 1 sets up the frame change flag (f_change) in the processing in Step S309. That is to say, the frame change flag (f_change) is set to "1", and subsequently, the blurring detection ends, the flow returns, and the flow proceeds to the processing in Step S126 shown in FIG. 22A in the same way as with the above-described second embodiment.

Accordingly, with the present embodiment as described above, only in the event that blurring detection cannot be performed using the image offset amount, blurring detection is performed using the absolute value of the difference between image signals, and accordingly, blurring detection time in a normal state can be reduced. Other effects are the same as with the above-described second embodiment.

As described above, with the second or third embodiment, in the event that the holding check mode is set when taking a picture wherein blurring due to the movement of hands is of particular concern, a warning is given when blurring due to the movement of hands occurs so as to let the user recognize the blurring due to the movement of hands, thereby enabling a picture to be taken without failure due to movement of hands. Furthermore, the sensor used as a conventional distance-measuring sensor is used as well for the judgment as to blurring due to the movement of hands at the time of holding judgment, thereby providing a camera having a blurring-due-to-movement-of-hands detection function with high reliability without increasing in costs.

Next, a fourth embodiment of the present invention will be described.

With the above-described embodiments, conditions for using the measured subject image data are not taken into consideration for performing distance measuring and blurring detection using the distance-measuring sensor (AF sensor), and accordingly, optimal processing cannot be performed in both cases, and consequently, sufficient performance could not be obtained.

With the present fourth embodiment, taking the conditions for using the measured subject image data into consideration according to the use of the AF sensor, distance measuring and blurring detection, with higher performance, are performed. Other components are the same as with the above-described third embodiment, so description will be omitted. Note that, with the present fourth embodiment, the output signals from the acceleration sensor are used for detecting the movement in the vertical direction of the camera. However, in the event of detecting the movement in the vertical direction of the camera using the above-described sum of the absolute value of the difference between the subject image data, the conditions for using the subject image data can be set in the same way.

Figure 27A:
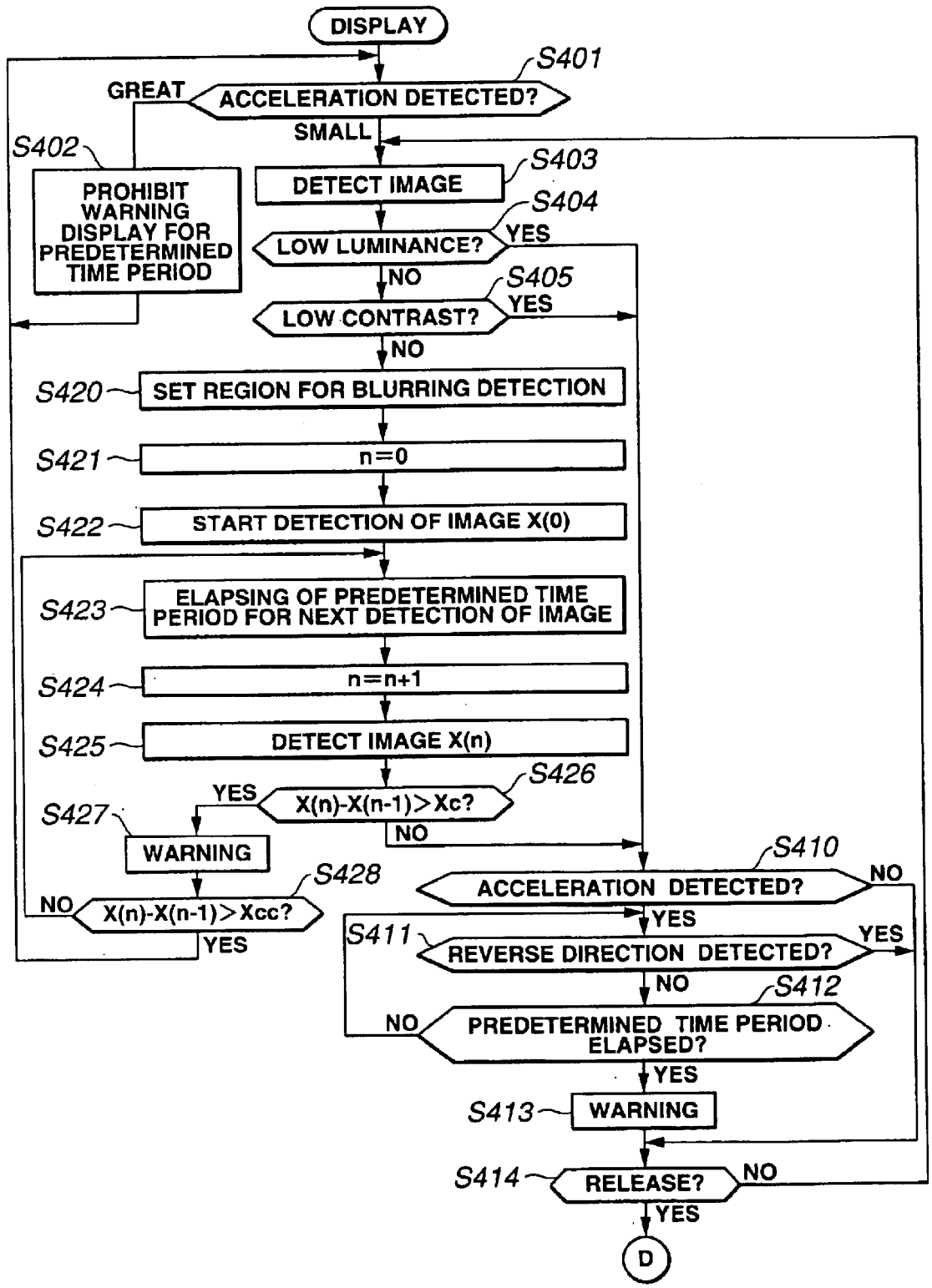
FIG. 27A is a flowchart for describing display control according to a camera of a fourth embodiment of the present invention.
Figure 27B:
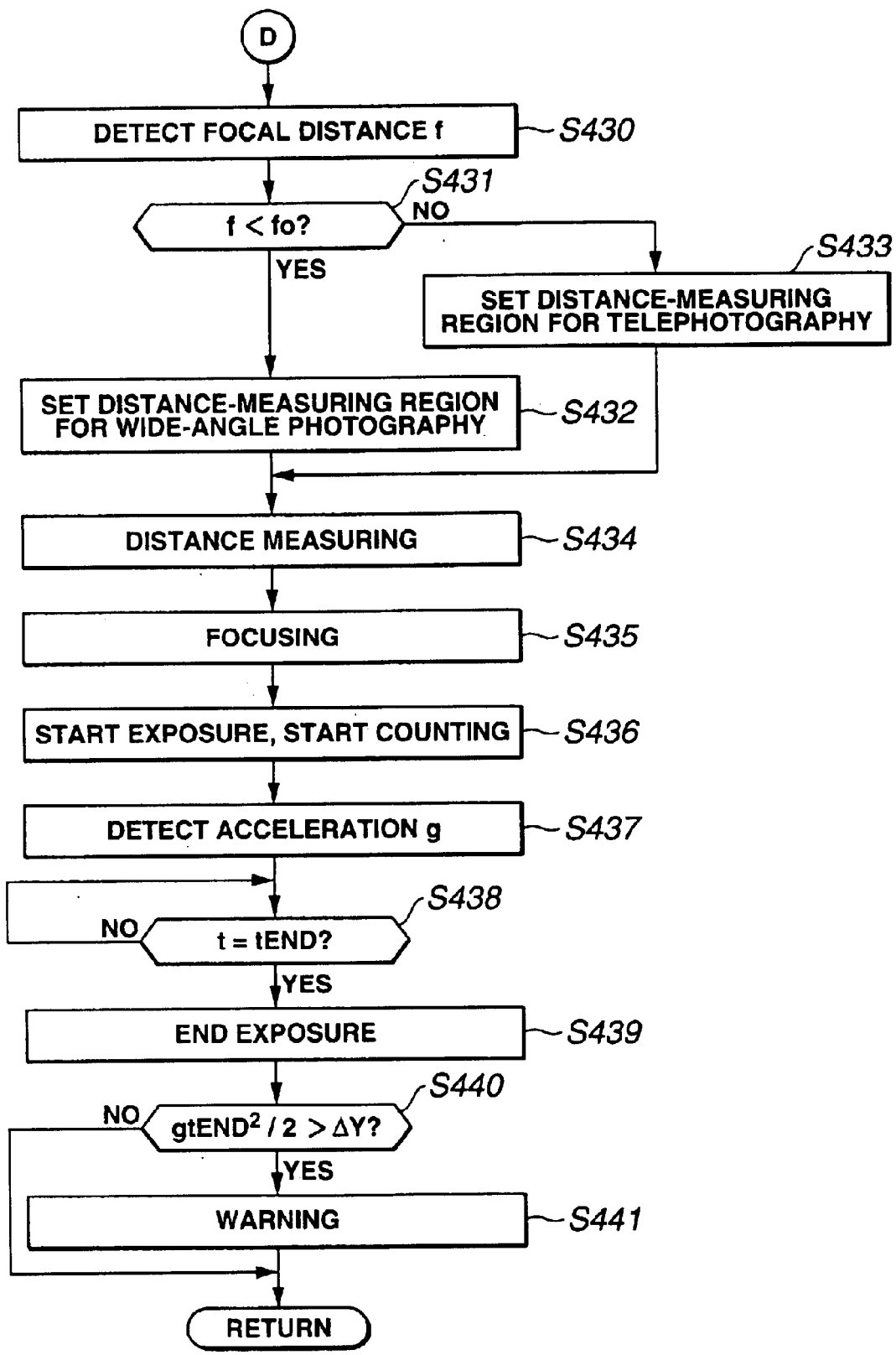
FIG. 27B is a flowchart for describing display control according to the camera of the fourth embodiment of the present invention.

Description will be made below regarding the present fourth embodiment following flowcharts shown in FIGS. 27A and 27B.

In the same way as with the above-described second embodiment, with the camera shown in FIG. 5, upon the barrier 39 for protecting the front lens being opened, first of all, the user performs framing, and does not perform actions of holding yet. Accordingly, the camera is greatly vibrated, so judgment by the AF sensor is invalid. The AF sensor monitors a narrow region within the screen, and accordingly, quantitative evaluation cannot be made with regard to the great movement of the camera at all.

Accordingly, first of all, the CPU 1 within the camera 50 makes judgment with regard to the output from the acceleration sensor (accelerometer IC) 100 in the judgment processing in Step S401. Thus, even in the event that the camera receives shock due to the barrier being opened, or due to the camera being held by the user, a warning display regarding holding is prohibited for a predetermined time period in the processing in the following Step S402. Subsequently, image detection is performed using the AF sensor in the judgment processing in Step S403. Thus, judgment is made whether or not image detection is suitable to holding checking, so in the event that the CPU 1 makes judgment that the detected image exhibits low luminance in the following Step S404, or makes judgment that the detected image exhibits low contrast in Step S405, the flow proceeds to the processing in Step S410 so as to start a flow for blurring judgment by detecting acceleration, not by using image signals. The processing is that in the event that the acceleration sensor outputs a signal, and does not output one corresponding to the reverse acceleration in a predetermined time period (Step S411 through Step S412), warning is given (Step S413), that is to say in the event that judgment is made that the camera is moved at a constant velocity as shown in FIG. 19A, warning is given so as to let the user know the fact that blurring due to the movement of hands could be caused.

In this case, the user might be intending to take a picture by panning or the like, and accordingly, an arrangement may be made that the LCD in viewfinder is not blinked, and only the LEDs 33 around the finder eyepiece unit are blinked, as shown in FIG. 4A, in order to give a warning different from that in a case of using the AF sensor as well (Step S427).

Furthermore, in the event that image signals are suitable to judgment with regard to blurring due to the movement of hands, the CPU 1 sets a subject image data range used for blurring detection in the flow following Step S420 (Step S420). Subsequently, image detection is repeatedly performed (Steps S422 and S425)in predetermined interval (Step S423). In the event that the offset amount between the signals equal to or more than the predetermined level Xc is observed, judgment is made in the judgment processing in Step S426, and display control is performed so as to give a warning that holding of the camera is insufficient, in the processing in Step S427.

Receiving these warnings, the user recognizes that he/she has unwittingly caused movement of the camera, and accordingly, the user can perform countermeasures for blurring due to the movement of hands such as holding with both hands, or placing the camera on an object or the like.

Furthermore, in the processing in the subsequent Step S428, in the event that the CPU 1 makes judgment that the offset amount of the signals is greater than Xcc which is greater than Xc, compared in the above-described Step S426, it is considered that the user holds the camera from a quite different angle, or changes the frame, and accordingly, the flow returns to the processing in the above-described Step S401. On the other hand, in the event that the offset amount is equal to or less than Xcc in the judgment in Step S428, control is performed such that the flow returns to the processing in the above-described Step S423.

On the other hand, in the event that image signals are stable, the offset amount of the signals is less than Xc in the judgment in Step S426, 50 the CPU 1 control the flow to proceed to the processing in Step S410 so as to start the flow of blurring judgment by detection of acceleration. Thus, in a case that the acceleration sensor outputs a signal, in the event that the output corresponding to the acceleration in the reverse direction is not detected in a predetermined time period (Steps S411 and S412), a warning is given (Step S413). On the other hand, in the event that acceleration is not detected in Step S410, or the acceleration in the reverse direction is detected in Step S411, the flow proceeds to Step S414. As described above, the movement in the horizontal direction of the camera (direction of the photoelectric conversion element array) is detected based on the image signals from the AF sensor, and the movement in the vertical direction of the camera (direction orthogonal to the direction of the photoelectric conversion element array) is detected based on the output from the acceleration sensor.

Subsequently, judgment is made whether or not the release is pressed in the judgment processing in the subsequent Step S414. In the event that judgment is made that the release is pressed, an exposure sequence following the processing in the subsequent Step S430 is performed. On the other hand, in the event that judgment is made that the release is not pressed, the flow returns to the above-described Step S403.

In the event that the release is pressed, first of all, the CPU 1 detects the focal distance f of the photography lens in the processing in Step S430, and judgment is made whether the focal distance f is less than a predetermined value f0 in the judgment processing in the subsequent Step S431. In this case, in the event that judgment is made that the focal distance f is less than the predetermined value f0, the flow proceeds to the processing in the subsequent Step S432, and conversely, in the event that judgment is made that the focal distance f is equal to or greater than the predetermined value f0, the flow proceeds to the processing in Step S433. In this case, a distance-measuring region for wide-angle photography is set in the processing in Step S432, and a distance-measuring region for telephotography is set in the processing in Step S433. That is to say, a range for using subject image data for measuring distance in wide-angle photography or a range for using subject image data for measuring distance in telephotography is set in either processing.

Subsequently, the CPU 1 performs focusing and distance measuring for the focusing in the processing in the subsequent Steps S434 and S435. In the processing in the subsequent Step S436, an exposure time period is determined based on the luminance information obtained by image detection in the above-described Step S403, simultaneously with which exposure is started.

In the event that the camera is moved during the time period, blurring due to the movement of hands is caused, so the CPU 1 performs detection of acceleration in the subsequent Step S437, and obtains the acceleration g due to shock when the release button is pressed, or the like. That is to say, in the event that the acceleration g is great, a picture is taken with blurring due to, the movement of hands even if the exposure time period is short, and conversely, in the event that the exposure time period is long, a picture is taken with blurring due to the movement of hands as well even if the acceleration g is small. In order to make judgment with regard to the relation between the acceleration g and the exposure time period, the CPU 1 counts the exposure time period in the judgment processing in the subsequent Step S438.

In the event that judgment is made that the exposure ends in Step S439, the velocity is obtained based on the obtained acceleration g and the exposure time period tEND in the processing in the subsequent Step S440. The moved amount can be calculated based on the fact that the camera is moved at the velocity for the time period of tEND, and accordingly, in the event that the movement exceeds the blurring permission amount ΔY for the lens, display control is performed so as to give a warning in the processing in the subsequent Step S441. Conversely, in the event that the moved amount does not exceed the blurring permission amount ΔY, the processing ends.

As described above, while only the change in the velocity can be obtained from the acceleration alone, with the present fourth embodiment, first of all, judgment is made that the camera is stationary at a certain position based on the fact that the output (image signals) from the AF sensor is not changed. Accordingly, accurate judgment can be made what distance the camera is moved during exposure with this as a reference.

Figure 28A:
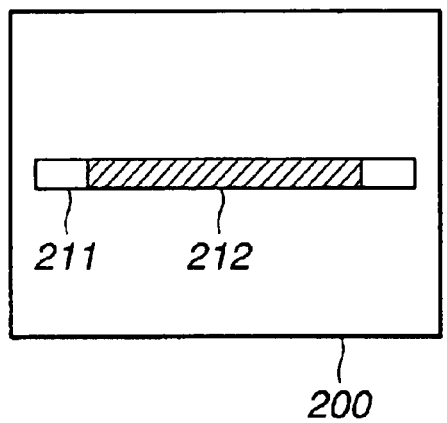
FIG. 28A is a diagram which illustrates the usage range of the image signals used for distance measuring on the short focus side according to the camera of the fourth embodiment.
Figure 28B:
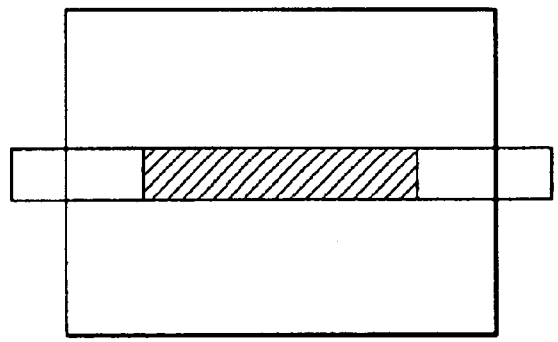
FIG. 28B is a diagram which illustrates the usage range of the image signals used for distance measuring on the long focus side according to the camera of the fourth embodiment.
Figure 28C:
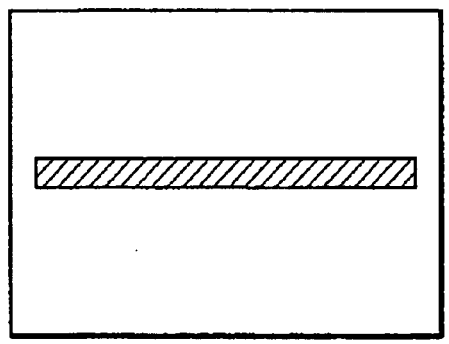
FIG. 28C is a diagram which illustrates the usage range of the image signals used for detection of blurring due to the movement of hands on the short focus side according to the camera of the fourth embodiment.
Figure 28D:
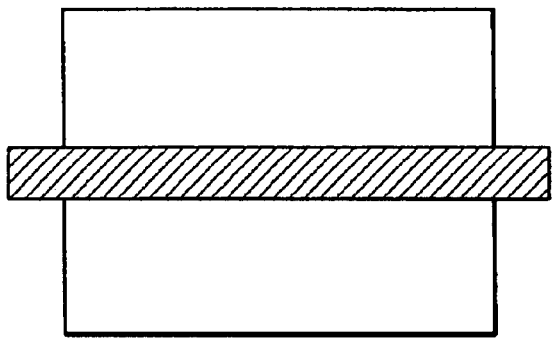
FIG. 28D is a diagram which illustrates the usage range of the image signals used for detection of blurring due to the movement of hands on the long focus side according to the camera of the fourth embodiment.
Figure 29A:
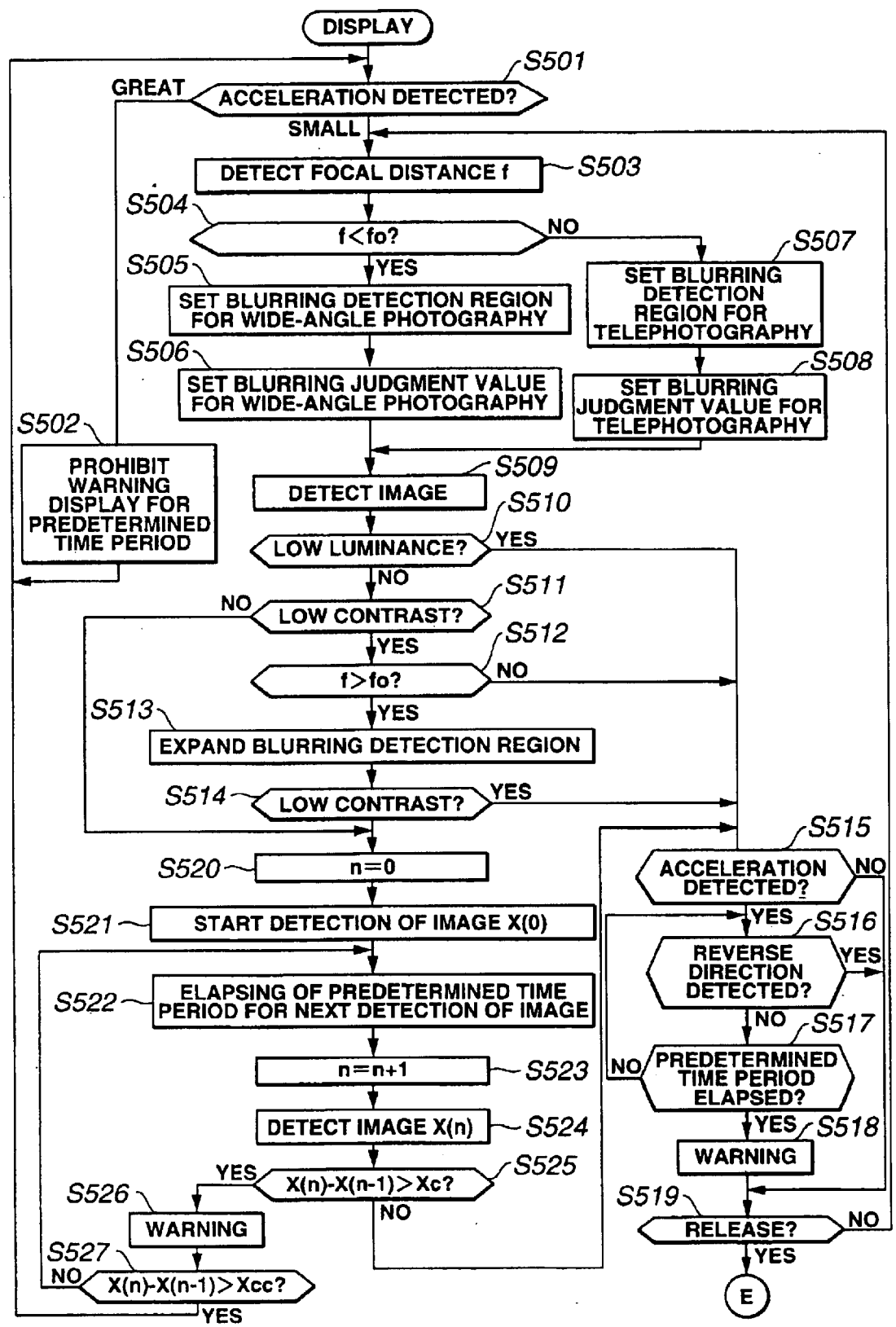
FIG. 29A is a flowchart for describing display control according to a camera of a fifth embodiment of the present invention.
Figure 29B:
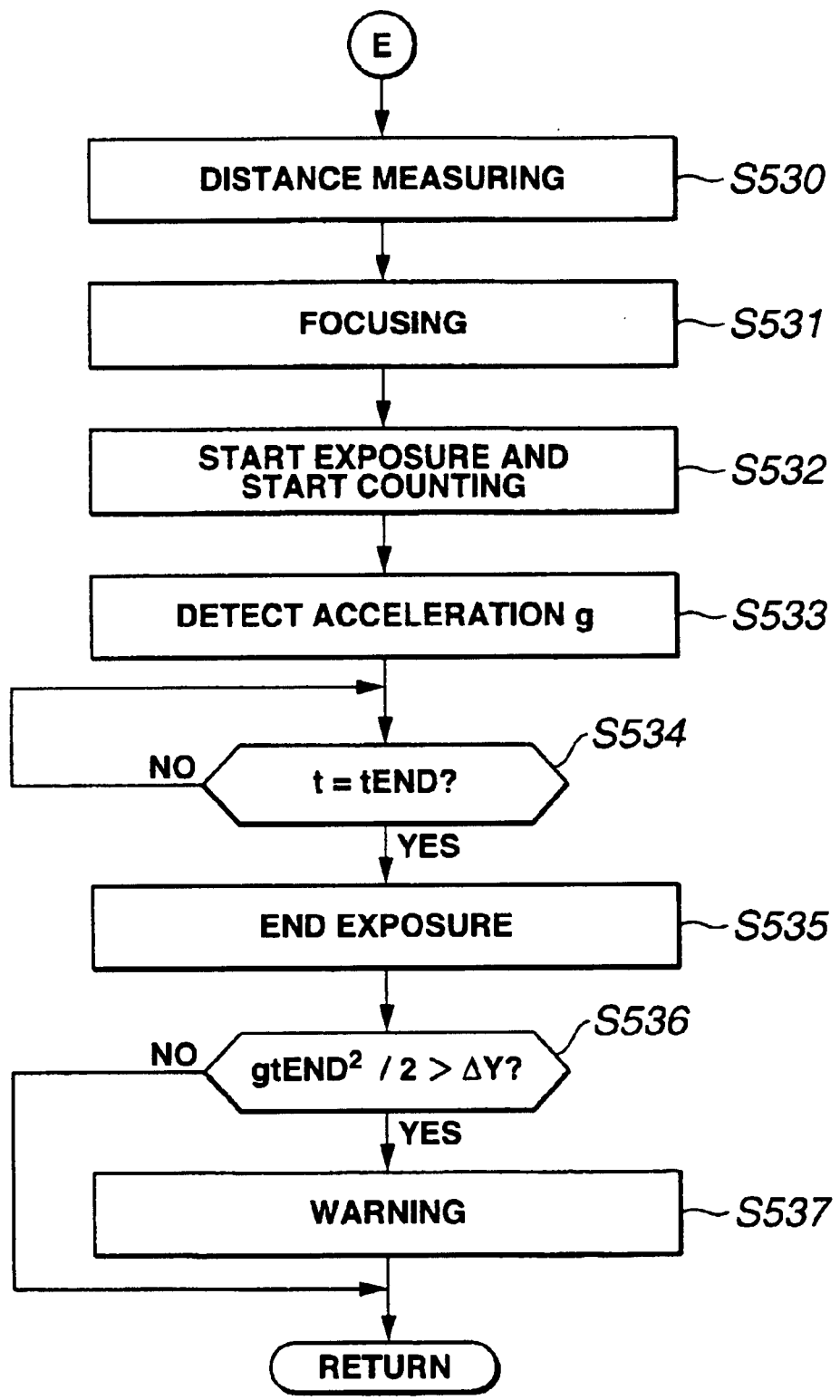
FIG. 29B is a flowchart for describing display control according to the camera of the fifth embodiment of the present invention.

With the fourth embodiment, when in distance measuring, a subject image data in the range 212 where the peripheral region of a photography screen 200 has been eliminated from an entire visual field 211 of the AF sensor is used such that the camera does not make an error in distance measuring wherein the distance to non-targeted subject in the peripheral region of the photography screen 200 is measured, as shown in FIGS. 28A and 28B (FIG. 28A: wide-angle photography, FIG. 28B: telephotography). On the other hand, when in movement detection, the subject image data within the entire visual field 211 of the AF sensor is used so as to obtain as much subject information as possible, as shown in FIGS. 28C and 28D (FIG. 28C: wide-angle photography, FIG. 28D: telephotography), thereby enabling measurement with high precision to be performed for either case.

Thus, as described above, with the present embodiment, the AF sensor is effectively used, that is to say, the AF sensor is not only used for distance measuring but also used for holding checking, thereby providing an added value to the camera.

Furthermore, with the present embodiment, the signals from the acceleration sensor are used as well, and accordingly, the movement can be detected in the X direction and the Y direction, the camera can handle dark scenes and low-contrast scenes, and also the accurate moved amount of the camera can be calculated based on the output from the acceleration sensor using the acceleration sensor as a stillness sensor.

Thus, accurate determination with regard to blurring due to the movement of hands following taking a picture can be made corresponding to the focal distance of the photography lens, iris, and the shutter speed when taking a picture.

Furthermore, it is needless to say that application may be made to a camera having a prevention-of-movement function, wherein the position of the photography lens is adjusted based on the calculated moved amount.

As described above, with the present fourth embodiment, blurring-due-to-movement-of-hands detection functions can be realized with high precision and a simple configuration, wherein even if users who do not take blurring due to the movement of hands into consideration use the camera, the user can hold the camera while observing check display for displaying the detected blurring due to the movement of hands, thereby enabling a clear picture with small influence of blurring due to the movement of hands to be taken.

Furthermore, the present fourth embodiment can provide a camera having blurring-due-to-movement-of-hands detection functions with low costs. Furthermore, the present fourth embodiment can provide a camera having blurring-due-to-movement-of-hands detection functions, which can perform distance measuring and movement detection with high performance by taking the usage range of the measured subject image data into consideration according to the use of the AF sensor.

Next, description will be made regarding a fifth embodiment of the present invention.

With the present fifth embodiment, another example is described with regard to the setting method for setting the visual field of the AF sensor according to the focal distance of the photography lens. Furthermore, the determination level whether or not warning is given according to the focal distance of the photography lens is changed.

In a case of giving the user a warning that a picture with blurring due to the movement of hands could be taken, in the event that movement detection is performed based on a constant movement judgment value independent of the focal distance of the photography lens, a warning could be given when taking a picture on the short focus side of the focal distance of the photography lens, even in the event of the movement state which does not cause as picture with blurring due to the movement of hands, which is troublesome for the user.

With the present fifth embodiment, determination level whether or not a warning is given depending on the focal distance of the photography lens is changed, and thus, the camera can give no useless warnings.

Description will be made below regarding the present fifth embodiment with reference to FIGS. 29A and 29B, and FIGS. 30A through 30C. Other components are the same as with the above-described third embodiment, so description will be omitted. Note that, with the present fifth embodiment, the output from the acceleration sensor is used for detection of the movement of the camera in the vertical direction. However, the present embodiment can be applied to a case wherein the movement of the camera in the vertical direction is detected using the sum of the absolute values of the differences between the subject image data, described above, in the same way.

In the same way as with the above-described second embodiment, with the camera of the present fifth embodiment, when the barrier 39 for protecting the front lens is opened, first of all, the user performs framing, and does not tightly hold the camera yet, so the camera is greatly moved, and accordingly, determination by the AF sensor is not valid. The AF sensor monitors only the narrow region within the screen, and accordingly, quantitative evaluation cannot be performed at all with regard to the great movement of the camera.

Accordingly, first of all, the CPU 1 within the camera 50 of the present fifth embodiment makes judgment with regard to the output from the acceleration sensor (accelerometer IC) 100 in the judgment processing in Step S501. Thus, even in the event that the camera receives shock due to the barrier being opened, or due to the camera held by the user, warning display of holding can be prohibited for a predetermined time period in the processing in the subsequent Step S502. Subsequently, in the subsequent Step S503, the focal distance f of the photography lens is detected in order to set the image signal range to be used for detection of blurring due to the movement of hands, and the flow proceeds to Step S504.

In the judgment processing in Step S504, the CPU 1 determines whether or not the focal distance f detected in the above-described Step S503 is shorter than the predetermined focal distance f0. In the event that judgment is made that the focal distance f is shorter than the predetermined focal distance f0, the image signal usage range for wide-angle photography is set in the processing in the subsequent Step S505. After the movement judgment value for wide-angle photography is set in the processing in the subsequent Step S506, the flow proceeds to Step S509.

Conversely, in the event that judgment is made that the focal distance is longer, the CPU 1 sets the image signal usage range for telephotography in the processing in the Step S507. After the movement judgment value for telephotography is set in the processing in the Step S508, the flow proceeds to Step S509.

Note that the change in the image signal usage range and the movement judgment value is not restricted to switching into two types of those for wide-angle photography or telephotography, but an arrangement may be made wherein the image signal usage range and the movement judgment value are continuously switched depending on the focal distance of the photography lens.

Next, the CPU 1 controls so as to perform image detection using the AF sensor in the processing in Step S509. Thus, judgment is made whether or not image detection is suitable for a holding checking. In the event that judgment is made that the detected image exhibits low luminance in the judgment processing in the subsequent Step S510, the CPU 1 executes a flow of movement judgment by detection of acceleration, not using image signals (Steps S515 through S519) following the judgment processing in Step S510.

The processing is such that in a case that the acceleration sensor outputs a signal,,in the event that the output corresponding to the acceleration in the reverse direction is not detected in a predetermined time period (Steps S516 and S517), a warning is given (Step S518). That is to say, as shown in FIG. 19A, judgment is made whether or not the camera is being moved at a constant velocity so as to give the user a warning that blurring due to the movement of hands could be caused.

In this case, the user might be intending to take a picture by panning, so an arrangement may be made wherein the LCD in viewfinder is not blinked, and the LEDs 33 around the finder eyepiece unit are only blinked as shown in FIG. 4A, in order to give a warning different from that in a case of using the AF sensor as well (Step S526).

On the other hand, in the event that judgment is made that the detected image does not exhibit low luminance in the judgment processing in the above-described Step S510, the CPU 1 makes judgment whether or not the detected image exhibits low contrast in the processing in the subsequent Step S511. In the event that judgment is made that the detected image does not exhibit low contrast, the flow proceeds to Step S520, and conversely in the event that judgment is made that the detected image exhibits low contrast, the flow proceeds to the following Step S512.

In the processing in Step S512, the CPU 1 compares the focal distance f of the photography lens with the predetermined focal distance f0 again. In the event that judgment is made that the focal distance f of the photography lens is longer than the predetermined focal distance f0, the usage range for image signals is expanded in the processing in the subsequent Step S513. Subsequently, judgment is made whether or not the detected image exhibits low contrast again in the judgment processing in the following Step S514.

In the event that judgment is made that the detected image exhibits low contrast even using the expanded usage range, control is performed so as to perform movement judgment by detection of acceleration (Steps S515 through S519) in the same way as in a case of low luminance.

Figure 30A:
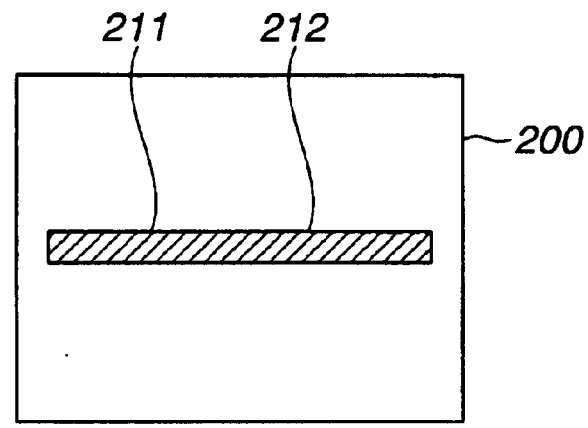
FIG. 30A is a diagram which illustrates the usage range of the image signals used for detection of blurring due to the movement of hands on the short focus side according to the camera of the fifth embodiment.
Figure 30B:
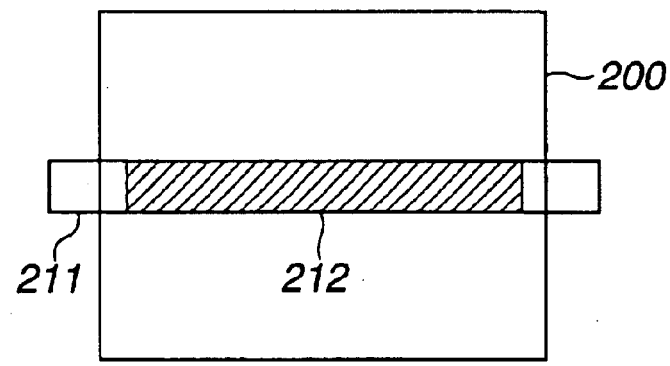
FIG. 30B is a diagram which illustrates the usage range of the image signals used for detection of blurring due to the movement of hands on the long focus side according to the camera of the fifth embodiment.
Figure 30C:
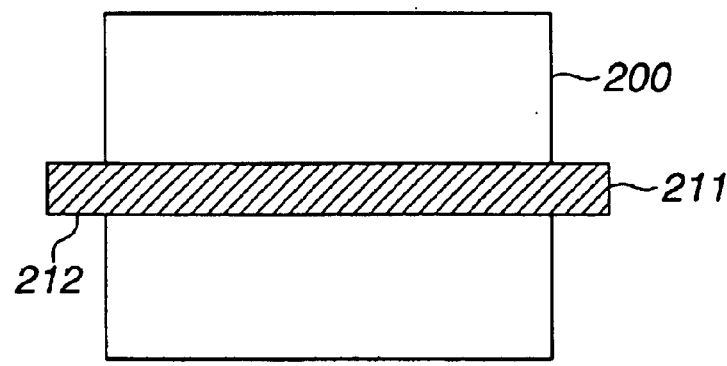
FIG. 30C is a diagram which illustrates the usage range of the image signals used for detection of blurring due to the movement of hands on the long focus side in a case of low contrast according to the camera of the fifth embodiment.

Following the above-described processing, in the event that the focal distance of the photography lens is short, the usage range 212 for the image signals to be used for detection of the blurring due to movement of hands is set to generally the same range as the image signal detection range 211 within the photography screen 200 as shown in FIG. 30A, and in the event that the focal distance of the photography lens is long, the usage range 212 is set to the range within the photography screen 200 within the image signal detection range 211 as shown in FIG. 30B. Note that in the event that the focal distance of the photography lens is long, and the image signals in the usage range 212 thus set exhibit low contrast, the usage range 212 is expanded up to substantially the same range as the image signal detection region 211 as shown in FIG. 30C.

Thus, while blurring due to the movement of hands is detected based on the information with regard to the subject within the photography screen 200 in normal situations, the information with regard to a subject which is from other than the photography screen 200 is used only in the event the detected image exhibits low contrast, i.e., the information with regard to the subject within the photography screen 200 is invalid, thereby preventing an error in detection of blurring due to the movement of hands due to the influence of the subject out of the photography screen 200, and thus, accurate detection of blurring due to the movement of hands can be performed.

Subsequently, in the event that image signals are suitable for judgment with regard to blurring due to the movement of hands, the CPU 1 repeatedly performs detection of images (Steps S521 and S524) at a predetermined intervals (Step S522) in a flow in Step S520 and later Steps. Subsequently, the offset amount X(n)–X(n−1) between the detected image signals is obtained, and judgment is made whether or not the offset amount X(n)–X(n−1) between the detected image signals is greater than the movement judgment value Xc in the judgment processing in the following Step S525. In this case, in the event that judgment is made that the offset amount is greater than the movement judgment value Xc, the CPU 1 controls the flow to proceed to Step S526, and display control is performed so as to give a warning that holding is insufficient, in the processing.

Receiving these warnings, the user recognizes that the he/she has unwittingly caused the movement of camera, and accordingly, the user can perform countermeasures for blurring due to the movement of hands such as holding with both hands, or placing the camera on an object or the like.

Furthermore, the CPU 1 makes judgment whether or not the offset amount X(n)–X(n−1) between the detected image signals is greater than the predetermined level Xcc which is greater than the aforementioned Xc in the judgment processing in the following Step S527. In the event that the offset amount X(n)–X(n−1) between the detected image signals is greater than Xcc, it is considered that the user holds the camera from a quite different angle, or changes the frame, and accordingly, the flow returns to the processing in the aforementioned Step S501. Conversely, in the event that judgment is made that the offset amount X(n)–X(n−1) between the detected image signals is less than Xcc in the judgment processing in the aforementioned Step S527, the CPU 1 controls the processing to return to the aforementioned Step S522.

On the other hand, in the event that judgment is made that the offset amount X(n)–X(n−1) between the detected image signals is equal to or less than the predetermined level Xc in the judgment processing in the aforementioned Step S525, the flow proceeds to the processing in Step S515 so as to start the flow for movement judgment with detection of acceleration. Thus, in a case that the acceleration sensor outputs a signal, in the event that the output is not detected corresponding to the acceleration in the reverse direction in a predetermined time period (Steps S516 and S517), a warning is given (Step S518).

On the other hand, in the event that acceleration is not detected in Step S515, or the acceleration in the reverse direction is not detected in Step S516, the flow proceeds to Step S518. Thus, the movement of the camera in the horizontal direction (in the direction of the photoelectric conversion element array) is detected based on the image signals from the AF sensor, and the movement of the camera in the vertical direction (in the direction orthogonal to the direction of the photoelectric conversion element array) is detected based on the output from the acceleration sensor.

The CPU 1 makes judgment with regard to the release being pressing in the judgment processing in the subsequent Step S519, and in the event that judgment is made that the release is pressed, an exposure sequence following Step S530 is executed, and conversely in the event that judgment is made that the release is not pressed, the flow returns to the aforementioned Step S503.

Upon the release being pressed, first of all, the CPU 1 performs focusing and distance measuring for the focusing in the processing in Steps S530 and S531. Subsequently, in the processing in Step S532, an exposure time period is determined based on the luminance information obtained from image detection in the aforementioned Step S509, simultaneously with which exposure is started.

If the camera is vibrated during the exposure time period, blurring due to the movement of hands is caused, and accordingly, the CPU 1 performs detection of acceleration in the processing in the subsequent Step S533, whereby the acceleration g due to the shock during pressing of the release button, or the like, is obtained. That is to say, in a case of the acceleration g being great, blurring is caused in the picture even if the exposure time period is short, and conversely, even in a case of the acceleration g being small, blurring is caused in the picture in the event that the exposure time period is long, as well. In order to make judgment whether or not blurring is caused, the CPU 1 measures the exposure time period in the judgment processing in the subsequent Step S534.

In the event that judgment is made that exposure ends in Step S535, the velocity is obtained from the obtained acceleration g and the exposure time period tEND in the processing in the following Step S536. The moved amount can be calculated from the fact that the camera is vibrated at the velocity for the time of tEND, and accordingly, in the event that the moved amount exceeds the blurring allowance amount ΔY for the lens, display control is performed so as to give a warning in the processing in the subsequent Step S537. Conversely, in the event that the moved amount does not exceed the blurring allowance amount ΔY, the processing ends.

While only the change in the velocity can be obtained from only the acceleration as described above, with the present fifth embodiment, first of all, judgment is made whether or not the camera is kept still at a predetermined position based on the fact that the output (image signals) from the AF sensor does not change, and accordingly, accurate determination can be made what distance the camera has moved during exposure based on the output from the AF sensor as a reference.

Accordingly, as described above, with the present embodiment, the AF sensor is effectively used, that is to say, the AF sensor is not only used for distance measuring but also used for holding checking, thereby providing a value added to the camera.

Furthermore, switching of the movement judgment value is performed according to the focal distance of the photography lens, thereby preventing unnecessary warning of blurring due to the movement of hands while maintaining accurate detection of blurring due to the movement of hands.

Furthermore, with the present embodiment, the signals from the acceleration sensor are used as well, and accordingly, the movement can be detected in the X direction and the Y direction, the camera can handle dark scenes and low-contrast scenes, and also the accurate moved amount of the camera can be calculated based on the output from the AF sensor used as a stillness sensor.

Thus, accurate determination with regard to blurring due to the movement of hands after taking a picture can be made corresponding to the focal distance of the photography lens, iris, and the shutter speed when taking a picture.

Furthermore, it is needless to say that an application may be made to cameras having a prevention-of-movement functions wherein the position of the photography lens is adjusted based on the calculated moved amount.

As described above, with the present fifth embodiment, when taking a picture wherein blurring due to the movement of hands is of particular concern, in a case that the holding check mode is set, in the event that blurring due to the movement of hands is caused, a warning is given so as to let the user recognize blurring due to the movement of hands, thereby enabling a picture to be taken without failure from blurring due to the movement of hands. Furthermore, the sensor used as a conventional distance-measuring sensor is used as well for the judgment as to blurring due to the movement of hands, thereby providing a camera having a blurring-due-to-movement-of-hands detection function with high reliability without increase in costs.

Furthermore, the present embodiment can provide a camera having a blurring-due-to-movement-of-hands detection function without unnecessary warning, which is convenient for the user.

Next, description will be made regarding a sixth embodiment of the present invention.

With the present sixth embodiment, the movement prevention mode consists of a movement notifying mode for giving a notice of the movement level, and a movement reduction mode for actively reducing the influence of the movement. Each mode can be independently set.

A notice of the movement level is given between the command of preparation for taking a picture and the command of start of taking a picture, and a notice of the level with regard to the image offset amount is given. Here, the image offset amount is calculated based on the movement information, the focal distance, and the exposure time period.

With the present sixth embodiment, setting/canceling of the movement prevention mode can be performed, and detection of the movement is started prior to the command of preparation of taking a picture according to the setting of the movement prevention mode. Here, detection of the movement is performed using two vibration gyroscopes (angular-velocity sensors).

Figure 31A:
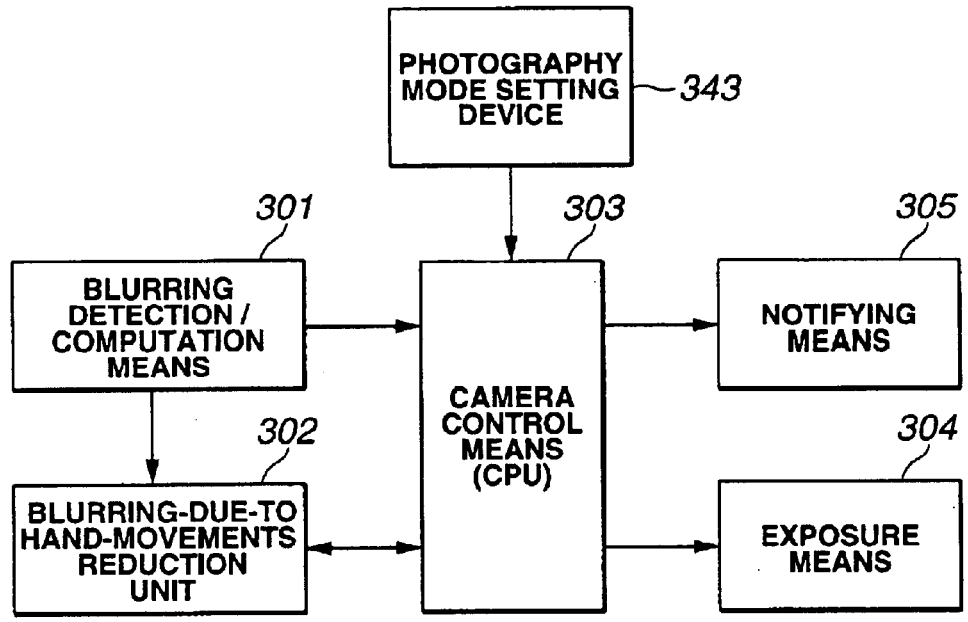
FIG. 31A is a diagram which illustrates a basic conceptual configuration of a sixth embodiment of the present invention.

FIG. 31A is a basic schematic diagram according to the present invention. Movement-detection/computation means 301 detects the movement state of the camera from a known movement detection sensor (e.g., angular-velocity sensor).

The aforementioned movement detection/computation means 301 performs operations wherein unnecessary frequency components such as noise and the like are removed, the moved amount of the generated image is computed based on the detected movement information, the focal distance, and the exposure time period, and the movement state is computed and predicted based on the detection movement information.

A movement reduction unit 302 performs predetermined movement reduction operations based on the computation results for the movement computed by the aforementioned movement detection/computation means 301.

Camera control means (CPU) 303 receives the output from the aforementioned movement detection/computation means 301, and controls the operations of giving a notice, and the operations of exposure, described later, and also controls the entire camera which is unshown in FIG. 31A, such as reception of the release SW of the camera and the like.

The exposure means 304 is a unit for performing exposure operations according to the instructions from the aforementioned camera control means (CPU) 303. Specifically, the exposure means are known components such as a shutter, mirror, and iris.

The notifying means 305 gives a notice as to information with regard to the image blurring state computed by the movement detection/computation means 301 according to the instructions from the camera control means (CPU) 303. Specifically, known display members such as LEDs, LCDs, or the like, and known audio emitting devices having an audio emitting function, are used.

A photography mode setting device 343 sets multiple photography modes (exposure, strobe, and the like) provided to the camera. The "movement notifying mode" and the "movement reduction mode" according to the present embodiment are set by the photography mode setting device 343.

Here, description will be made regarding a specific example of the movement reduction unit with reference to FIGS. 31B through 31D.

Figure 31B:
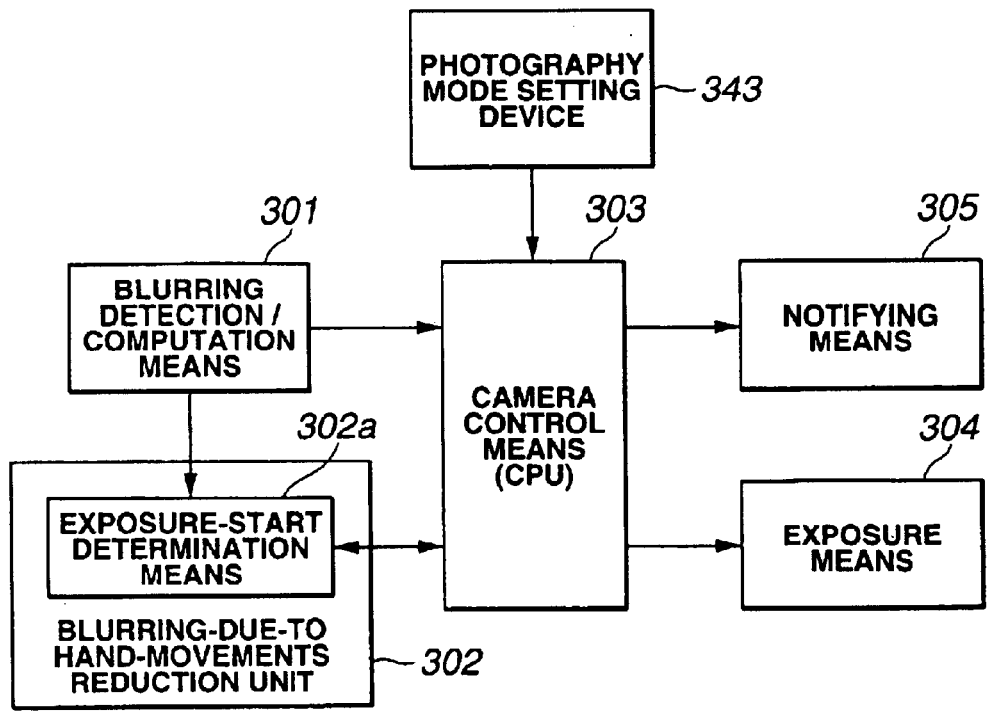
FIG. 31B is a diagram which illustrates an example having exposure start determination means as an example of a blurring-due-to-movement-of-hands reduction unit in FIG. 31A.

FIG. 31B is a diagram which illustrates an example of the camera having an exposure start determination means 302a as an example of the movement reduction unit.

The exposure start determination means 302a makes judgment with regard to a timing at which generated blurring state is small, based on the results of the prediction computation for the blurring computed by the aforementioned movement detection/computation means 301, and determines a timing wherein exposure is to be started.

Furthermore, exposure timing control is started from the completion of mirror up following the command of start of taking a picture, judgment is made with regard to zero-cross, and start of exposure is permitted based on the results of blurring prediction.

Thus, exposure is performed in a timing at which generated blurring is small, by the exposure start determination means 302a, thereby reducing the influence of the movement.

The camera control means (CPU) 303 receives the results from the aforementioned movement detection/computation means 301 and the exposure start determination means 302a, and performs control of the operations for notifying of the movement and exposure operations, described later.

Furthermore, the photography mode setting device 343 can set an "exposure operation mode (timing control mode)" wherein exposure is started at a timing determined, as the "movement reduction mode", by the aforementioned exposure determination means 302a.

Figure 31C:
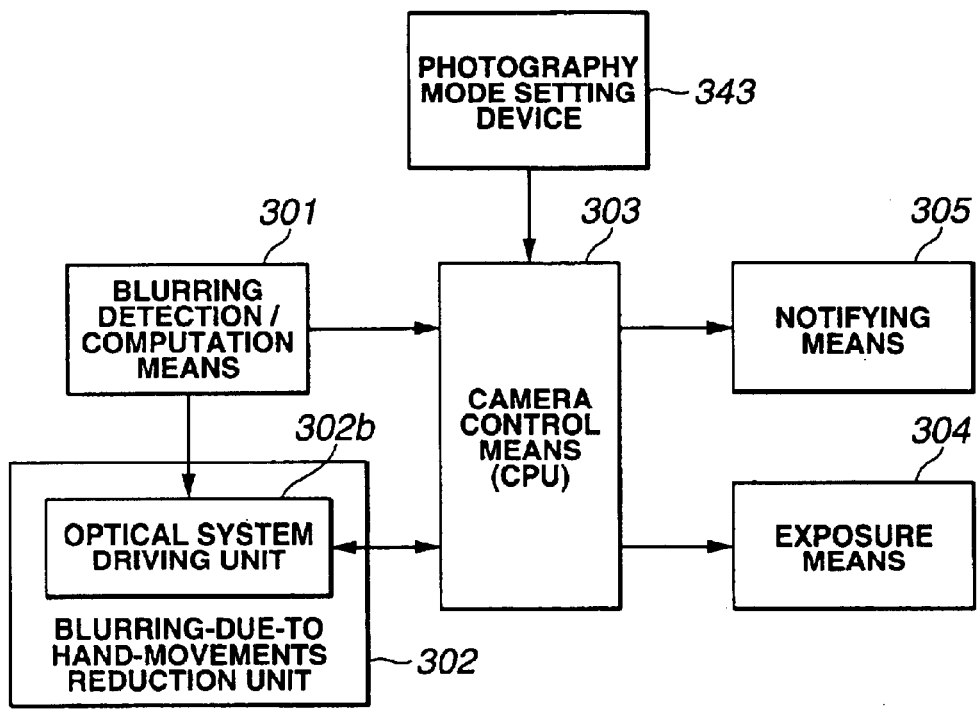
FIG. 31C is a diagram which illustrates an example having an optical system driving unit serving as a blurring-due-to-movement-of-hands reduction unit in FIG. 31A.

FIG. 31C is a diagram which illustrates an example wherein an optical system driving unit 302b is provided as the blurring reduction unit. That is to say, the example shows an arrangement wherein the optical axis of the photography optical system is changed based on the movement information so as to reduce the influence of the movement.

In this case, the optical system driving unit 302b receives the output from the movement detection/computation means 301, and drives at least one portion of the photographic optical system so as to reduce blurring due to the movement of hands. The methods for reducing blurring due to the movement of hands include arbitrary methods such as the known lens tilt method, decenter method, variable apex angle prism method, and the like.

Figure 31D:
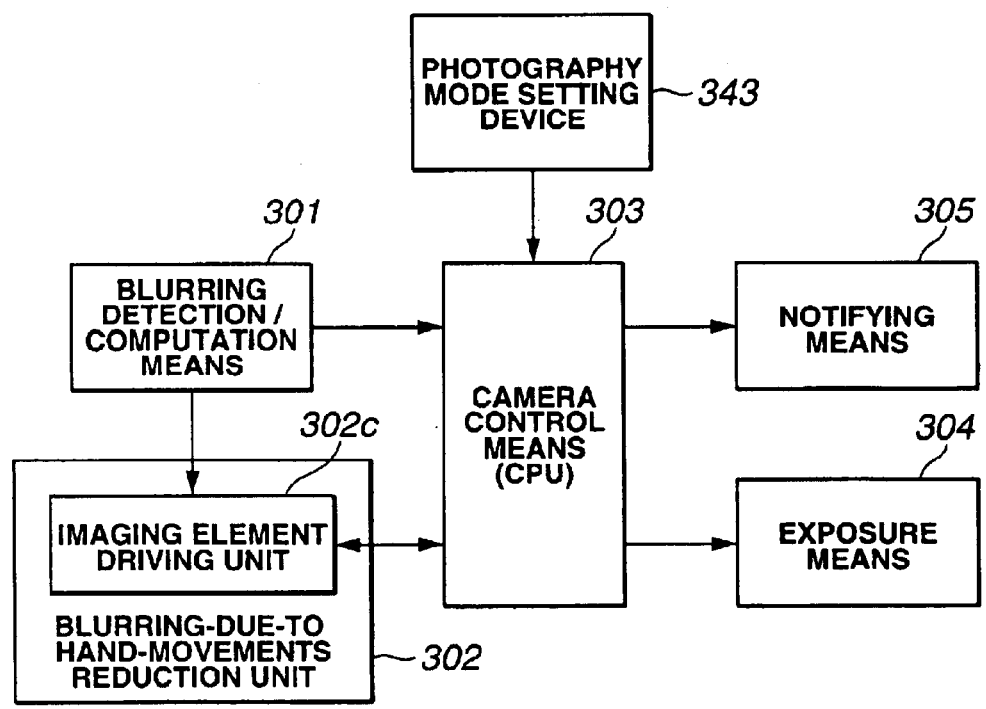
FIG. 31D is a diagram which illustrates an example having an image pickup device driving unit as a blurring-due-to-movement-of-hands reduction unit in FIG. 31A.

FIG. 31D is a diagram which illustrates an example wherein the method for reducing the blurring is applied to a camera employing an image pickup device, for example. In this case, the example includes the image pickup device driving unit 302c as a blurring-due-to-movement-of-hands reduction unit. In this case, an image pickup device driving unit 302c moves the image pickup device within the plane orthogonal to the optical axis according to the output from the movement detection/computation means 301 so as to reduce blurring due to the movement of hands. Also, an arrangement may be made wherein the extracting area for the image is changed according to the output from the movement detection/computation means 301 while the image pickup device is not physically moved.

Description will be made below regarding an example shown in FIG. 31B.

First of all, description will be made regarding the operations of the configuration shown in FIG. 31B in brief. In FIG. 31B, upon the first camera operations (command of preparation for taking a picture) being performed by an unshown operational member such as a release button, the camera control means (CPU) 303 performs operational instructions as to the movement detection/computation means 301. The results of the image blurring state computated by the aforementioned movement detection/computation means 301 are reported as present blurring state information by the notifying means 305.

Next, upon the second camera operations (command for starting taking a picture) being performed, the camera control means (CPU) 303 controls for the exposure start determination means 302a to perform exposure start determination operations based on the output from the aforementioned movement detection/computation means 301. Subsequently, the camera control means 303 starts exposure operations by the exposure means 304 at a timing wherein the movement is small, based on the results of exposure start determination.

With the present sixth embodiment, the notifying format is changed between a case that the notifying operation mode by the aforementioned notifying means 305 is selected and a case that the notifying operation mode by the aforementioned notifying means 305 and the exposure operation mode (timing control mode) based on the results of determination from the aforementioned exposure start determination means 302a are selected, as a photography mode of the camera, by the aforementioned photography mode setting device 343.

Figure 32:
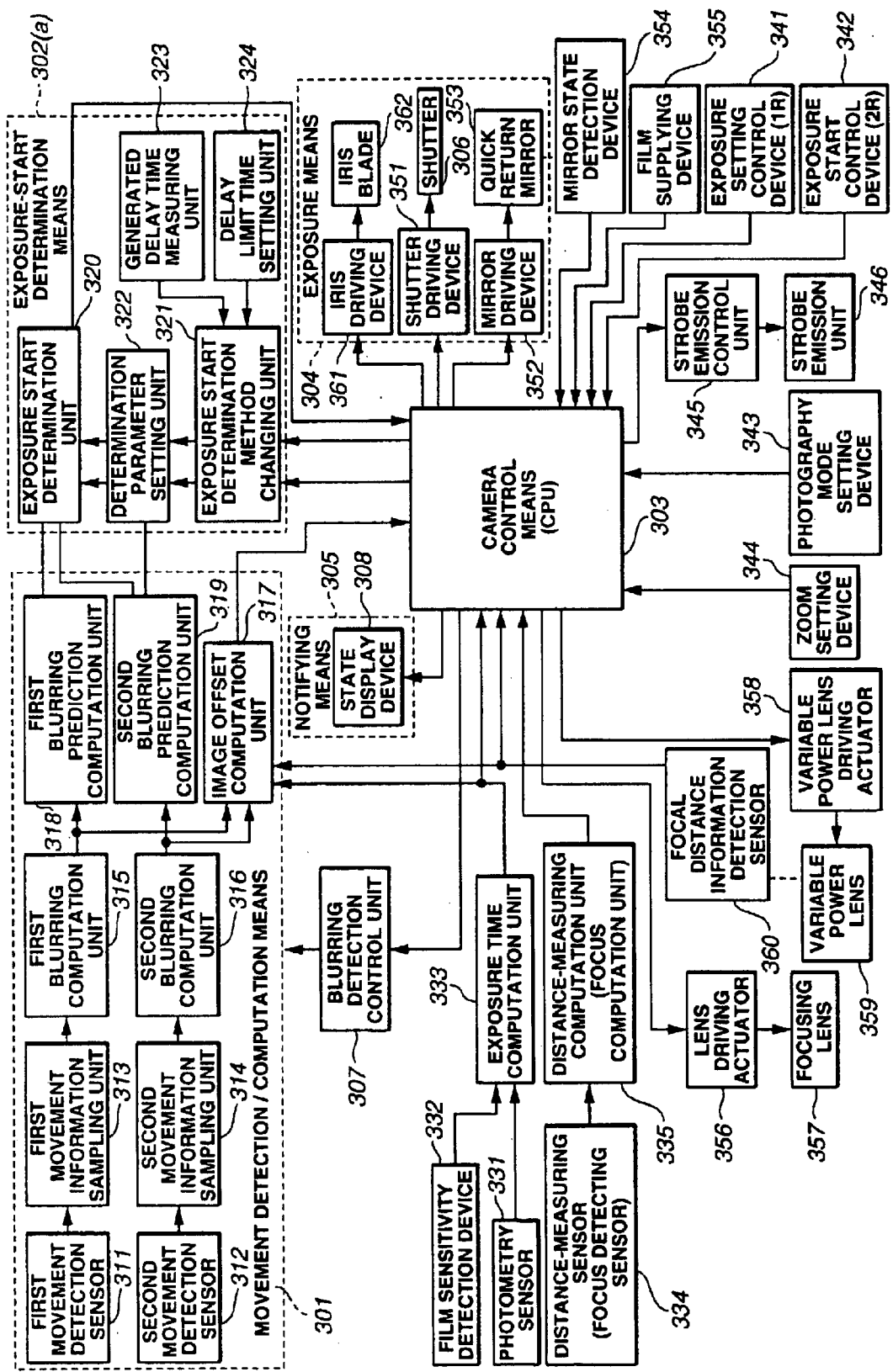
FIG. 32 is a configuration diagram which illustrates main components of the camera according to the sixth embodiment.

FIG. 32 is a configuration diagram which illustrates principal components of the camera according to the present sixth embodiment.

The movement detection/computation means 301 includes a first movement detection sensor 311, a second movement detection sensor 312, a first movement information sampling unit 313, a second movement information sampling unit 314, a first movement computation unit 315, a second movement computation unit 316, image blurring computation unit 317, a first blurring prediction computation unit 318, and a second blurring prediction computation unit 319. The aforementioned "first" and "second" corresponds, for example, to the vertical axis (X axis) and the horizontal axis (Y axis) of the photography screen having a perpendicular directional relation with the photography optical axis direction.

With the aforementioned first and second movement detection sensors 311 and 312, known vibration gyroscopes (angular velocity sensor) or the like can be employed. With the aforementioned first and second movement information sampling units 313 and 314, AD input ports of one-chip microcomputers (CPU) or general-purpose AD converters can be employed. The aforementioned first and second movement computation units 315 and 316 performs filtering computation or the like such as high-pass filtering and low-pass filtering for removing from the sampled movement state data noise components (DC components, high-frequency noise) independent of the movement.

The output signals from the two movement computation unit 315 and 316 are transmitted to the image blurring computation unit 317, the first blurring prediction computation unit 318, and the second blurring prediction computation unit 319, and processing described later is performed. Note that the operations of the movement detection/computation means 301 are controlled by the movement detection control unit 307, and the movement detection control unit 307 controls the movement detection/computation means 301 to perform movement detection/computation operations according to the instructions from the camera control means (CPU) 303 for performing control of the entire camera.

The image blurring computation unit 317 computes the present image blurred amount based on the blurring state data from the aforementioned movement detection/computation means 301, focal distance information from a focal distance information detection sensor 360, and exposure time period information from an exposure time period computation unit 333. The computation results are transmitted to the camera control means (CPU) 303. Furthermore, the present blurring level state is reported (displayed) by a situation display device 308 within the notifying means 305 provided within the viewfinder, for example. Note that the notifying means 305 also reports information with regard to taking a picture, such as an exposure time period, iris value, and the like, besides the aforementioned information with regard to the blurred level.

The first blurring prediction computation unit 318 and the second blurring prediction computation unit 319 perform prediction with regard to the blurring state based on the output from the aforementioned movement detection/computation means 301 with predetermined computation. The aforementioned "first" and "second" corresponds to the vertical axis (X axis) and the horizontal axis (Y axis) of the photography screen having a perpendicular directional relation with the photography optical axis direction, for example. The two prediction computation units 318 and 319 each include blurring information storage units, unshown in FIG. 32, for storing past blurring information. The stored past blurring information is used for computation for prediction of the blurring. The two prediction computation units 318 and 319 predict a slightly future blurring state with computation based on the stored present and past blurring information.

Specifically, a method as disclosed in Japanese Unexamined Patent Application Publication No. 5-204012. Making description in brief, prediction computation is performed with the following expression.

$$BLx(t+m)=Ka*BLx(t)+Kb*BLx(t-10)+Kc*BLx(t-20)$$

Here, BLx(t+m) represents the movement state value m [m sec] later than the present time in the X-axis direction within the image plane, BLx(t) represents the movement state value at the present time in the X-axis direction within the image plane, BLx(t-10) represents the movement state value 10 [m sec] prior to the present time in the X-axis direction within the image plane, and BLx(t-20) represents the movement state value 20 [m sec] prior to the present time in the X-axis direction within the image plane. Also, Ka, Kb, and Kc are coefficients for prediction computation. With the computation, the slightly future movement can be predicted based on the movement information with regard to the present time and the two points in the past time. The aforementioned expression and coefficients can be used for both of the movement corresponding to the X direction and the Y direction within the photography screen. The results of the prediction computation are transmitted to the exposure start determination means 302a.

An exposure start determination unit 320 included in the exposure start determination means 302a makes judgment whether the movement state is great or small based on the output signals from the aforementioned first movement prediction computation unit 318 and the second movement prediction computation unit 319, i.e., based on predetermined algorithm from the prediction results of the movement state. When the movement is small, an exposure start permission signal is output to the camera control means (CPU) 303.

The exposure start determination means 302a further includes a component for controlling the determination operations and changing the method for the determination operations in the exposure start determination unit 320, according to the instructions from the aforementioned camera control means (CPU) 303. Specifically, the principal unit comprises an exposure start determination method changing unit 321, which is a principal unit, a determination parameter setting unit 322, a generated delay time measuring unit 323, and a delay limitation time setting unit 324.

In the determination parameter setting unit 322, the determination parameters, which are used in the aforementioned exposure start determination unit 320, are set. The parameters which are set by the determination parameter setting unit 322 include information with regard to determination permissible time period used for determination whether or not the movement state becomes zero level both in the two-axis directions of the X direction and the Y direction within the photography plane of the camera in a predetermined time period. In the event that the determination permissible time period is set to a great value, the exposure start permission is generated with high frequency, and conversely, in the event that the determination permissible time period is set to a small value, the exposure start permission is generated with low frequency.

Basically, exposure start determination by the exposure start determination unit 320 permits exposure start at a point that the movement is small, however, in the event that the movement does not become small, exposure cannot be started. In this case, exposure cannot be started for a long time, so the user could mistakenly assume that the camera is malfunctioning.

Accordingly, in general, upon predetermined time elapsing, the control of the exposure start timing is stopped independent of the movement state. Furthermore, an arrangement may be made wherein control is performed such that the exposure start permission is readily given even in the event the predetermined time does not elapse, i.e., such that the delay time (release time lag) becomes short. Specifically, the determination parameters set by the aforementioned determination parameter setting unit 322, are changed according to time elapsing from a point in time at which the exposure start timing control has been started.

The aforementioned generated delay time measuring unit 323 measures the time period wherein the exposure start determination is performed, i.e., generated delay time. The aforementioned delay limitation time setting unit 324 sets predetermined time information for the aforementioned exposure start determination to end. Thus, in the event that the predetermined time elapses for performing exposure start determination, the exposure start determination is stopped independent of the output signals from the aforementioned first blurring prediction computation unit 318 and the second blurring prediction computation unit 319, i.e., the prediction results of the blurring, and exposure start (permission) is performed for the camera control means (CPU) 303.

The camera control means (CPU) 303 controls the entire camera. A photometry sensor 331 is a unit for measuring the luminance state of the subject. A film sensitivity detection device 332 is a unit for detecting the sensitivity of the film loaded into the camera, and the exposure time computation unit 333 calculates an optimal exposure time period based on these detection results. The information is transmitted to the camera control means (CPU) 303 as information for determining the exposure time period for taking a picture, and to the image blurring computation unit 317 for computing the image blurring amount.

A distance-measuring (focus detection) sensor 334 is a sensor for measuring the distance between the camera and the subject. The distance-measuring computation unit (focus computation unit) 335 is a unit for calculating the driving amount of the focusing lens described later according to the results of distance-measuring (focus detection). The computation results are transmitted to the aforementioned camera control means (CPU) 303 for driving the focusing lens.

An exposure setting control device (1R) 341 corresponds to the first release button of the camera. An exposure start control device (2R) 342 corresponds to the second release button of the camera. The aforementioned photography mode setting device 343 sets the multiple photography modes (exposure, strobe, and the like) included in the camera. The "blurring notifying mode" and "timing control mode" according to the present embodiment are set by the photography mode setting device 343.

That is to say, in this case, the "timing control mode" is prepared as the "blurring reduction mode". Furthermore, in the event that both of the "blurring notifying mode" and "blurring reduction mode" are set, the mode will be referred to as "blurring notifying and reduction mode".

A zoom setting device 344 gives instructions on the focal distance of the photography optical system. The setting/instruction information from these means are transmitted to the aforementioned camera control means (CPU) 303 so that the camera can handle each setting operations.

A strobe emission control unit 345 controls the emission amount and emission timing in a strobe emission unit 346 according to the instructions from the camera control means (CPU) 303.

A shutter driving device 351 is a unit for driving the shutter 306. A mirror driving device 352 is a unit for driving a quick return mirror 353. A mirror state detection device 354 is a unit for monitoring the operational state of the quick return mirror 353. An iris driving device 361 is a unit for setting an iris blade 362 to a predetermined state. These devices and members are used for exposure operations of the camera, and make up the exposure means 304.

A film supplying device 355 is a unit for performing spooling and rewinding of the film loaded into the camera, and comprises an actuator, a spool, and a sprocket. A lens actuator 356 is a unit for driving a focusing lens 357 for focusing, and performs lens driving based on the computation results from the aforementioned distance-measuring computation unit (focus computation unit) 335.

A variable power lens driving actuator 358 is a unit for driving a variable power lens 359, and performs driving of the aforementioned variable power lens 359 based on the setting instructions from the aforementioned zoom setting device 344. A focal distance information detection sensor 360 detects the present focal distance state based on the positional situation of the aforementioned variable power lens 359, and is made up of known encoders. The detected information is transmitted to the aforementioned camera control means (CPU) 303 for confirming the focal distance state, and to the image blurring computation unit 317 for the above-described image blurring amount computation.

With the operations of the camera having the above-described configuration, description will be made in brief regarding the operations corresponding to the "blurring prevention function". First of all, let us say that, with the photography mode of the camera, either of the "blurring notifying mode1" or "timing control mode", or both of these two modes, are set by the aforementioned photography mode setting device 343. Thus, the aforementioned movement detection/computation means 301 is turned on, and starts the movement detection operations according to the instructions from the aforementioned movement detection control unit 307.

Next, upon a signal from the aforementioned exposure setting control device (1R) 341, i.e., a signal from the first release of the camera, being input, AE, AF, lens extending, and the like are performed, whereby setting operations of the camera are performed for taking a picture. In the event that the "blurring notifying mode" is selected, the aforementioned situation display device 308 gives a notice of the generated blurring level at the same timing. In this case, the notifying formats carried out by the notice display device 308 are different between a case that only the "blurring notifying mode" is selected, and a case that both of the "blurring notifying mode" and "timing control mode" are selected. Description will be made later regarding the aforementioned fact. Note that in the event that only the "timing control mode" is selected, the situation display device 308 does not give notice display according to the generated blurring situation.

Next, upon a signal from the aforementioned exposure start control device (2R) 342, i.e., a signal from the second release of the camera, being input, operations are performed for exposure. With an SLR camera, for example, the aforementioned mirror driving device 352 drives the aforementioned quick return mirror 353 such that the incident light from the lens can reach the photography plane (film). Here, the aforementioned mirror state detection device 354 is a device for monitoring the operational state of the aforementioned quick return mirror 353. The aforementioned iris driving device 361 drives the aforementioned iris blade 362 such that the iris exhibits the required iris value.

Following the aforementioned mirror and iris being set in predetermined situations, the aforementioned shutter driving device 351 drives (operates) the shutter 306 in order to perform exposure operations. Following predetermined exposure time elapsing, and the exposure ending, the aforementioned mirror and iris are driven so as to be moved to the predetermined positions. Subsequently, the aforementioned film supplying device 355 performs film spooling operations, whereby a series of exposure operations ends.

Now, in the event that the "timing control mode" is selected as the photography mode, the exposure start determination function is operated. Specifically, the blurring state is monitored from the completion of the mirror operations based on the movement detection operations, and in case judgment is made that the movement becomes small based on predetermined algorithm, the operations of the aforementioned shutter 306 are permitted.

Figure 33:
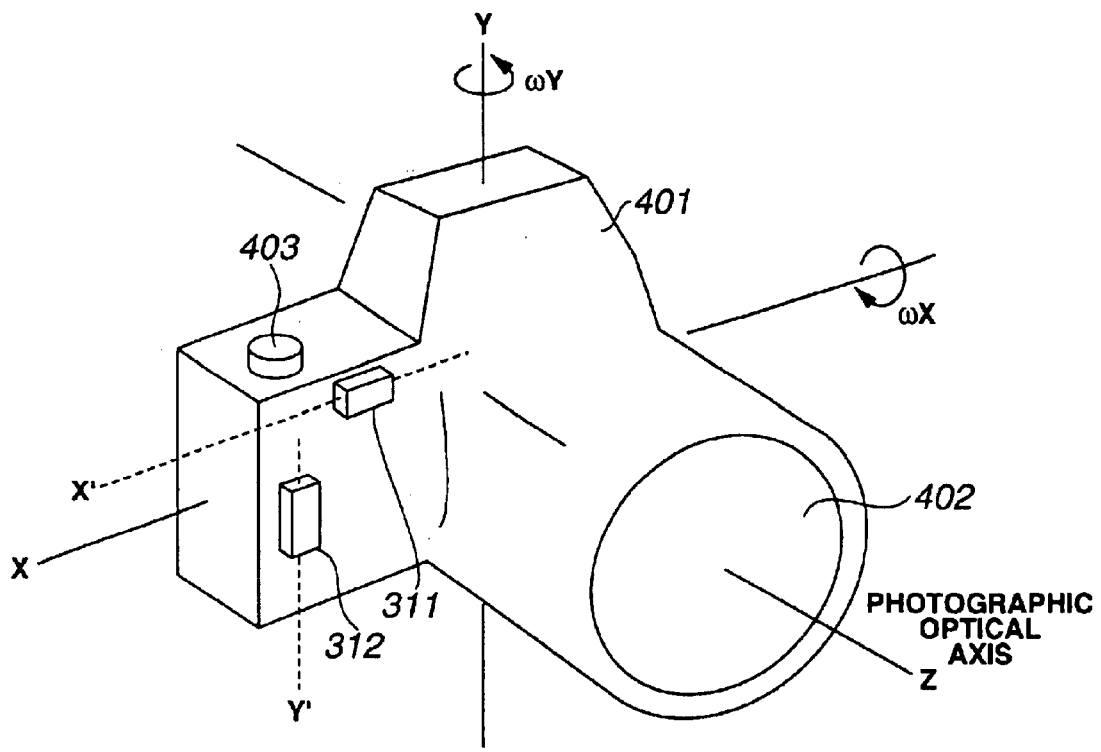
FIG. 33 is a perspective view which illustrates the external view of the camera of the sixth embodiment.

FIG. 33 is an external view of the camera of the present sixth embodiment.

In FIG. 33, reference numeral 401 denotes a camera body, 402 denotes a photography lens, and 403 denotes a release button. Furthermore, the first movement detection sensor 311 and the second movement detection sensor 312, described in FIG. 32, are disposed at the positions within the camera as shown in FIG. 33. Here, the aforementioned first movement detection sensor 311 is disposed along the X' axis parallel to the X axis in the drawing, and detects the rotational movement angular velocity ($\omega$X) in the Y-axis direction within the photography plane. Furthermore, the aforementioned second movement detection sensor 312 is disposed along the Y' axis parallel to the Y axis in the drawing, and detects the rotational movement angular velocity (($\omega$Y) in the X-axis direction within the photography plane.

Figure 34:
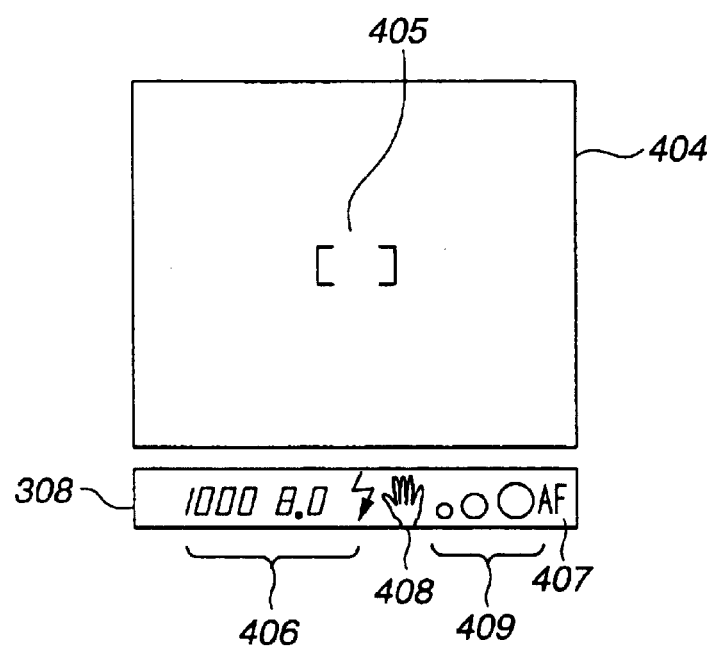
FIG. 34 is a diagram which illustrates a configuration example of a situation display device provided within a viewfinder of the camera according to the sixth embodiment.

FIG. 34 is a diagram which illustrates a configuration example of the situation display device 308 provided within the viewfinder of the camera according to the present sixth embodiment. Also, FIG. 35 is a diagram which illustrates a display example by the blurring notifying unit 409.

In FIG. 34, reference numeral 404 denotes a viewfinder visual-field frame, and reference numeral 405 denotes a distance-measuring frame. The situation display device 308 is provided underneath the viewfinder visual-field frame 404. The aforementioned situation display device 308 comprises a photography information reporting unit 406 for reporting exposure time, iris value, the presence or absence of strobe emission, and the like, a focusing reporting unit 407 for reporting the focusing/non-focusing state, a movement mode reporting unit 408 for reporting whether or not the movement mode is set by the photography mode setting device 343, and a blurring level reporting unit 409 for reporting the level of the image blurring state based on the image blurring amount calculation results from the image blurring computation unit 317 in FIG. 32. Note that an arrangement may be made wherein the aforementioned blurring level reporting unit 409 gives notice display in three grades as shown in a, b, and c, in FIG. 35, for example.

Figures 35, 36:
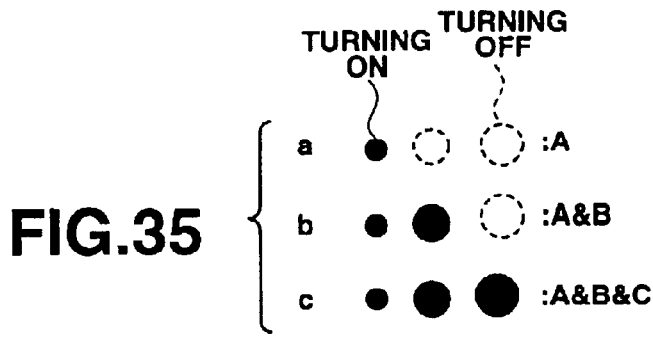
FIG. 35 is a diagram which illustrates a display example of a blurring notifying unit of the camera according to the sixth embodiment.
FIG. 36 is a diagram which indicates the relation between the generated image blurred amount and the notifying format according to the camera of the sixth embodiment.

Now, description will be further made with reference to FIG. 36. FIG. 36 is a diagram which indicates the relation between the generated image blurring amount and the notifying format for each selected photography mode related to the blurring reduction. In this drawing, in the event that only the "blurring notifying mode" is selected, and the image blurring amount calculated from the blurring detection results is 60 $\mu$m, the blurring notifying format is shown in FIG. 35-b, for example. Furthermore, in the event that the "blurring notifying mode" and "timing control mode" are selected, and the image blurring amount calculated from the blurring detection results is 60 $\mu$m, the blurring notifying format is as shown in FIG. 35-a.

That is to say, even with the same blurring amount, the notifying format is differentiated depending on mode selection wherein only the blurring notifying mode is selected, or the "timing control mode" is selected besides the blurring notifying mode. The notifying format of the blurring is changed according to the size of the image blurring level at this time. Note,that in the event that both modes are not selected, or in the event that only the "timing control mode" is selected, notice of the blurring does not given.

Figure 37:
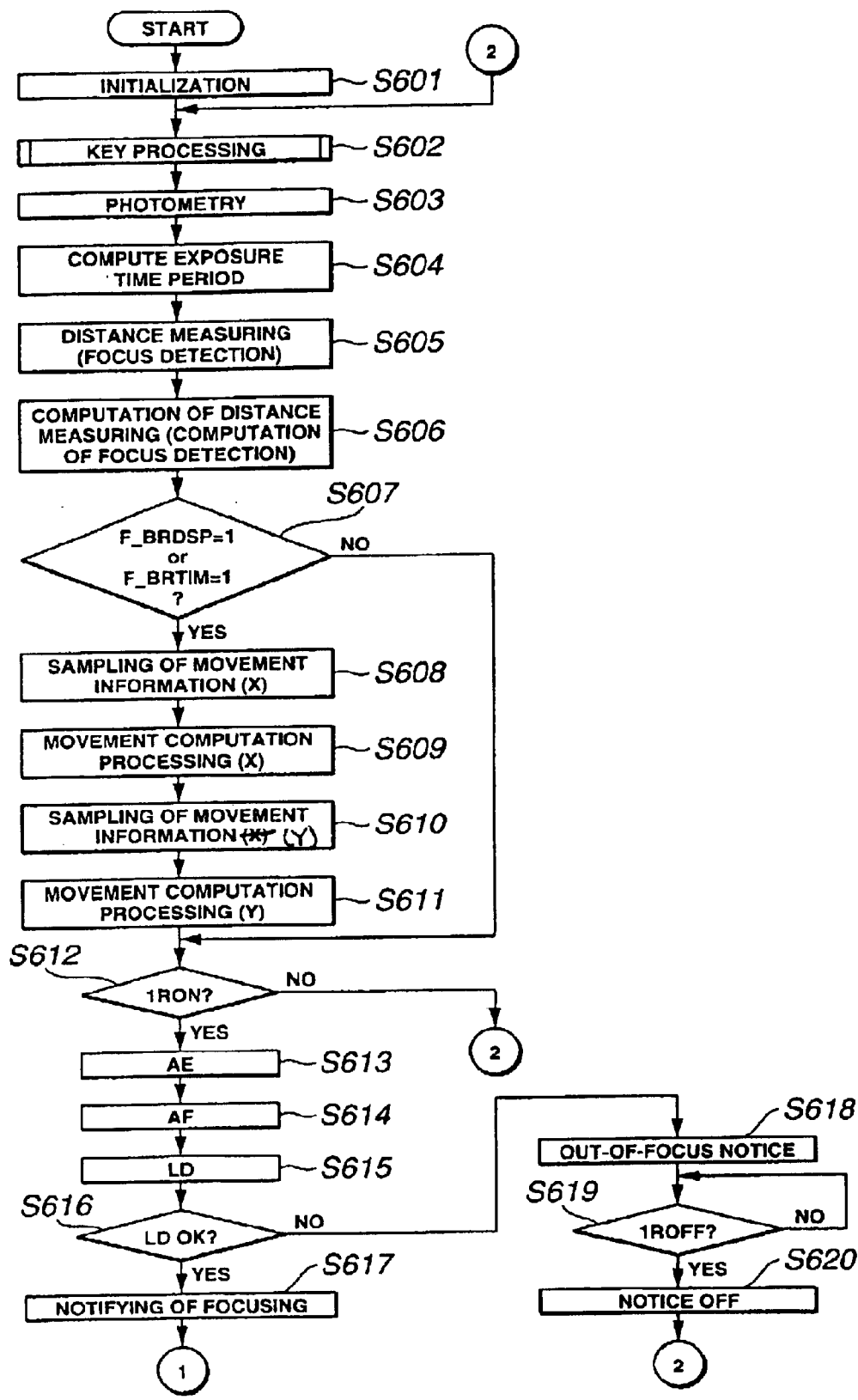
FIG. 37 is a flowchart for describing the overall operation of the camera according to the sixth embodiment.
Figure 38:
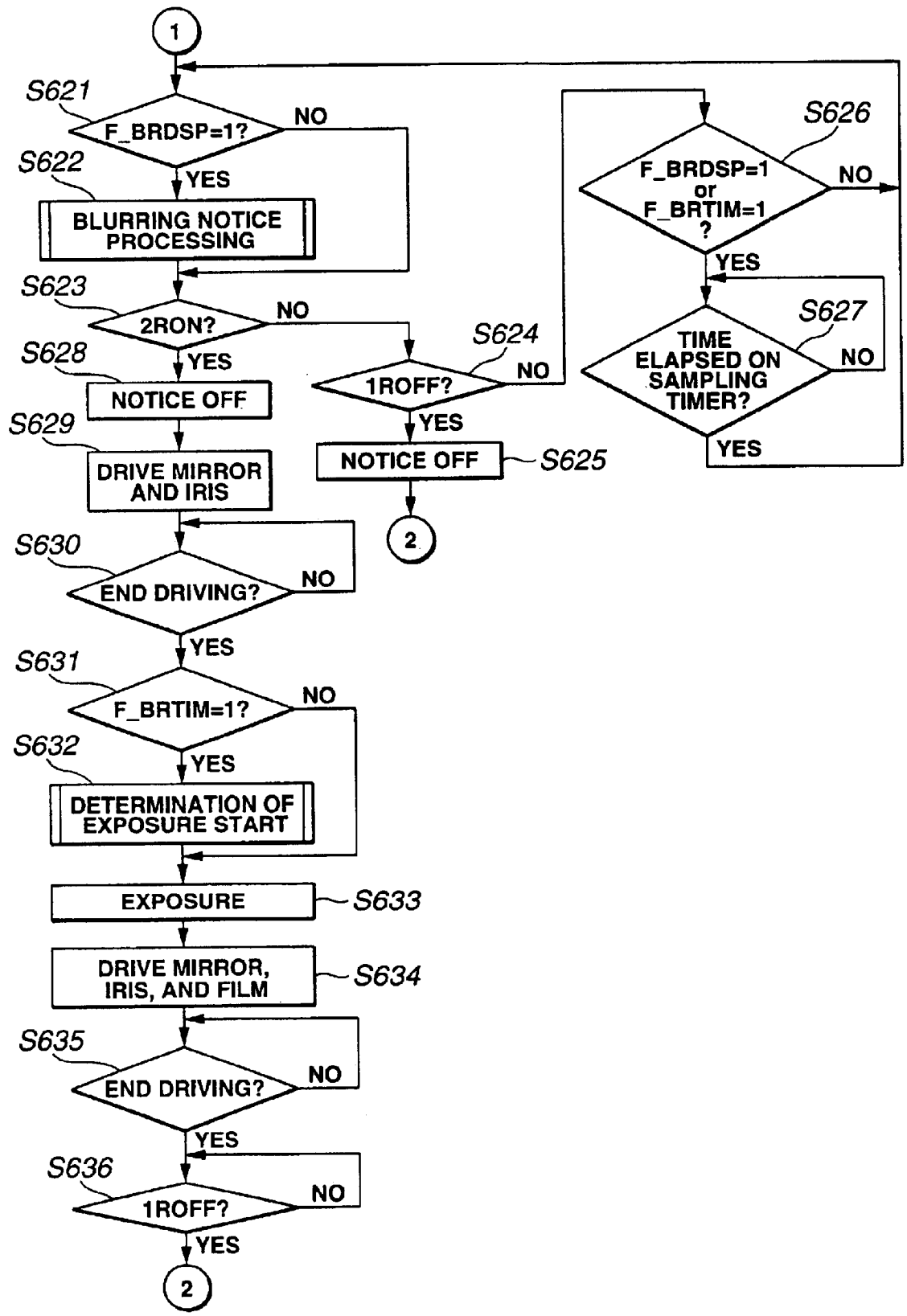
FIG. 38 is a flowchart for describing the overall operation of the camera according to the sixth embodiment.

FIGS. 37 and 38 are flowcharts for describing the overall operations of the camera according to the present sixth embodiment.

In Step S601, initializing of the camera is performed. In Step S602, key processing is performed. This is the processing wherein prior to ON operation (1R ON) of the exposure setting control means 341, setting of the photography mode of the camera, processing corresponding to zoom operations or the like, are performed. Detailed description regarding the key processing will be made later with reference to FIGS. 39 through 41.

In Step S603, the photometry operations for the luminance of the subject are performed by the photometry sensor 331. In Step S604, receiving the photometry results in Step S603 and the results of film sensitivity detection by the film sensitivity detection device 332, computation for exposure time is performed.

In Step S605, the distance-measuring (focus detection) sensor 334 performs distance-measuring (focus detection) operations. In Step S606, receiving the results of distance measuring (focus detection) in Step S605, computation for the distance to the subject is performed by the distance-measuring computation unit (focus computation unit) 335.

In Step S607, judgment is made whether or not the flag F_BRDSP is 1, or F_BRTIM is 1. Thus, judgment is made whether or not the present photography mode is "blurring notifying mode", or "timing control mode". In the event that either mode is selected, the flow proceeds to Step S608, otherwise, the flow proceeds to Step S612. Note that description will be made later regarding to mode setting with reference to FIG. 41.

In Step S608, sampling of blurring information corresponding to the X-axis direction within the image plane is performed. This is the processing wherein the second movement information sampling unit 314 performs sampling of the output from the second movement detection sensor 312. In Step S609, movement computation processing (removal of unnecessary frequency components independent of the movement) corresponding to the X-axis direction within the image plane. The processing is performed by the second movement computation unit 316.

In Step S610, sampling of movement information corresponding to the Y-axis direction within the image plane is performed. This is the processing wherein the first movement information sampling unit 313 performs sampling of the output from the first movement detection sensor 311. In Step S611, movement computation processing (removal of unnecessary frequency components independent of the movement) corresponding to the Y-axis direction within the image plane is performed. The processing is performed by the first movement computation unit 315.

In Step S612, judgment is made with regard to the presence or absence of the operations of 1R (exposure setting control device 341). In the event that 1R is not ON, the flow returns to Step S602. Conversely, in the event 1R is ON, the flow proceeds to Step S613. In Step S613, the photometry sensor 331 performs photometry operations, and the exposure time computation unit 333 performs computation for the exposure time (AE).

In Step S614, the distance-measuring (focus detection) sensor 334 performs distance-measuring (focus detection) operations, and the distance-measuring computation unit (focus computation unit) 335 performs computation (AF).

In Step S615, the lens driving actuator 356 performs driving of focusing lens 357 (LD).

In Step S616, judgment is made whether or not the LD processing in Step S615 is OK. In the event that judgment is made that the LD processing is NG (no good), judgment is made whether or not 1R is OFF in the processing following Step S618.

On the other hand, in the event that the judgment in Step S616 is "YES", the flow proceeds to Step S617. In Step S617, receiving the result that the LD processing is OK, focusing is reported. The report is performed by the focusing reporting unit 407 in FIG. 34. Subsequently, the flow proceeds to Step S621.

In Step S616, judgment is made that the LD processing is NG, notice of non-focusing is given in Step S618. The notice is given by the focusing reporting unit 407 in FIG. 34.

In Step S619, judgment is made with regard to the operations of 1R (exposure setting control device 341). In the event that 1R is not OFF, the judgment in Step S619 is repeated until the 1R is OFF.

In Step S620, upon receiving the OFF state of 1R, notifying mode of non-focusing, which has been set in Step S618, is OFF.

In Step S621 in FIG. 38, based on the flag F_BRDSP is 1 or not, judgment is made whether or not the "blurring notifying model" is set. In the event that the blurring notifying mode is not set, the flow proceeds to Step S623.

On the other hand, in the event that the blurring notifying mode is set, the flow proceeds to Step S622. In Step S622, the blurring notifying processing is performed. This is the processing wherein the level of the present image blurring state is reported based on the detected blurring information, focal distance information, and exposure time information. Detailed description will be made later with reference to FIG. 42.

In Step S623, judgment is made whether or not 2R (exposure start control device 342) is ON. In the event that 2R is ON, the flow proceeds to Step S628, and conversely, in the event that 2R is OFF, the flow proceeds to Step S624.

In Step S624, judgment is made with regard to the operations of 1R (exposure setting control device 341). In the event that 1R is OFF, focusing/non-focusing reporting mode and image blurring state level reporting mode are set to OFF in Step S625, and subsequently, the flow returns to Step S602.

In Step S624, in the event that 1R is ON, the flow proceeds to Step S626. In Step S626, judgment is made whether or not the flag F_BRDSP is "1", or the flag F_BRTIM is "1". Thus, judgment is made that the "blurring notifying mode" is set, or the "timing control mode" is set. In the event that both modes are not set, the flow returns to Step S621.

On the other hand, in the event that either mode is set, the flow proceeds to Step S627. In Step S627, judgment is made whether or not predetermined time has elapsed based on the measured time of the sampling timer for performing the blurring detection at constant intervals, which has been started within the "blurring reporting processing" in Step S622. In the event that the predetermined time has not elapsed, the judgment in Step S627 is repeated, and conversely, in the event that the predetermined time has elapsed, the flow returns to Step S621.

In Step S628, receiving the ON operation of 2R, the focusing/non-focusing state reporting mode and the image blurring state level reporting mode are set to OFF.

In Step S629, the mirror driving device 352 performs mirror-up driving of the quick return mirror 353, and the iris driving device 361 performs driving of the iris blade 362. While description has been made regarding an operational example of the SLR camera, in a case of an LS camera, the lens driving actuator 356 drives the focusing lens 357.

In Step S630, judgment is made whether or not the driving operations, which has been started in Step S629, ends. The processing is performed by checking the output from the mirror state detection means 354, for example. The judgment is repeated until the operation ends.

In Step S631, based on the flag F_BRTIM is 1 or not, judgment is made whether or not the "timing control mode" is set. In the event that the timing control mode is not set, the flow proceeds to Step S633.

In Step S632, determination is made with regard to exposure start based on the blurring state. Detailed description will be made later with reference to FIGS. 45A and 45B.

In Step S633, exposure operations are performed by the shutter 306.

In Step S634, the mirror driving device 352 performs mirror-down driving of the quick return mirror 353, the iris driving device 361 performs iris opening driving of the iris blade 362, and the film supplying device 355 performs driving of spooling of the film. While description has been made in a case of the SLR camera, in the event of the LS camera, the lens driving actuator 356 performs positioning of the focusing lens 357 to the initial position.

In Step S635, judgment is made whether or not each driving operation, which has been started in Step S634, ends. The judgment is repeated until the operation ends.

In Step S636, judgment is made with regard to ON/OFF of the operation of 1R (exposure setting control device 341). In the event that 1R is OFF, the flow returns to Step S602. In the event that 1R is ON, the judgment is repeated until the 1R becomes OFF.

Figure 39:
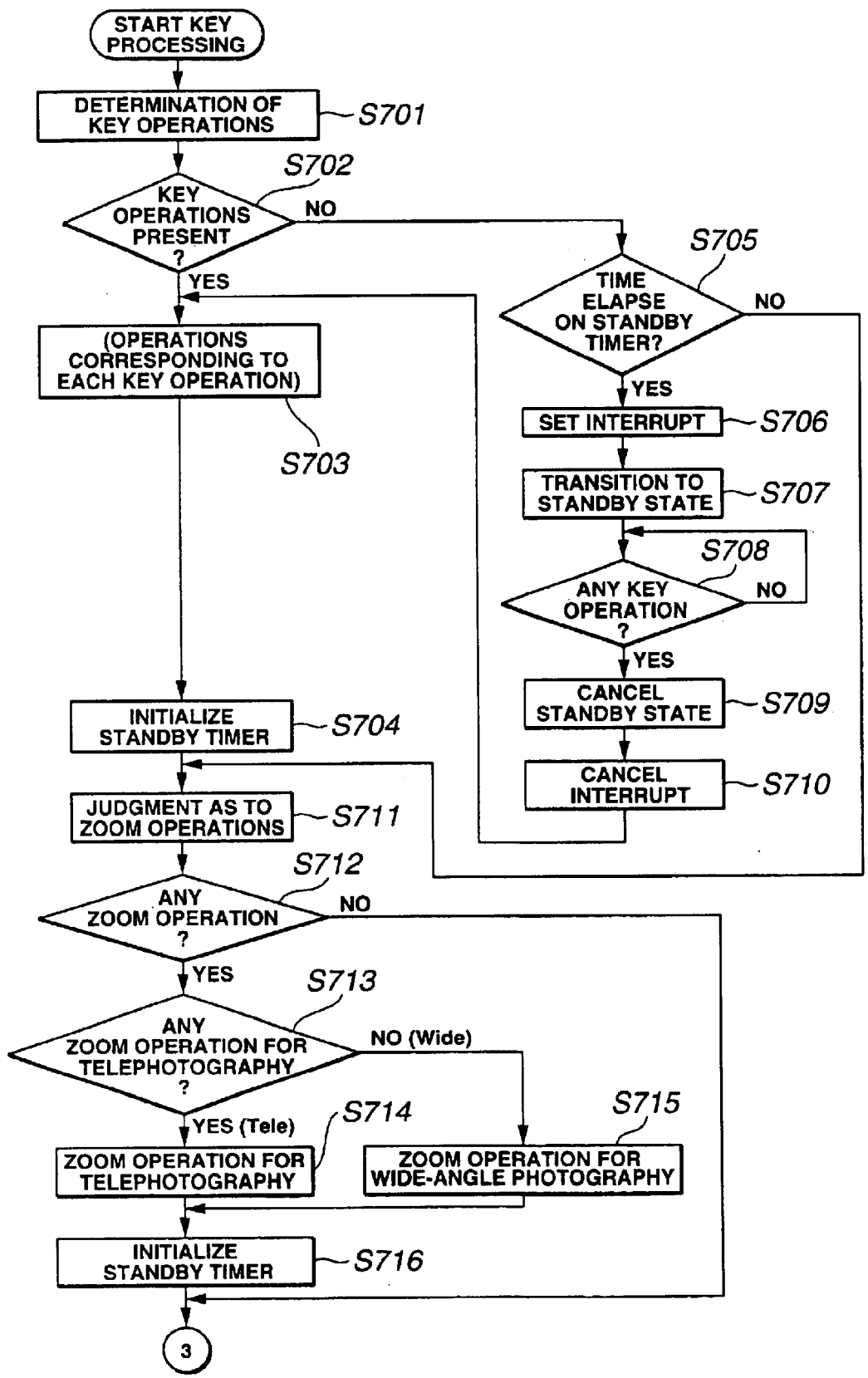
FIG. 39 is a flowchart which indicates key processing according to the camera of the sixth embodiment.
Figure 40:
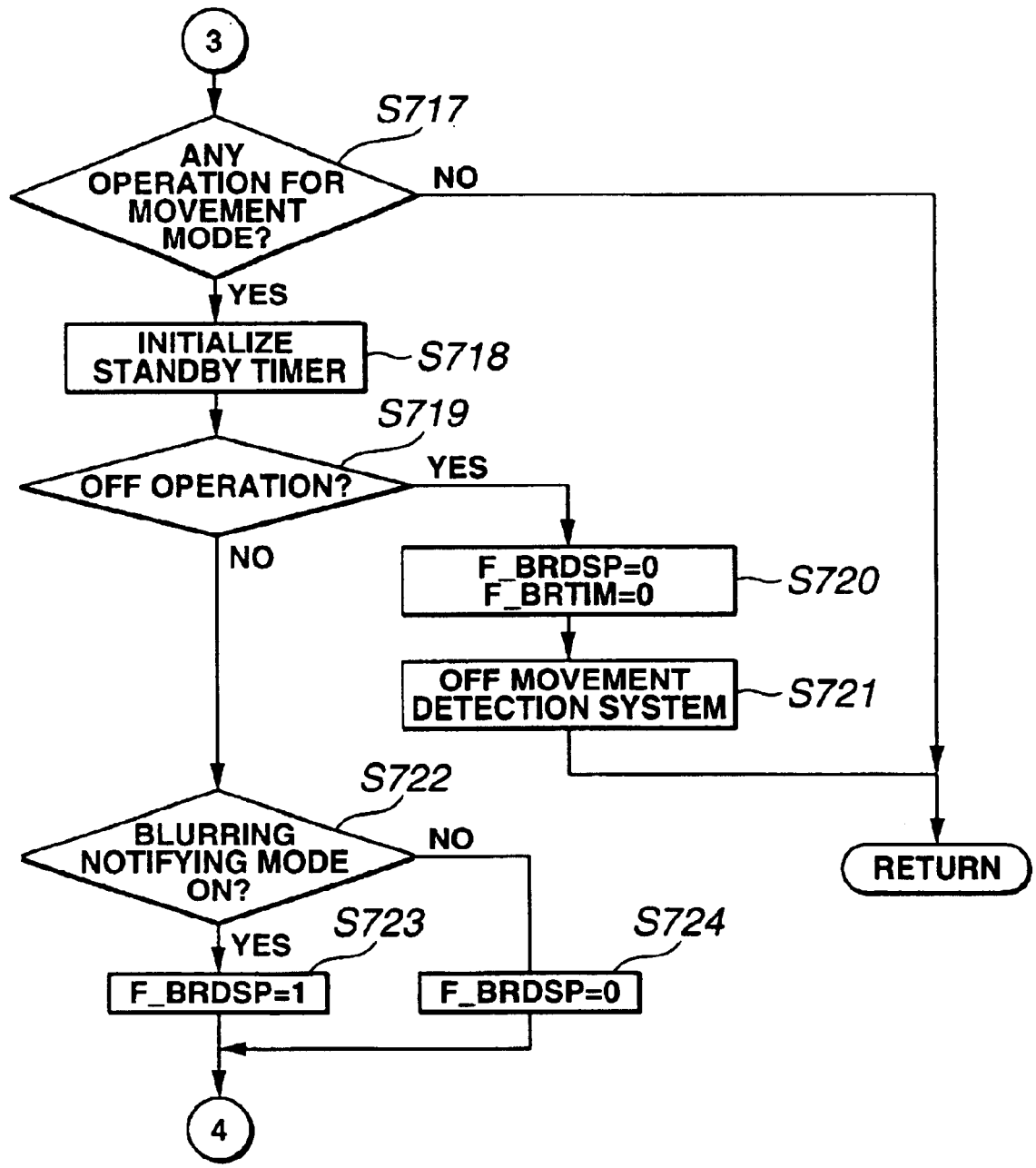
FIG. 40 is a flowchart which indicates key processing according to the camera of the sixth embodiment.
Figure 41:
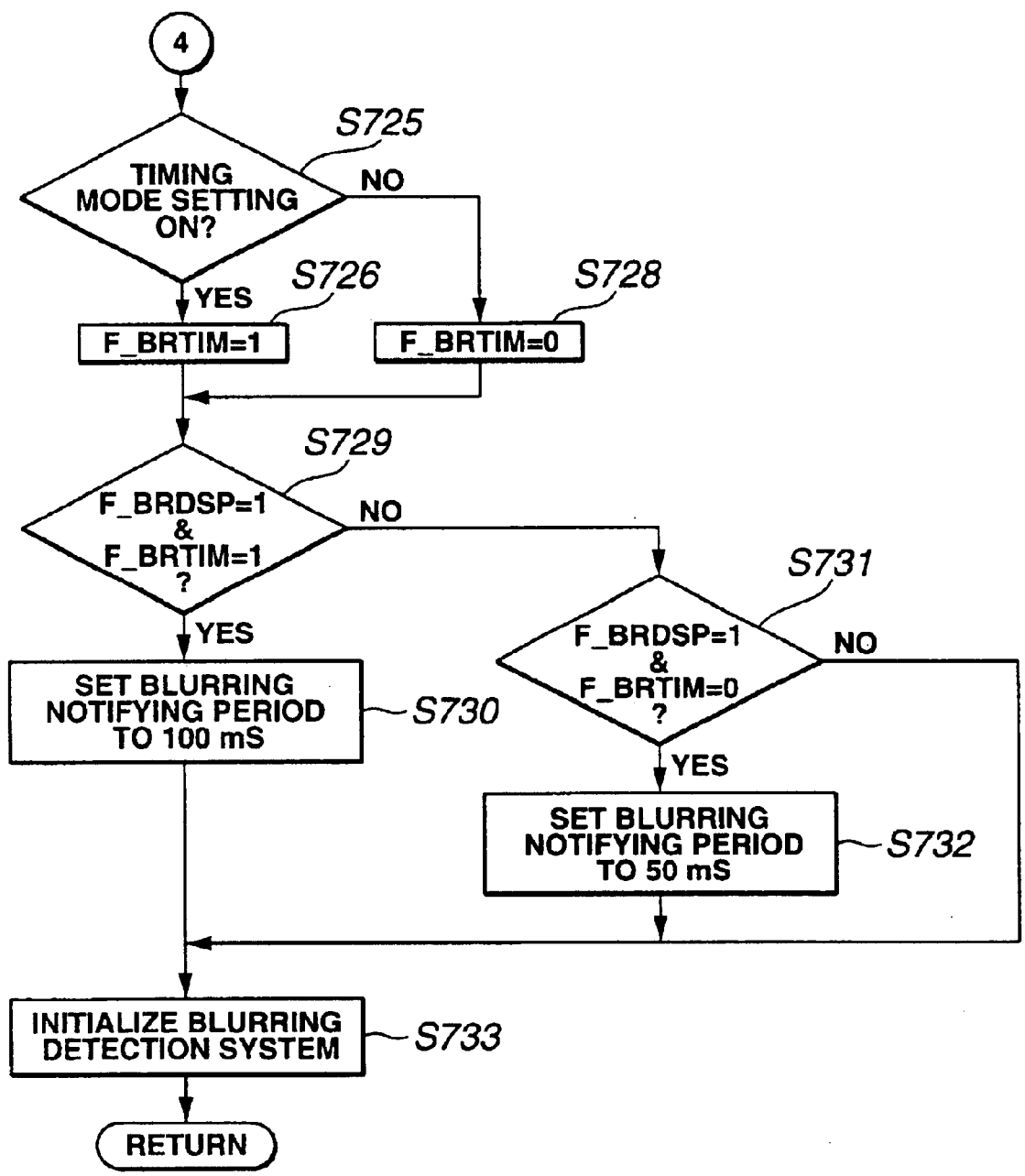
FIG. 41 is a flowchart which indicates key processing according to the camera of the sixth embodiment.

FIGS. 39 through 41 illustrate flowcharts with regard to a portion for performing key operation processing.

In Step S701, check of key operations (key scanning) is performed. This is the processing wherein checking is performed whether or not any operational member of the camera is operated. Note that description will be made later regarding the zoom operations by the zoom setting device 344, and the blurring mode setting operations by the photography mode setting device 343.

In Step S702, judgment is made whether or not any key operation is performed. In the event that the operation is performed, each processing operation is performed corresponding to the key operation in Step S703.

In step S704, as the operations of the operational member is performed, a standby timer serving as a standard, which indicates whether or not the camera is to be set to the standby state (stop of all the functions), is initialized and restarted. Subsequently, the flow proceeds to Step S711.

On the other hand, in the event that the any key operation is not performed in Step S702, the flow proceeds to Step S705, and judgment is made whether or not predetermined time has elapsed on the aforementioned standby timer. In the event that the predetermined time has elapsed, the flow proceeds to step S706, and conversely, in the event that the predetermined time has not elapsed, the flow proceeds to Step S711.

In step S706, prior to the camera being set to the standby state, the interrupt setting is performed for the camera control means (CPU) 703, thereby enabling returning from the standby state.

In Step S707, the camera is set to the standby state. In Step S708, judgment is made whether or not any camera operation (key operation), which requires returning from the standby state, is generated. In the event that the operation is not generated, the processing in Step S708 is repeated until the key operation is generated. The camera operations include the operations of the power SW of the camera, operations of the photography mode setting device 343, and the operations of the operational members such as zoom setting device 344 and the like. Note that, other processing may be performed with high priority to the flow in the event of particular operations being performed, but detailed description will be omitted here.

In the event that the camera operations are generated, the standby state of the camera is canceled in Step S709, and the camera is set to the normal operation state.

In the subsequent Step S710, the interrupt setting which has been set in Step S706 is canceled. Subsequently, the flow proceeds to Step S703.

In the aforementioned Step S711, check of the zoom setting operations by the zoom setting device 344 is performed.

In Step S712, judgment is made whether or not any zoom setting operation is performed. In the event that the zoom setting operation is performed, the flow proceeds to Step S713, and conversely, in the event that the zoom setting operation is not performed, the flow proceeds to Step S717.

In Step S713, judgment is made whether or not zoom setting operation is to be performed for the telephotographic operations. In the event of the telephotographic operations, the zoom setting operation is performed for the telephotographic operations in Step S714. In the event of the wide-angle photographic operations, the zoom setting operation is performed for the wide-angle photographic operations in Step S715. These operations are performed by a variable power lens driving actuator 338 and a variable power lens 359, and the focal distance is detected by a focal distance information detection sensor 360.

In step S716, as the zoom operations is performed, the standby timer serving as a standard, which indicates whether or not the camera is to be set to the standby state (stop of all the functions), is initialized and restarted.

In Step S717, judgment is made whether or not any setting operation for the blurring mode is performed by the photography mode setting device 343. In the event that any setting operations is not performed, the flow proceeds to RETURN.

In Step S718, as the operations of the photography mode setting device 343 is performed, the standby timer serving as a standard, which indicates whether or not the camera is to be set to the standby state (stop of all the functions), is initialized and restarted.

In Step S719, judgment is made whether or not the operation for the blurring mode, performed by the photography mode setting device 343, is mode cancel operation, i.e., OFF operation (both of the blurring notifying mode and the timing control mode are set to OFF). In the event that the OFF operation is performed, the flow proceeds to Step S720, the flags F_BRDSP and F_BRTIM are cleared to zero, the blurring detection system is turned off in Step S721, and the flow proceeds to RETURN. In the event that the operation other than the OFF operation is performed (in the event that either of the blurring notifying mode or timing control mode is selected and maintained), the flow proceeds to Step S722.

In Step S722, judgment is made whether or not the blurring notifying mode is ON state. In the event that the blurring notifying mode is ON state, the flag F_BRDSP is set to 1 in Step S723, and conversely, in the event that the blurring notifying mode is OFF state, the flag F_BRDSP is cleared to 0 in Step S724.

As described above, the flag Fhd —BRDSP is a flag which indicates the setting state for the blurring notifying mode, i.e., the flag of "1" indicates the setting state of the blurring notifying mode, and the flag of "0" indicates the setting cancel state of the blurring notifying mode.

In Step S725 in FIG. 41, judgment is made whether or not the timing control mode is ON state. In the event that the timing control mode is ON state, the flag F_BRTIM is set to 1 in Step S726, and conversely, in the event that the timing control mode is OFF state, the flag F_BRTIM is cleared to 0 in Step S728.

As described above, the flag F_BRTIM is a flag which indicates the setting state for the timing control mode, i.e., the flag of "1" indicates the setting state of the timing control mode, and the flag of "0" indicates the setting cancel state of the timing control mode.

In Step S729, judgment is made whether or not both of the blurring notifying mode and the timing control mode are set, based on the aforementioned flag state. In the event that both modes are selected, the notifying period for the blurring is set to 100 msec, for example, in Step S730, and subsequently, the flow proceeds to Step S733. In the judgment processing in Step S729, in the event that judgment is made that both modes are not selected, the flow proceeds to Step S731.

In Step S731, judgment is made whether or not the blurring notifying mode is selected and the timing control mode is not selected, based on the above-described flag state. In the event that only the blurring notifying mode is selected, the blurring notifying period is set to 50 mS, for example, in Step S732, and subsequently, the flow proceeds to Step S733. In the event that judgment is made that the aforementioned relation does not hold (here, in the event that only the timing control mode is selected), the flow proceeds to the following Step S733.

Here, the period for the notice update is differentiated between Step S730 and Step S732 so that in the event that only the blurring notifying mode is selected, the update period of notice of the blurring is reduced, and the actual blurring information is more frequently provided as compared with other cases, so as to call the attention of the user. That is to say, reduction of the blurring, which can be effected in the timing control mode or the like, cannot be effected only by the blurring notifying mode. Accordingly, in the event that only the blurring notifying mode is set, notice is given so as to call a further attention of the user. On the other hand, in the event that the timing control mode and the blurring notifying mode are set, the effect of reduction of the blurring is obtained by the timing control mode. Accordingly, the tolerance of blurring due to the movement of hands is greater than as compared with only in the blurring notifying mode. Taking this into consideration, in the event that both modes are set, the blurring notice update period is set to a longer time.

In Step S733, the movement detection/computation means 301 is activated, and initialization is performed for the unit. The operations are controlled by the movement detection control unit 307.

While description has been made regarding the operation example of preparation for 1R, sensing by AE/AF functions and blurring detection operations (only in the event that the corresponding mode is set) are performed such that each function can handle the operation of the exposure setting control device 341 (1R) at any given timing.

Figure 42:
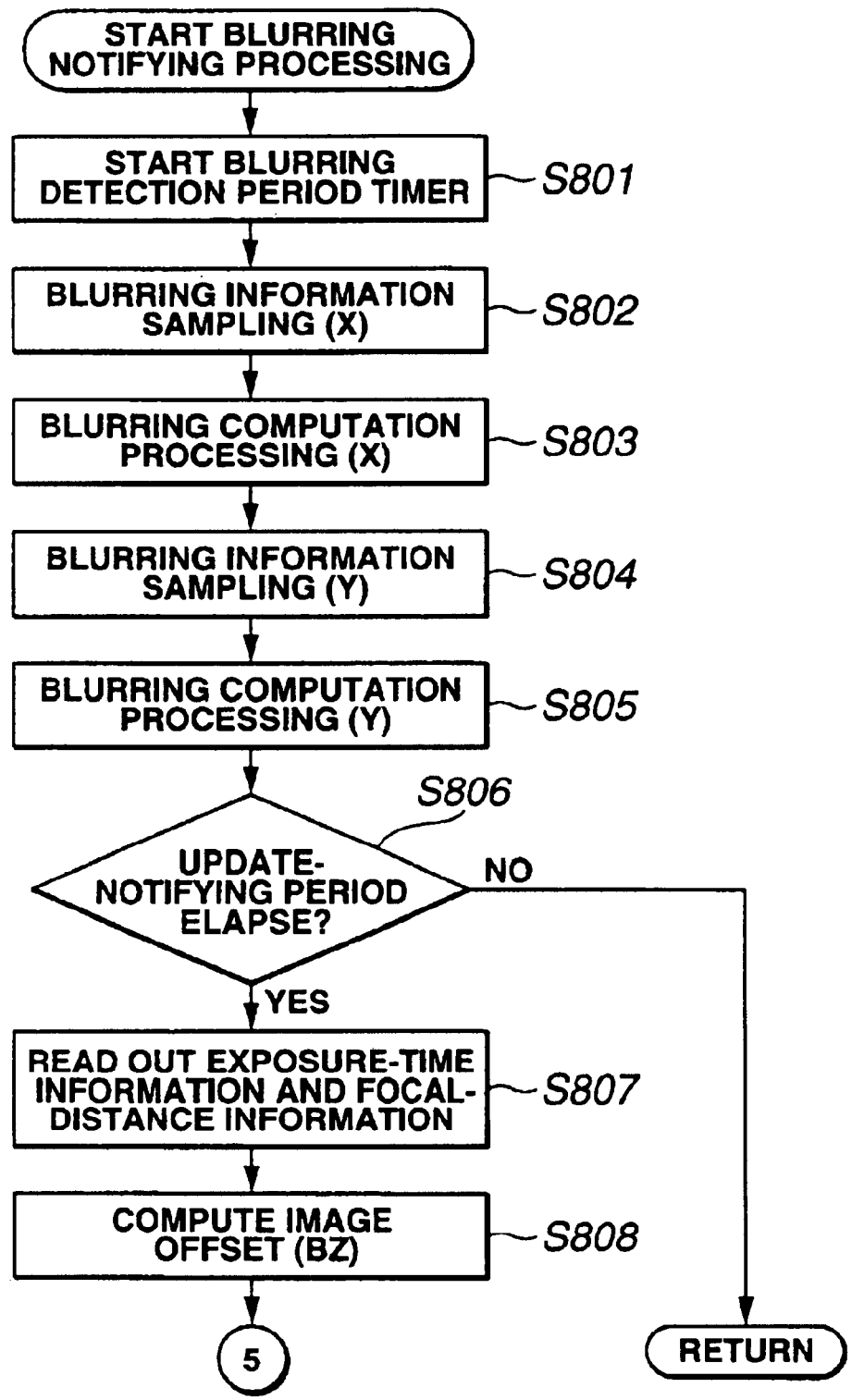
FIG. 42 is a flowchart which indicates movement notifying processing according to the camera of the sixth embodiment.
Figure 43:
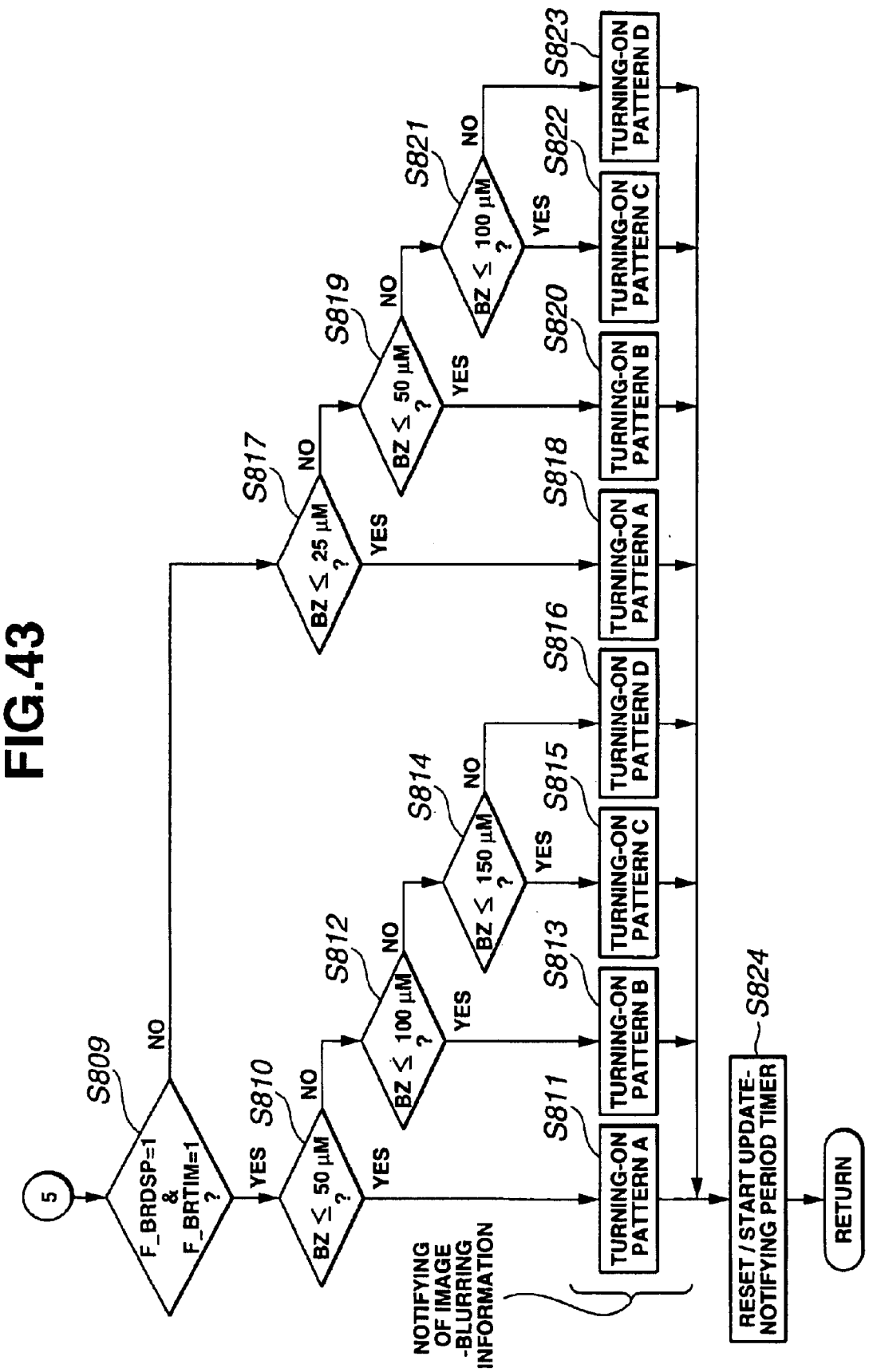
FIG. 43 is a flowchart which indicates movement notifying processing according to the camera of the sixth embodiment.

FIGS. 42 and 43 are flowcharts which indicate the part of performing the blurring notifying processing.

Furthermore, FIG. 44 is a diagram which illustrates a display example of the blurring reporting unit 409. In FIG. 44, each circle denotes a display element such as LED or the like. The solid circles represent the on state, and the white circles represent the off state. The number of the turning-on elements is changed depending on the blurring amount, and accordingly, display can be made corresponding to the blurring amount, as described more clearly later with reference to the flowchart.

In FIG. 42, in Step S801, the blurring detection period timer is started. This is because sampling of the blurring information is performed at constant cycles. Here, an arrangement may be made wherein the time period of the "constant cycle" is 2 mS, for example. Note that check of the timer thus started is performed in Step S627 in FIG. 38.

In Step S802, sampling of the blurring information corresponding to the X-axis direction within the image plane is performed. This is the processing wherein sampling of the output from the second movement sensor 312 is performed by the second movement information sampling unit 314.

In Step S803, the movement computation processing (removal of unnecessary frequency components independent of the movement) corresponding to the X-axis direction within the image plane is performed. The processing is performed by the second movement computation unit 316.

In Step S804, sampling of the blurring information corresponding to the Y-axis direction within the image plane is performed. This is the processing wherein sampling of the output from the first movement detection sensor 311 is performed by the first movement information sampling unit 313.

In Step S805, the movement computation processing (removal of unnecessary frequency components independent of the blurring) corresponding to the Y-axis direction within the image plane is performed. The processing is performed by the first movement computation unit 315.

In Step S806, judgment is made whether or not the notice update period for the image blurring level has elapsed. In the event that the notice update period has elapsed, the flow proceeds to Step S807, and conversely, in the event that the notice update period has not elapsed, the flow proceeds to RETURN. The reason of making judgment of the notice update period is that in the event that notice of the blurring level corresponding to the blurring state is given in real time, the flicker of the notice (display) might become annoying, which could be troublesome for the user observing the viewfinder image. The notice update period may be set to 100 mS, for example. That is to say, notice update of the blurring level is performed one time for each period of 100 mS. Note that an arrangement may be made wherein the timing at which the timer for checking time is to be started is set to a timing immediately following the processing in Step S811 described later, or the processing in Step S617 in FIG. 37 (only in the event that the blurring notifying mode is set).

In Step S807, the exposure time computation unit 333 reads out the exposure time information, and the focal-distance information detection sensor 360 reads out the focal-distance information, in order to perform computation of image blurring amount.

In Step S808, computation of the image blurring amount is performed. The image blurring amount is roughly calculated as the multiplication of the blurring (angular velocity) information ωX and ωY [DEG/SEC], focal-distance information f [m], and the exposure time information Texp [SEC]. While a method wherein the image blurring amount in the X direction and Y direction within the image plane are calculated, respectively, and the image blurring amount is finally calculated using each result in a vector manner is known as a computation method, other methods can be employed. An example of the computation expressions will be indicated below.

$$BX[m] = \omega Y[DEG/SEC] \times f[m] \times Texp[SEC]$$

$$BY[m] = \omega X[DEG/SEC] \times f[m] \times Texp[SEC]$$

$$BZ[m] = SQRT(BX \times BX + BY \times BY)$$

In Step S809 in FIG. 43, judgment is made based on the flags whether or not both of the blurring notifying mode and the timing control mode are selected. In the event that both modes are selected, the flow proceeds to Step S810, and conversely, in the event that both modes are not selected, the flow proceeds to Step S817.

In Step S810, judgment is made whether or not the image blurring amount BZ calculated in Step S808 is 50 µm or less. In the event that BZ is equal to or less than 50 µm, the flow proceeds to Step S811, the blurring notice pattern A is selected, and notice is given (note that, in this case, notifying by turning-on is not given due to the blurring being small). Subsequently, the flow proceeds to Step S824. In the event that BZ is not equal to or less than 50 µm, the flow proceeds to Step S812.

In Step S812, judgment is made whether or not the image blurring amount BZ calculated in Step S808 is 100 µm or less. In the event that BZ is equal to or less than 100 µm, the flow proceeds to Step S813, the blurring notifying pattern B is selected, notice is given, and the flow proceeds to Step S824. In the event that BZ is not equal to or less than 100 µm, the flow proceeds to Step S814.

In Step S814, judgment is made whether or not the image blurring amount BZ calculated in Step S808 is 150 µm or less. In the event that BZ is equal to or less than 150 µm, the flow proceeds to Step S815, the blurring notifying pattern C is selected, notice is given, and the flow proceeds to Step S824. In the event that BZ is not equal to or less than 150 µm, the flow proceeds to Step S816, the blurring notifying pattern D is selected, notice is given, and subsequently, the flow proceeds to Step S824.

On the other hand, in Step S817, judgment is made whether or not the image blurring amount BZ calculated in Step S808 is 25 µm or less. In the event that BZ is equal to or less than 25 µm, the flow proceeds to Step S818. In Step S818, the blurring notifying pattern A is selected, notice is given (note that, in this case, notifying by turning-on is not given due to the movement being small), and subsequently, the flow proceeds to Step S824. In the event that BZ is not equal to or less than 25 µm, the flow proceeds to Step S819.

In Step S819, judgment is made whether or not the image blurring amount BZ calculated in Step S808 is 50 µm or less. In the event that BZ is equal to or less than 50 µm, the flow proceeds to Step S820, the blurring notifying pattern B is selected, notice is given, and the flow proceeds to Step S824. In the event that BZ is not equal to or less than 50 µm, the flow proceeds to Step S821.

In Step S821, judgment is made whether or not the image blurring amount BZ calculated in Step S808 is 100 µm or less. In the event that BZ is equal to or less than 100 µm, the flow proceeds to Step S822, the blurring notifying pattern C is selected, notice is given, and the flow proceeds to Step S824. In the event that BZ is not equal to or less than 100 µm, the flow proceeds to Step S823, the blurring notifying pattern D is selected, notice is given, and subsequently, the flow proceeds to Step S824.

The reason that determination,value is differentiated between Steps S810 through S816 and Steps S817 through S823 is that in the event the only the blurring notifying mode is selected, notice is further given as compared with a case that the timing control mode is also selected besides the blurring notifying mode. Thus, the meaning of "blurring warning/notification" is further emphasized, thereby calling attention of the user.

In Step S824, the blurring notice update period timer is reset and restarted. Thus, the blurring level notifying operation is performed for each constant cycle.

Figure 45A:
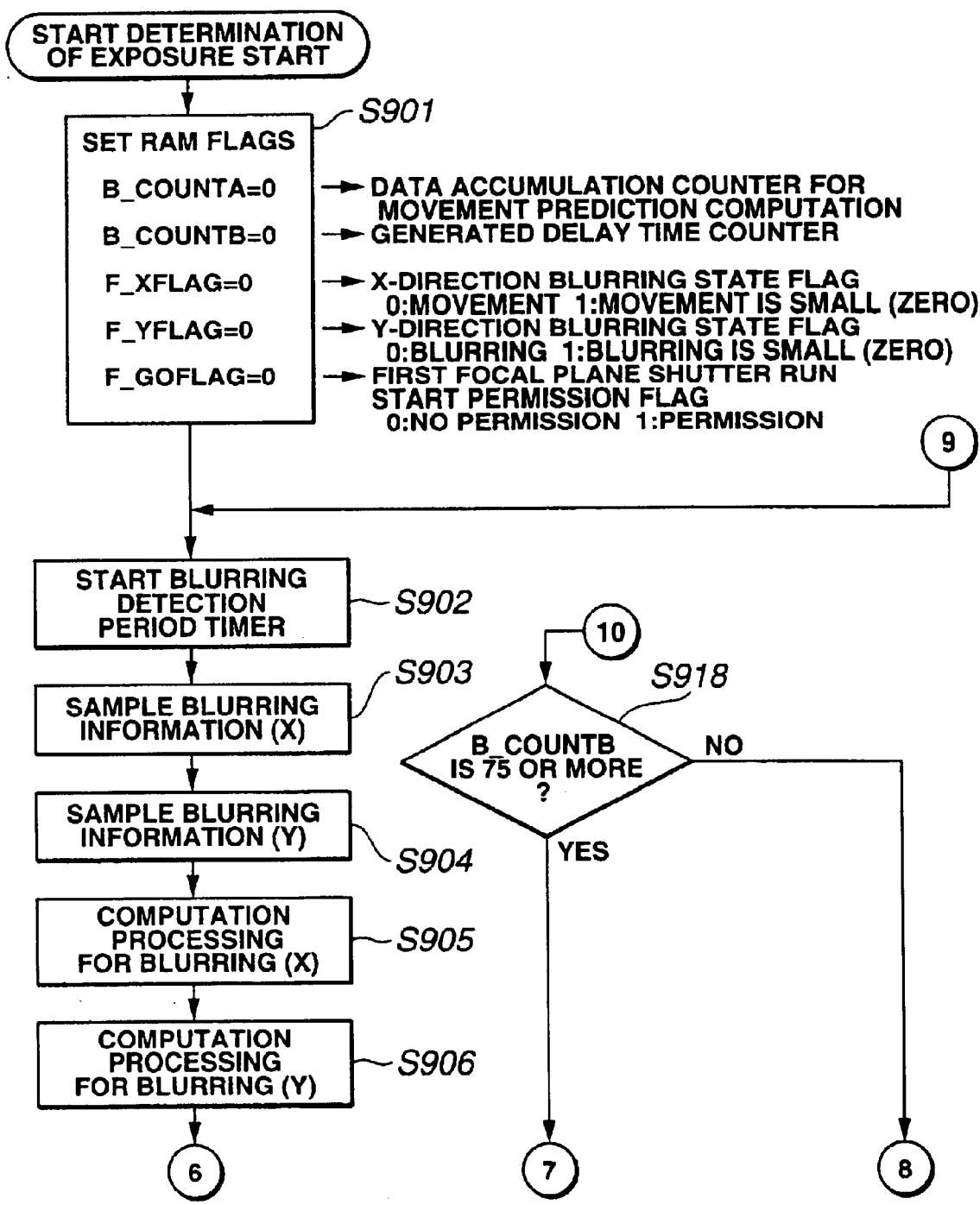
FIG. 45A is a flowchart which indicates exposure start determination processing according to the camera of the sixth embodiment.
Figure 45B:
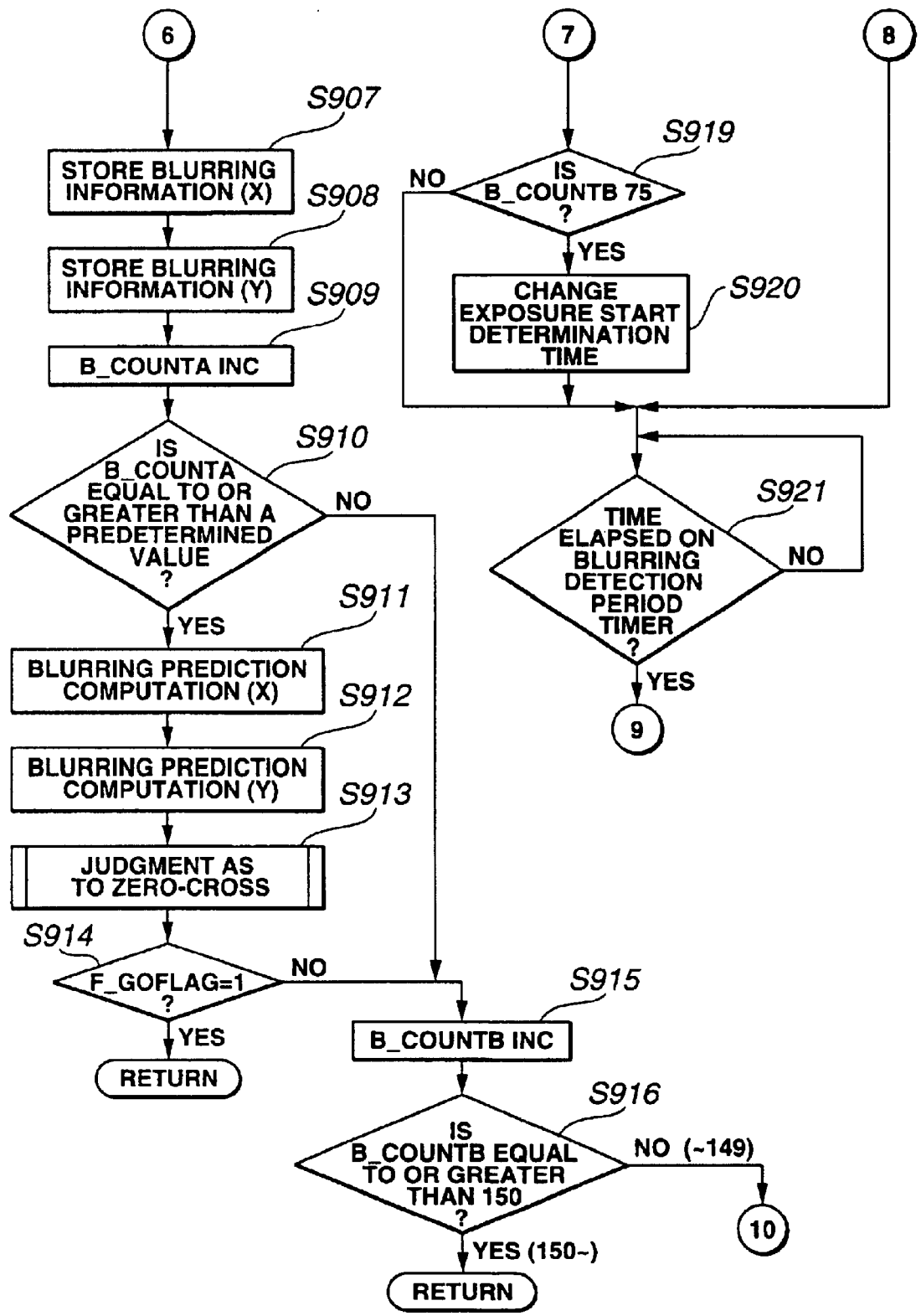
FIG. 45B is a flowchart which indicates exposure start determination processing according to the camera of the sixth embodiment.

FIGS. 45A and 45B are flowcharts which indicate exposure start determination in the present sixth embodiment. In Step S901, RAM (counters) and flags, which are used for the following determination with regard to exposure start, are cleared (initial setting). Specifically, the blurring prediction computation data accumulation counter B_COUNTA is set to 0, the generated delay time counter B_COUNTB is set to 0, the X-direction blurring state flag F_XFLAG is set to 0, the Y-direction blurring state flag F_YFLAG is set to 0, and the first focal plane shutter run start permission flag F_GOFLAG is set to 0. With the X-direction blurring state flag F_XFLAG and the Y-direction blurring state flag F_YFLAG, the flag of "0" represents presence of the blurring, and the flag of "1" represents the absence of the blurring. On the other hand, with the first focal plane shutter run start permission flag F_GOFLAG, in the event that the flag is set to "0", permission is not given, and conversely, in the event the flag is set to "1", permission is given.

In Step S902, the movement detection period timer is started. This is for having sampling of the movement information perform for each constant cycle.

In Step S903, sampling of the movement information corresponding to the X-axis direction within the image plane is performed. With the processing, sampling of the output from the second movement detection sensor 312 is performed by the second movement information sampling unit 314.

In Step S904, sampling of the movement information corresponding to the Y-axis direction within the image plane is performed. With the processing, sampling of the output from the first movement detection sensor 311 is performed by the first movement information sampling unit 313.

In Step S905, the computation processing for the movement corresponding to the X-axis direction within the image plane is performed. The second movement computation unit 316 performs the processing.

In Step S906, the computation processing for the movement corresponding to the Y-axis direction within the image plane is performed. The first movement computation unit 315 performs the processing.

In Step S907, the movement information corresponding to the X-axis direction within the image plane is stored. The processing is performed within the second movement prediction computation unit 319.

In Step S908, the movement information corresponding to the Y-axis direction within the image plane is stored. The processing is performed within the first movement prediction computation unit 318.

In Step S909, the value of the counter B_COUNTA is incremented.

In Step S910, judgment is made whether or not the value of the aforementioned counter is equal to or greater than a predetermined value. That is to say, judgment can be made whether or not movement information of a predetermined value (time) or more is stored within the second movement prediction computation unit 319 and the first movement prediction computation unit 318. In the event that movement information of the predetermined value or more is stored therein, the flow proceeds to Step S911. Otherwise, the flow proceeds to Step S915 described later.

In Step S911, computation for prediction of the movement corresponding to the X-axis direction within the image plane is performed. The processing is performed by the second blurring prediction computation unit 319.

In Step S912, computation for prediction of the movement corresponding to the Y-axis direction-within the image plane is performed. The processing is performed by the first blurring prediction computation unit 318.

In Step S913, zero-cross judgment processing is performed. Detailed description will be made later with reference to FIG. 46. The processing is performed by the exposure start determination unit 320, and in the event that determination is made that exposure is to be started, the flag F_GOFLAG is set to "1".

In Step S914, judgment is made whether or not the flag F_GOFLAG is "1". In the event that the flag is "1", the flow proceeds to RETURN so as to start exposure. In the event that the flag is not "1", the flow proceeds to Step S915. In Step S915, the value of the counter B_COUNTB is incremented. Assuming the processing period as a constant time period from Step S902 up to Step S921 described later, the same effect is obtained as with a case wherein the generated delay time measuring unit 323 measures time.

In Step S916, judgment is made whether or not the value of the counter B_COUNTB is 150 or more. With the judgment, assuming the period for a series of processing from Step. S902 up to Step S921 described later as 2 mS, the same effect is obtained as with a case wherein judgment is made whether or not time of 300 mS has elapsed from the start of the exposure start determination operation. The information with regard to time is set in the delay limitation time setting unit 324. Here, in the event that judgment is made that the predetermined time has elapsed (delay limitation has been detected, or exposure start determination operation is to end), the flow proceeds to RETURN, and exposure is performed. In the event that the predetermined time has not elapsed, the flow proceeds to Step S918. Note that while description has been made in the present embodiment with the limitation value as "150", the limitation value is not restricted to the value (time), other values (time) may be used.

In Step S918, judgment is made whether or not the value of the counter B_COUNTB is 75 or more. With the judgment, assuming the period for a series of processing from Step S902 up to Step S921 described later as 2 mS, the same effect is obtained as with a case wherein judgment is made whether or not time of 150 mS has elapsed from the start of the exposure start determination operation. Here, in the event that the time has not elapsed, the flow proceeds to Step S921 described later, and conversely, in the event that the time has elapsed, the flow proceeds to Step S919. Note that while description has been made in the present embodiment with the limitation value as "75", the limitation value is not restricted to the value (time), other values (time) may be used.

In Step S919, judgment is made whether or not the value of the counter B_COUNTB is 75. In the event that the value is 75, the flow proceeds to Step S920 described later, otherwise, the flow proceeds to Step S921. The judgment processing is included here so as to change the exposure start determination permissible time only one time in Step S920 described later.

In Step S920, the exposure start determination permissible time is changed. With the processing, the determination permissible time information, which has been set for the determination parameter setting unit 322, is changed (increased). The processing is intended to obtain an effect wherein exposure start permission is readily given while performing reduction of the blurring by the exposure start timing control, whereby reducing the generated delay time as possible.

In Step S921, judgment is made whether or not predetermined time has elapsed on the blurring detection period timer which has started in Step S902. In the event that the predetermined time has elapsed, the flow returns to Step S902, and a series of processing described above with reference to FIG. 45 is repeatedly performed. The timer period may be set to 2 mS or 1 mS, for example.

Figure 46:
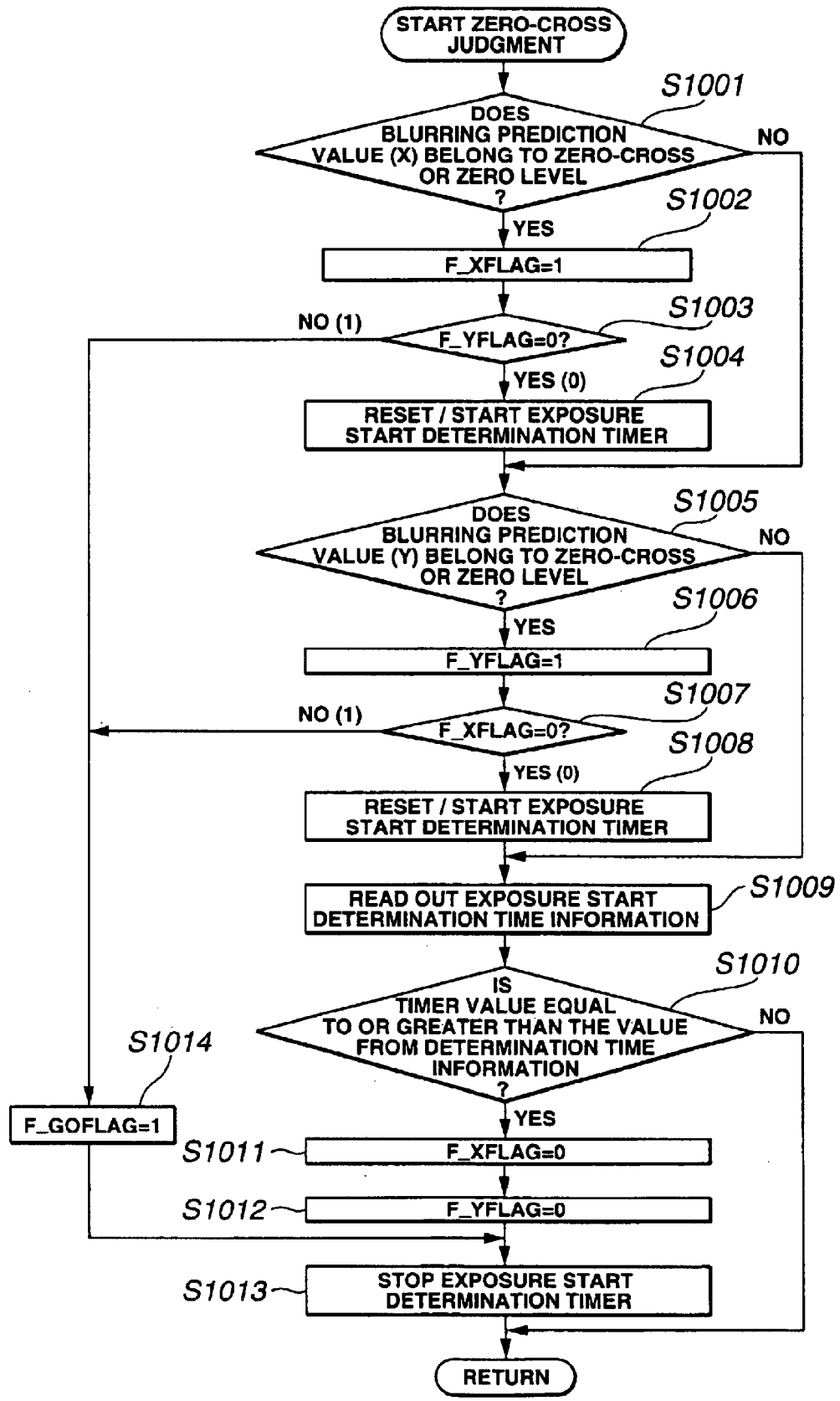
FIG. 46 is a flowchart which indicates zero-cross judgment processing according to the camera of the sixth embodiment.

FIG. 46 is a flowchart for describing zero-cross judgment.

The zero-cross judgment is the processing wherein in the event that either of blurring information corresponding to the X-axis direction or the Y-axis direction exhibits crossing of the zero level state (velocity of zero), and subsequently the other exhibits crossing of the zero level state in the same way, exposure start permission is given.

FIG. 46, first of all, zero-cross judgment is started. In Step S1001, judgment is made whether or not the predicted blurring state value (X) exhibits crossing of the zero level. With the processing, the blurring state value is obtained based on the output from the second blurring prediction computation unit 319. With the processing, judgment is made whether or not the blurring state value exhibits crossing of the ±0 level in the vertical axis described later with reference to FIG. 47, i.e., the blurring angular velocity becomes zero. In the event that the predicted blurring state value does not exhibit crossing of the zero level, the flow proceeds to Step S1005 described later.

In the event that the predicted blurring state value exhibits crossing of the zero level, the X-direction blurring state flag F_XFLAG is set to "1" in Step S1002.

In Step S1003, judgment is made whether or not the Y-direction blurring state flag F_YGLAG is "0", i.e., whether or not the predicted blurring state value (Y) exhibits crossing of the zero (within the exposure start determination permissible time described later). In the event that the crossing is not detected, i.e., the flag is "0", the flow proceeds to Step S1004. Conversely, In the event that the flag is not "0", i.e., crossing is detected, so the flag is "1", the flow proceeds to Step S1014 described later.

In Step S1004, as the predicted blurring state value (Y) is exhibited crossing of the zero level, the timer for exposure start determination is reset and started.

In Step S1005, judgment is made whether or not the predicted blurring state value (Y) exhibits crossing of the zero level. With the processing, the blurring state value is obtained based on the output from the first blurring prediction computation unit 318. With the processing, judgment is made whether or not the blurring state value exhibits crossing of the ±0 level in the vertical axis described later with reference to FIG. 47, i.e., the blurring angular velocity becomes zero. In the event that the predicted blurring state value does not exhibit crossing of the zero level, the flow proceeds to Step S1009 described later.

In the event that the predicted blurring state value exhibits crossing of the zero level, the Y-direction blurring state flag F_YFLAG is set to "1" in Step S1006.

In the following Step S1007, judgment is made whether or not the X-direction blurring state flag F_XFLAG is "0", i.e., whether or not the predicted blurring state value (X) exhibits crossing of the zero (within the exposure start determination permissible time Δt described later). In the event that the flag is not "0", i.e., crossing is detected, so the flag is "1", the flow proceeds to Step S1014 described later. In the event that the flag is "0", the flow proceeds to Step S1008.

In Step S1008, as the predicted blurring state value (X) is exhibited crossing of the zero level, the timer for exposure start determination is reset and started.

In Step S1009, the exposure start determination permissible time information, which has been set in the determination parameter setting unit 322, is read out.

In Step S1010, judgment is made whether or not the time on the timer, which has been started in Step S1004 or in Step S1008, exhibits time equal to or greater than the exposure start determination permissible time read out. That is to say, with the judgment, the same effect is obtained as with in a case that judgment is made whether or not both of the predicted blurring state values (X) and (Y) have exhibited crossing of the zero level in the exposure start determination permissible time. Here, in the event that the exposure start determination permissible time has elapsed, the flow proceeds to RETURN. In the event that elapsing time exhibits the exposure start determination permissible time or more, judgment is made that the movement is great, and accordingly, the movement direction state flags F_XFLAG and F_YFLAG in the X and Y directions are set to "0" in Steps S1011 and S1012. The state represents a state wherein the movement does not exhibit crossing of the zero.

In Step S1013, the timer which has been started in Step S1004 or Step S1008 are stopped. This is because the present state is moving away from the state wherein the movement is small, or the exposure start determination ends as described later.

Next, description will be made regarding a case that the Y-direction flag F_YFLAG is "1" in Step S1003, and a case that X-direction flag F_XFLAG is "1" in Step S1007. In the event that such judgment is made, both of the predicted blurring state values corresponding to the X direction and the Y direction exhibit crossing of the zero level in the exposure start determination permissible time, and accordingly, determination is made that exposure is to be started. Thus, the first focal plane shutter run start permission flag F_GOFLAG is set to "1" in Step S1014. Thus, permission of exposure start is given in Step S624 in FIG. 38. Subsequently, the flow proceeds to Step 1013.

Figure 47:
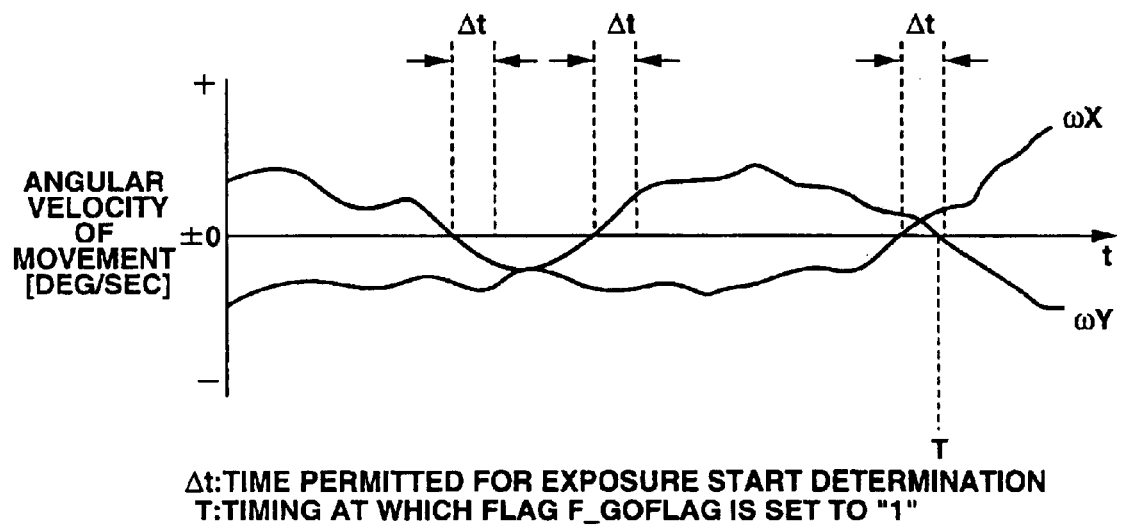
FIG. 47 is a diagram, using waveforms, which illustrates an operation example of zero-cross judgment processing according to the camera of the sixth embodiment.

FIG. 47 indicates an operation example of the zero-cross judgment described with reference to FIG. 46, with waveforms, wherein the blurring state value ωX in the X-axis direction in the image plane and the blurring state value ωY in the Y-axis direction in the image plane are plotted on the same plane. In the drawing, the vertical axis represents the angular velocity of the movement [DEG/SEC], and the horizontal axis represents the time t.

In FIG. 47, prior to the timing T, ωX and ωY have exhibited crossing of the ±0 level one time each, but the other has not exhibited crossing of the ±0 level in the time width Δt, i.e., exposure start determination permissible time, and accordingly, permission of exposure start is not given. However, the conditions are satisfied at the time T, the flag F_GOFLAG is set to "1".

With the above-described embodiment, the notifying format is changed depending on the selected mode, i.e., a case that the notifying operation mode is selected, or a case that the notifying operation mode and the exposure operation mode are selected. For example, in the event that only the notifying is performed based on the results of the movement detection prior to the command of exposure start as a countermeasure for the movement, notifying of the movement prior to the exposure start command is given with higher detection sensitivity to movement or with a shorter update period so as to call attention of the user for the actual exposure operations, as compared with in a case that release timing control is performed.

Thus, even in the event that release timing control is not performed, the possibility that a picture with blurring due to the movement of hands is taken can be reduced.

With the present embodiment, the notifying format is changed depending on the selected mode, i.e., a case that the notifying operation mode is selected, or a case that the notifying operation mode and the exposure operation mode are selected, and thus, even in the event that the release timing control is not performed, the possibility that a picture with blurring due to the movement of hands is taken can be reduced.

Note that the present invention encompasses modifications or the like, formed of combinations of parts of the above-described embodiments, or the like, as well.

In this invention, it is apparent that working modes different in a wide range can be formed on this basis of this invention without departing from the spirit and scope of the invention. This invention is not restricted by any specific embodiment except being limited by the appended claims.

What is claimed is:

1. A camera comprising:
   a sensor array wherein a plurality of pixels are arrayed in the base-line-length direction thereof;
   a focusing unit for performing focusing of the camera based on the image output from the sensor array;
   a first detection unit for detecting the movement of the image signals in the base-line-length direction;
   a second detection unit for detecting the change with regard to time in a predetermined pixel signal of the image signals; and
   a movement detection unit for performing movement detection based on the output from the first and second detection unit.

2. The camera according to claim 1, wherein, of the output signals from the pixels of the sensor array, the predetermined pixel signal from the second detection unit exhibits maximal change in data over time.

3. The camera according to claim 1, wherein in the event that the result detected from the first detection unit is less than a predetermined value, the result output from the second detection unit is used.

4. The camera according to claim 1, wherein the image used by the first detection unit for detection of the change in the base-length direction is a high-contrast region where the change in the image is maximal among the image signals in the event of comparing the output from adjacent pixels.

5. A camera comprising:
   a sensor array, wherein a plurality of photo-receiving elements are arrayed, for outputting subject image data formed of output signals from the respective photo-receiving elements thereof;
   a first calculation unit for calculating the image offset amount between the subject image data output at a first timing and the subject image data output at a second timing different from the first timing by a predetermined time period;
   a second calculation unit for calculating the sum of the absolute values of the differences between the output signals from the respective photo-receiving elements at the first timing and those at the second timing; and
   a blurring-due-to-movement-of-hands judgment unit for making judgment whether or not blurring due to the movement of hands is caused, based on the output from the first calculation unit and/or the output from the second calculation unit.

6. The camera according to claim 5, wherein, in the event that at least one of the output from the first calculation unit and the output from the second calculation unit is greater than the corresponding predetermined judgment value, the blurring-due-to-movement-of-hands judgment unit makes judgment that blurring due to the movement of hands is caused.

7. The camera according to claim 5, wherein, in the event that the output from the first calculation unit is less than the predetermined judgment value, the blurring-due-to-movement-of-hands judgment unit makes judgment with regard to blurring due to the movement of hands based on the output from the second calculation unit.

8. The camera according to claim 5, further comprising a sensor for detecting blurring due to the movement of hands, wherein in the event that the subject image data output from the sensor array is low in contrast, judgment is made whether or not blurring due to the movement of hands is caused, using the output from the sensor.

9. The camera according to claim 8, wherein the sensor constitutes an acceleration sensor for detecting acceleration in the direction orthogonal to the array direction of the photo-receiving elements of the sensor array.

10. The camera according to claim 5, further comprising a sensor for detecting blurring due to the movement of hands, wherein in the event that the subject image data output from the sensor array is low in luminance, judgment is made whether or not blurring due to the movement of hands is caused, using the output from the sensor.

11. The camera according to claim 10, wherein the sensor constitutes an acceleration sensor for detecting acceleration in the direction orthogonal to the array direction of the photo-receiving elements of the sensor array.

12. A camera comprising:

a sensor array, wherein a plurality of photo-receiving elements are arrayed, for outputting image signals of the subject;

a first detection unit for detecting the movement of the image signals output from the sensor array in the photo-receiving element array direction;

a second detection unit for detecting the change in the image signals output from the sensor array;

a vibration detection unit for performing detection of the vibration based on the detected results from the first detection unit and/or the second detection unit; and a notifying unit for giving a notice of vibration detection information according to the output from the vibration detection unit, wherein the notifying format is differentiated between a case of detecting the vibration based on the detected results from the first detection unit, and a case of detecting the vibration based on the detected results from the second detection unit.

13. The camera according to claim 12, wherein, in the event that the notifying unit gives a notice of the vibration detection information based on the detected results from the first detection unit, the notice is given with a grade corresponding to the magnitude of the vibration.

14. The camera according to claim 12, wherein, in the event that the notifying unit gives a notice of the vibration detection information based on the detected results from the second detection unit, the notice is given in an on/off manner corresponding to the magnitude of the vibration.

15. The camera according to claim 12, wherein the vibration detection unit detects the vibration in the photo-receiving element array direction based on the output from the first detection unit, and the vibration in the direction orthogonal to the photo-receiving element array direction based on the output from the second detection unit.

16. The camera according to claim 12, wherein the first detection unit detects the moved amount of the image signals over time in the photo-receiving element array direction, and the second detection unit detects the change in the image signal shape over time.

* * * * *